(12) United States Patent
Zhu et al.

(10) Patent No.: US 10,864,433 B2
(45) Date of Patent: Dec. 15, 2020

(54) USING A PORTABLE DEVICE TO INTERACT WITH A VIRTUAL SPACE

(71) Applicant: Sony Interactive Entertainment Inc., Tokyo (JP)

(72) Inventors: Yunpeng Zhu, San Francisco, CA (US); Jeffrey Roger Stafford, Redwood City, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 12 days.

(21) Appl. No.: 15/482,669

(22) Filed: Apr. 7, 2017

(65) Prior Publication Data

US 2017/0209786 A1 Jul. 27, 2017

Related U.S. Application Data

(63) Continuation of application No. 12/903,123, filed on Oct. 12, 2010, now abandoned.

(51) Int. Cl.
*A63F 13/211* (2014.01)
*A63F 13/428* (2014.01)
(Continued)

(52) U.S. Cl.
CPC ............ *A63F 13/211* (2014.09); *A63F 13/10* (2013.01); *A63F 13/12* (2013.01); *A63F 13/25* (2014.09);
(Continued)

(58) Field of Classification Search
CPC ...... A63F 13/211; A63F 13/25; A63F 13/352; A63F 13/63; A63F 13/428;
(Continued)

(56) References Cited

U.S. PATENT DOCUMENTS 6,752,720 B1 6/2004 Clapper et al.
7,803,048 B2 9/2010 Tilston et al.
(Continued)

FOREIGN PATENT DOCUMENTS

CN 1233807 11/1999
CN 1436090 8/2003
(Continued)

OTHER PUBLICATIONS

Extended European Search Report, dated Dec. 4, 2013, issued in related EP Application No. 11184814.9 (5 pages).
(Continued)

*Primary Examiner* — Yaron Cohen
(74) *Attorney, Agent, or Firm* — Penilla IP, APC

(57) ABSTRACT

In one implementation, a portable device is provided, including: a sensor configured to generate sensor data for determining and tracking a position and orientation of the portable device during an interactive session of a virtual reality program presented on a main display, the interactive session being defined for interactivity between a user and the virtual reality program; a communications module configured to send the sensor data to a computing device, the communications module being further configured to receive from the computing device an ancillary video stream of the interactive session that is generated based on a state of the virtual reality program and the tracked position and orientation of the portable device.

21 Claims, 35 Drawing Sheets

(51) Int. Cl.
  *A63F 13/63* (2014.01)
  *A63F 13/25* (2014.01)
  *A63F 13/352* (2014.01)
  *A63F 13/355* (2014.01)
  *A63F 13/26* (2014.01)
  *A63F 13/92* (2014.01)
  *A63F 13/30* (2014.01)
  *A63F 13/40* (2014.01)
  *A63F 13/327* (2014.01)
  *A63F 13/47* (2014.01)

(52) U.S. Cl.
  CPC ............ *A63F 13/26* (2014.09); *A63F 13/352* (2014.09); *A63F 13/355* (2014.09); *A63F 13/428* (2014.09); *A63F 13/63* (2014.09); *A63F 13/92* (2014.09); *A63F 13/327* (2014.09); *A63F 13/47* (2014.09); *A63F 2300/301* (2013.01); *A63F 2300/403* (2013.01); *A63F 2300/538* (2013.01); *A63F 2300/632* (2013.01); *A63F 2300/8082* (2013.01)

(58) Field of Classification Search
  CPC ............ A63F 2300/8082; A63F 13/355; A63F 13/26; A63F 13/92; A63F 13/10; A63F 13/12; A63F 2300/301; A63F 2300/538; A63F 2300/632; A63F 2300/327; A63F 13/47; A63F 2300/403; A63F 13/86; A63F 13/2145; A63F 13/323; A63F 13/213
  See application file for complete search history.

(56) References Cited

U.S. PATENT DOCUMENTS

| 8,062,113 | B2 | 11/2011 | Tawara et al. |
| 8,231,465 | B2 | 7/2012 | Yee et al. |
| 2001/0003450 | A1 | 6/2001 | Hernia et al. |
| 2002/0082080 | A1 | 6/2002 | Kojima |
| 2002/0165028 | A1* | 11/2002 | Miyamoto ............... A63F 13/06 463/46 |
| 2006/0038833 | A1* | 2/2006 | Mallinson ............... A63F 13/02 345/633 |
| 2006/0068917 | A1 | 3/2006 | Snoddy et al. |
| 2006/0274032 | A1 | 12/2006 | Mao et al. |
| 2006/0284789 | A1 | 12/2006 | Mullen |
| 2008/0102912 | A1 | 5/2008 | Tawara et al. |
| 2009/0280908 | A1 | 11/2009 | Carroll et al. |
| 2010/0053164 | A1* | 3/2010 | Imai ..................... G06F 3/011 345/427 |
| 2011/0143835 | A1 | 6/2011 | Sizelove |
| 2012/0007713 | A1* | 1/2012 | Nasiri .................. G06F 1/1694 340/5.81 |

FOREIGN PATENT DOCUMENTS

| CN | 1678970 | 10/2005 |
| GB | 2442259 | 4/2008 |
| JP | 2002-325963 | 11/2002 |
| JP | 2003-325973 | 11/2003 |
| JP | 2007215669 | 8/2007 |
| JP | 2010046554 | 3/2010 |
| WO | 2008106196 | 9/2008 |

OTHER PUBLICATIONS

Notification of Reason(s) for Refusal issued in related Japanese Application No. 2011-224516, dated Jun. 24, 2014 (5 pages).

First Office Action issued in related Chinese Patent Application No. 201310103965.9, dated May 26, 2015 with Eng. translation (19 total pages).

Communication pursuant to Article 94(3) EPC, issued in related European Application No. 11184814.9-1905, dated Oct. 11, 2017 (5 pages).

* cited by examiner

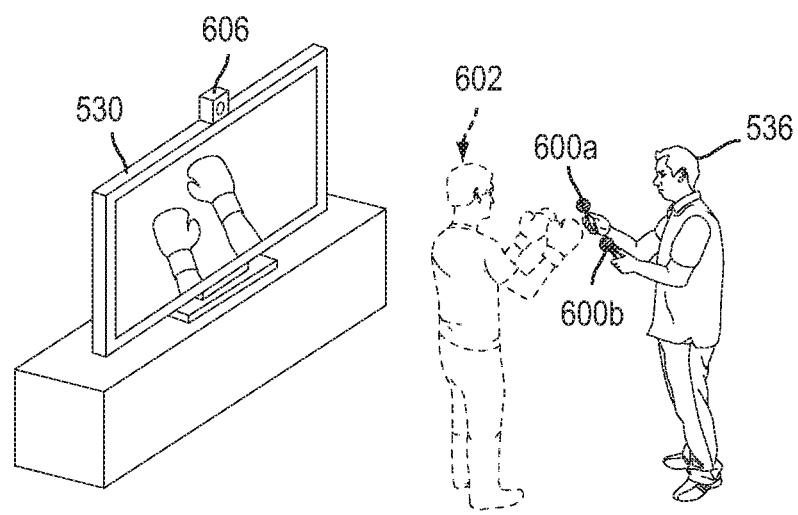
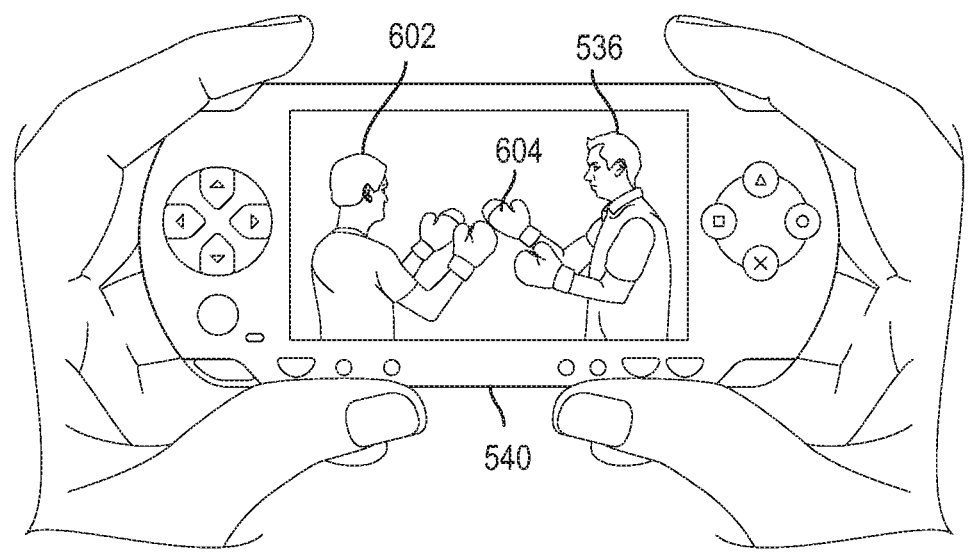
FIG. 28

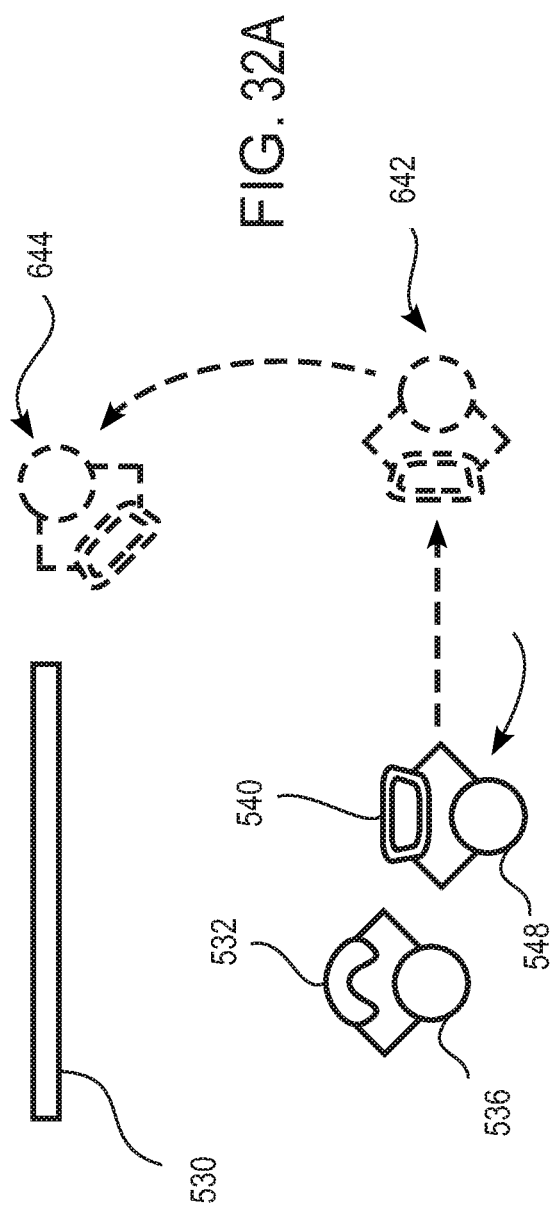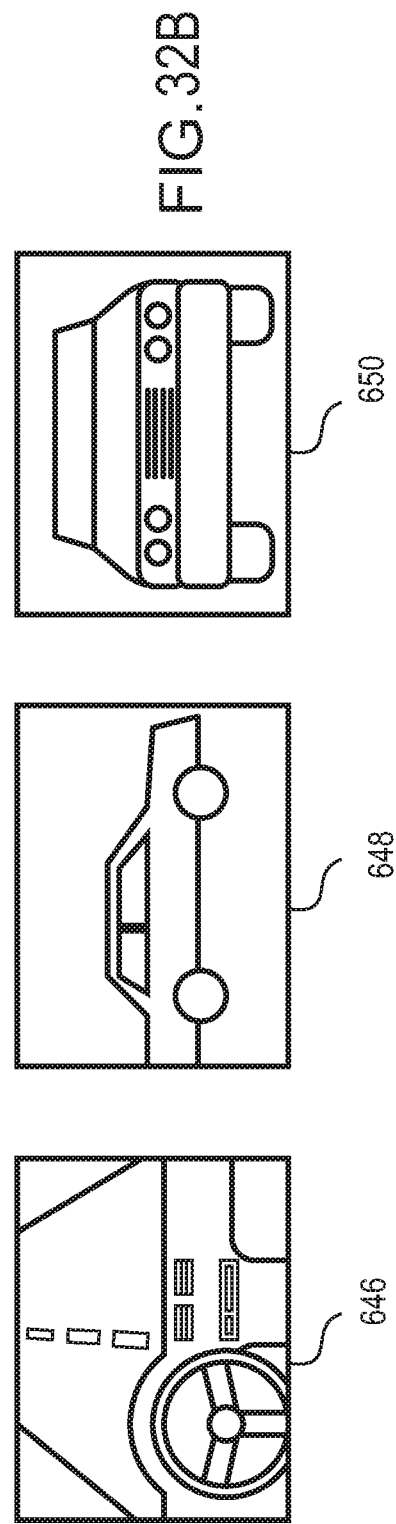

USING A PORTABLE DEVICE TO INTERACT WITH A VIRTUAL SPACE

CLAIM OF PRIORITY

This application claims priority as a continuation of U.S. patent application Ser. No. 12/903,123, filed Oct. 12, 2010, entitled "USING A PORTABLE GAMING DEVICE TO RECORD OR MODIFY A GAME OR APPLICATION IN REAL-TIME RUNNING ON A HOME GAMING SYSTEM," the disclosure of which is herein incorporated by reference in its entirety.

RELATED APPLICATIONS

This application is related to U.S. patent application Ser. No. 12/903,161, filed Oct. 12, 2010 (now issued as U.S. Pat. No. 8,854,298), entitled "SYSTEM FOR ENABLING A HANDHELD DEVICE TO CAPTURE VIDEO OF AN INTERACTIVE APPLICATION," the disclosure of which is herein incorporated by reference in its entirety.

BACKGROUND

1. Field of the Invention

The present invention relates to methods and systems for enabling interactivity with an interactive application.

2. Description of the Related Art

A growing segment of the video game industry involves the use of portable hand-held devices. Examples of such portable devices include dedicated gaming devices, such as those manufactured by Sony Computer Entertainment Inc. and others, as well as other types of portable devices such as smartphones, PDA's, digital multimedia players, etc. As the computing power of such portable devices has increased, so has the ability of the portable devices to handle increasingly complex programs and tasks.

For example, today's portable devices may include several different types of hardware integrated into a single device. Many such devices may include a color display, a camera, speakers, and an input mechanism such as buttons, a touchscreen or a stylus.

It is in this context that embodiments of the invention arise.

SUMMARY

Embodiments of the present invention provide methods and systems for enabling an interactive application which to utilize resources of a handheld device. It should be appreciated that the present invention can be implemented in numerous ways, such as a process, an apparatus, a system, a device or a method on a computer readable medium. Several inventive embodiments of the present invention are described below.

In one embodiment, a method for enabling a user to interface with an interactive application using a handheld device is provided. According to the method, a state of an interactive application is rendered to a display by transmitting a primary video stream of the interactive application from a primary processing interface to a display. The presence of a handheld device is detected in a vicinity of the primary processing interface. A data feed of the interactive application is transmitted from the primary processing interface to the handheld device. The data feed is processed on the handheld device to produce an ancillary video stream of the interactive application. The ancillary video stream is then rendered on the handheld device. Interactive input is received at the handheld device while rendering the ancillary video stream on the handheld device. The interactive input is applied to set a virtual tag, the virtual tag defining an event to be rendered to the display. The event defined by the virtual tag is rendered to the display when the state of the interactive application reaches a predetermined configuration so as to trigger execution of the virtual tag by the interactive application.

In one embodiment, the rendered ancillary video stream produces the same image as the rendered primary video stream of the interactive application.

In one embodiment, the ancillary video stream is a compressed version of the primary video stream.

In one embodiment, the rendered ancillary video stream initially produces the same image as the rendered primary video stream of the interactive application. And the rendered ancillary video stream subsequently produces a different image from the rendered primary video stream based on the received interactive input.

In one embodiment the setting of the virtual tag includes setting an object having a position within a virtual space of the interactive application. And the rendering of the event includes rendering the object at the position when the state of the interactive application renders a region including the position of the object.

In one embodiment, the object specified by the virtual tag is selected from the group consisting of text, audio, video, an item, or a character.

In one embodiment, the setting of the virtual tag includes setting an object having a temporal stamp within a virtual timeline of the interactive application. And the rendering of the event includes rendering the object when the state of the interactive application reaches a time point proximate or equivalent to the temporal stamp of the virtual tag.

In one embodiment, the rendered primary video stream indicates a first position within a virtual space of the interactive application; and the rendered ancillary video stream indicates a second position within the virtual space of the interactive application.

In one embodiment, the rendered primary video stream indicates a first position within a virtual timeline of the interactive application; and the rendered ancillary video stream indicates a second position within the virtual timeline of the interactive application.

In one embodiment, the rendered ancillary video stream provides a map of a virtual space of the interactive application. In one embodiment, the selection of a location in the map enables access to a view of the selected location rendered on the handheld device. In one embodiment, the map includes representations of one or more objects in the virtual space, the interactive input enabling control of the objects. In one embodiment, the one or more objects include characters of the interactive application, the interactive input enabling determination of an action to be performed by the characters. In various embodiments, the action may be any type of action which a character may perform in the context of the interactive application.

In one embodiment, the action is selected from the group consisting of a movement, an attack maneuver, and a defensive maneuver.

In one embodiment, the interactive input includes gesture input drawn on the map when rendered on the handheld device.

In one embodiment, controller input from a controller device is received at the console device. And the controller input is applied to modify the state of the interactive application. In one embodiment, the interactive input is received via a touchscreen interface of the handheld device.

Embodiments of the present invention provide methods and systems for enabling a handheld device to capture video of an interactive session of an interactive application presented on a main display. It should be appreciated that the present invention can be implemented in numerous ways, such as a process, an apparatus, a system, a device or a method on a computer readable medium. Several inventive embodiments of the present invention are described below.

In one embodiment, a method is provided for enabling a handheld device to capture video of an interactive session of an interactive application presented on a main display. According to the method, the interactive session of the interactive application is initiated, the interactive session defining interactivity between a user and the interactive application. Then, an initial position and orientation of a handheld device operated by a spectator is determined. A current state of the interactive application is determined based on the interactivity between the user and the interactive application, and the position and orientation of the handheld device is tracked during the interactive session. A spectator video stream of the interactive session is generated based on the current state of the interactive application and the tracked position and orientation of the handheld device. And the spectator video stream is rendered on a handheld display of the handheld device.

In one embodiment, the interactive session includes a method for the operation of receiving interactive input from a controller device operated by the user, the interactive input being utilized to determine the current state of the interactive application.

In one embodiment, an application video stream is generated based on the current state of the interactive application, and rendered on the main display. The interactive session defines interactivity between the user and the rendered application video stream.

In one embodiment, the position and orientation of the handheld device define a position and orientation of a virtual viewpoint within a virtual space defined by the interactive application. And the spectator video stream includes images of the virtual space captured from the perspective of the virtual viewpoint.

In one embodiment, the spectator video stream is transmitted from the interactive application to the handheld device so as to enable the rendering of the spectator video stream on the handheld display of the handheld device.

In one embodiment, application state data is determined based on the current state of the interactive application, and transmitted to the handheld device. The spectator video stream is generated at the handheld device based on the application state data and the tracked position and orientation of the handheld device.

In one embodiment, an environmental video stream is captured of an interactive environment in which the interactivity between the user and the interactive application occurs. The spectator video stream is generated based on the environmental video stream.

In one embodiment, the spectator video stream is generated by augmenting the environmental video stream with a virtual element.

In one embodiment, the generating of the spectator video stream includes method operations of detecting the user within the environmental video stream, and replacing at least a portion of the detected user in the environmental video stream with a virtual element. In one embodiment, the replacing includes replacing the detected user in the environmental video stream with a character of the interactive application controlled by the user.

In one embodiment, an initial position of the user is determined, and the position of the user is tracked during the interactive session. The spectator video stream is generated based on the position and orientation of the handheld device relative to the position of the user.

In one embodiment, an object within a virtual environment of the interactive application is mapped to the position of the user, wherein the position and orientation of the handheld device relative to the position of the user define a position and orientation of a virtual viewpoint within a virtual space defined by the interactive application. And the spectator video stream includes images of the virtual space captured from the perspective of the virtual viewpoint, the object being included in the images of the spectator video stream when the handheld device is oriented towards the position of the user. In one embodiment, the object is controlled by the user. In one embodiment, the object is a character of the interactive application. In another embodiment, the position of the user is determined based on the position of a controller device operated by the user.

In one embodiment, an environmental video stream is captured of an interactive environment in which the interactivity between the user and the interactive application occurs. The position of the user and the position and orientation of the handheld device relative to the position of the user are determined at least in part based on the environmental video stream.

In one embodiment, the spectator video stream is stored in a memory.

In another embodiment of the invention, a system for capturing video of an interactive session of an interactive application presented on a main display is provided. The system includes a console device for presenting the interactive application. The console device includes (i) a session module for initiating the interactive session of the interactive application, the interactive session defining interactivity between a user and the interactive application, (ii) a handheld device module for determining and tracking a position and orientation of a handheld device operated by a spectator during the interactive session, and (iii) a spectator video stream module for generating a spectator video stream of the interactive session based on a current state of the interactive application and the tracked position and orientation of the handheld device. The system further includes a handheld device, the handheld device including a handheld display for rendering the spectator video stream.

In one embodiment, the system includes a controller device operated by the user, the controller device providing interactive input, the interactive input being utilized to determine the current state of the interactive application.

In one embodiment, the console device further includes an application video stream module for generating an application video stream based on the current state of the interactive application and rendering the application video stream on the main display. And the interactive session defines interactivity between the user and the rendered application video stream.

In one embodiment, the position and orientation of the handheld device define a position and orientation of a virtual viewpoint within a virtual space defined by the interactive application. And the spectator video stream includes images of the virtual space captured from the perspective of the virtual viewpoint.

In one embodiment, the spectator video stream module transmits the spectator video stream from the interactive application to the handheld device so as to enable the rendering of the spectator video stream on the handheld display of the handheld device.

In one embodiment, the handheld device further includes an image capture device for capturing an environmental video stream of an interactive environment in which the interactivity between the user and the interactive application occurs. And the spectator video stream module generates the spectator video stream based on the environmental video stream.

In one embodiment, the spectator video stream module generates the spectator video stream by augmenting the environmental video stream with a virtual element.

In one embodiment, the spectator video stream module generates the spectator video stream by detecting the user within the environmental video stream, and replacing at least a portion of the detected user in the environmental video stream with a virtual element. In one embodiment, the replacing includes replacing the detected user in the environmental video stream with a character of the interactive application controlled by the user.

In one embodiment, the system further includes a user tracking module, the user tracking module determining an initial position of the user and tracking the position of the user during the interactive session. And the spectator video stream module generates the spectator video stream based on the position and orientation of the handheld device relative to the position of the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 28 illustrates an interactive environment shown from the perspective of a spectator, in accordance with an embodiment of the invention.

FIG. 32A illustrates an overhead view of an interactive environment, in accordance with an embodiment of the invention.

FIG. 32B depicts scenes which illustrate the video which is displayed on a handheld device when a spectator is located at positions as shown in FIG. 32A.

DETAILED DESCRIPTION

The following embodiments describe methods and apparatus for a system that enables an interactive application to utilize the resources of a handheld device. In one embodiment of the invention, a primary processing interface is provided for rendering a primary video stream of the interactive application to a display. A first user views the rendered primary video stream on the display and interacts by operating a controller device which communicates with the primary processing interface. Simultaneously, a second user operates a handheld device in the same interactive environment. The handheld device renders an ancillary video stream of the interactive application on a display of the handheld device, separate from the display showing the primary video stream. Accordingly, methods and apparatus in accordance with embodiments of the invention will now be described.

It will be obvious, however, to one skilled in the art, that the present invention may be practiced without some or all of these specific details. In other instances, well known process operations have not been described in detail in order not to unnecessarily obscure the present invention.

Figure 1:
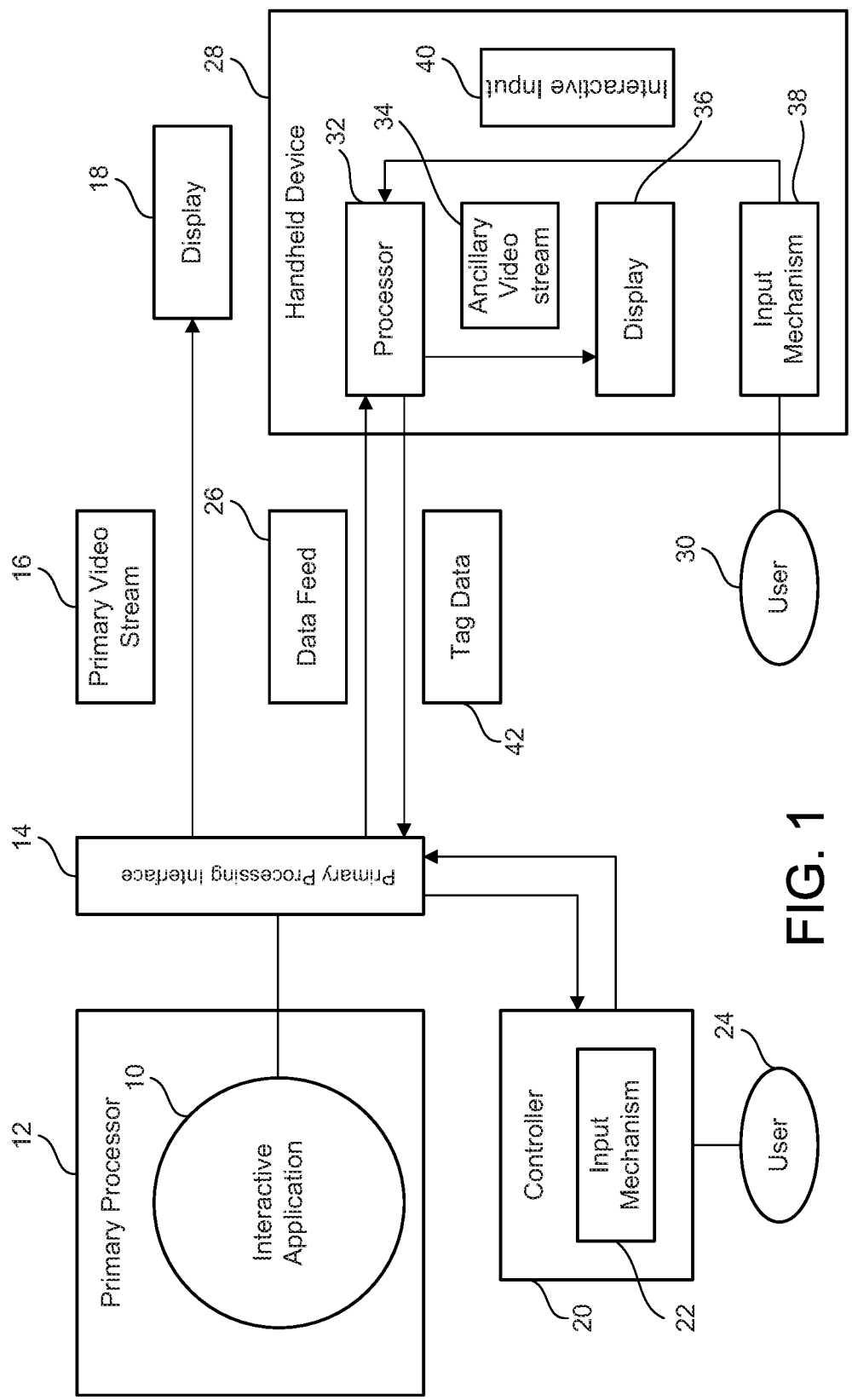
FIG. 1 illustrates a system for interfacing with an interactive application, in accordance with an embodiment of the invention.

With reference to FIG. 1, a system for interfacing with an interactive application is shown, in accordance with an embodiment of the invention. An interactive application 10 is executed by a primary processor 12. A primary processing interface 14 enables a state of the interactive application 10 to be rendered to a display 18. This is accomplished by sending a primary video stream 16 of the interactive application 10 from the primary processing interface 14 to the display 18. In some embodiments of the invention, the primary processing interface 14 and the primary processor 12 may be part of the same device, such as a computer or a console system. Or in other embodiments, the primary processing interface 14 and the primary processor 12 may be parts of separate devices (such as separate computers or console systems) which are connected either directly or via a network. The display 18 may be any of various types of displays, such as a television, monitor, projector, or any other kind of display which may be utilized to visually display a video stream.

A controller 20 is provided for interfacing with the interactive application 10. The controller includes an input mechanism 22 for receiving input from a user 24. The input mechanism 22 may include any of various kinds of input mechanisms, such as a button, joystick, touchpad, trackball, motion sensor, or any other type of input mechanism which may receive input from the user 24 useful for interacting with the interactive application 10. The controller 20 communicates with the primary processing interface 14. In one embodiment, the communication is wireless; in another embodiment, the communication occurs over a wired connection. The controller 20 transmits input data to the primary processing interface 14, which in turn may process the input data and transmit the resulting data to the interactive application 10, or simply relay the input data to the interactive application 10 directly. The input data is applied to directly affect the state of the interactive application.

A data feed 26 of the interactive application 10 is provided to a handheld device 28. The handheld device 28 provides an interface through which another user 30 interfaces with the interactive application 10. In one embodiment, the handheld device 28 communicates wirelessly with the primary processing interface 14. In another embodiment, the handheld device 28 communicates with the primary processing interface 14 over a wired connection. The handheld device 28 receives the data feed 26 and a processor 32 of the handheld device 28 processes the data feed 26 to generate an ancillary video stream 34 of the interactive application 10. The ancillary video stream 34 is rendered on a display 36 which is included in the handheld device 28.

In various embodiments, the ancillary video stream 34 may provide the same image as the primary video stream 16, or may vary from the primary video stream 16 to different degrees, including being entirely different from the rendered primary video stream 16. For example, in one embodiment, the ancillary video stream 34 provides a same image as the primary video stream 16 for a period of time, and then transitions to a different image. The transition can be triggered by input received from the handheld device 28. Additional exemplary embodiments of the rendered ancillary video stream 34 on the display 36 are explained in further detail below. The user 30 views the ancillary video stream 34 on the display 36 and interacts with it by providing input through an input mechanism 38 included in the handheld device 28. The input mechanism 38 may include any of various input mechanisms, such as buttons, a touchscreen, joystick, trackball, keyboard, stylus or any other type of input mechanism which may be included in a handheld device. The user 30 thus interacts with the rendered ancillary video stream 34 so as to provide interactive input 40 via the input mechanism 38. The interactive input 40 is processed by the processor 32 so as to determine a virtual tag data 42. The virtual tag data 42 is transmitted to the interactive application 10 via the primary processing interface 14. The virtual tag data 42 may be stored as a virtual tag, and includes information which defines an event to be rendered by the interactive application 10 when the state of the interactive application 10 reaches a certain predetermined configuration so as to trigger execution of the virtual tag by the interactive application 10. The contents of the virtual tag may vary in various embodiments, and may pertain to objects, items, characters, actions, and other types of events rendered by the interactive application 10 to the display 18.

While the embodiments described in the present specification include a user 24 who utilizes a controller 20, and a user 30 who utilizes a handheld device 28, it is contemplated that there may be various configurations of users. For example, in other embodiments, there may be one or more users who utilize controllers, and one or more users who utilize handheld devices. Or in other embodiments, there may be no users who utilize controllers, but least one user who utilizes a handheld device.

Figure 2:
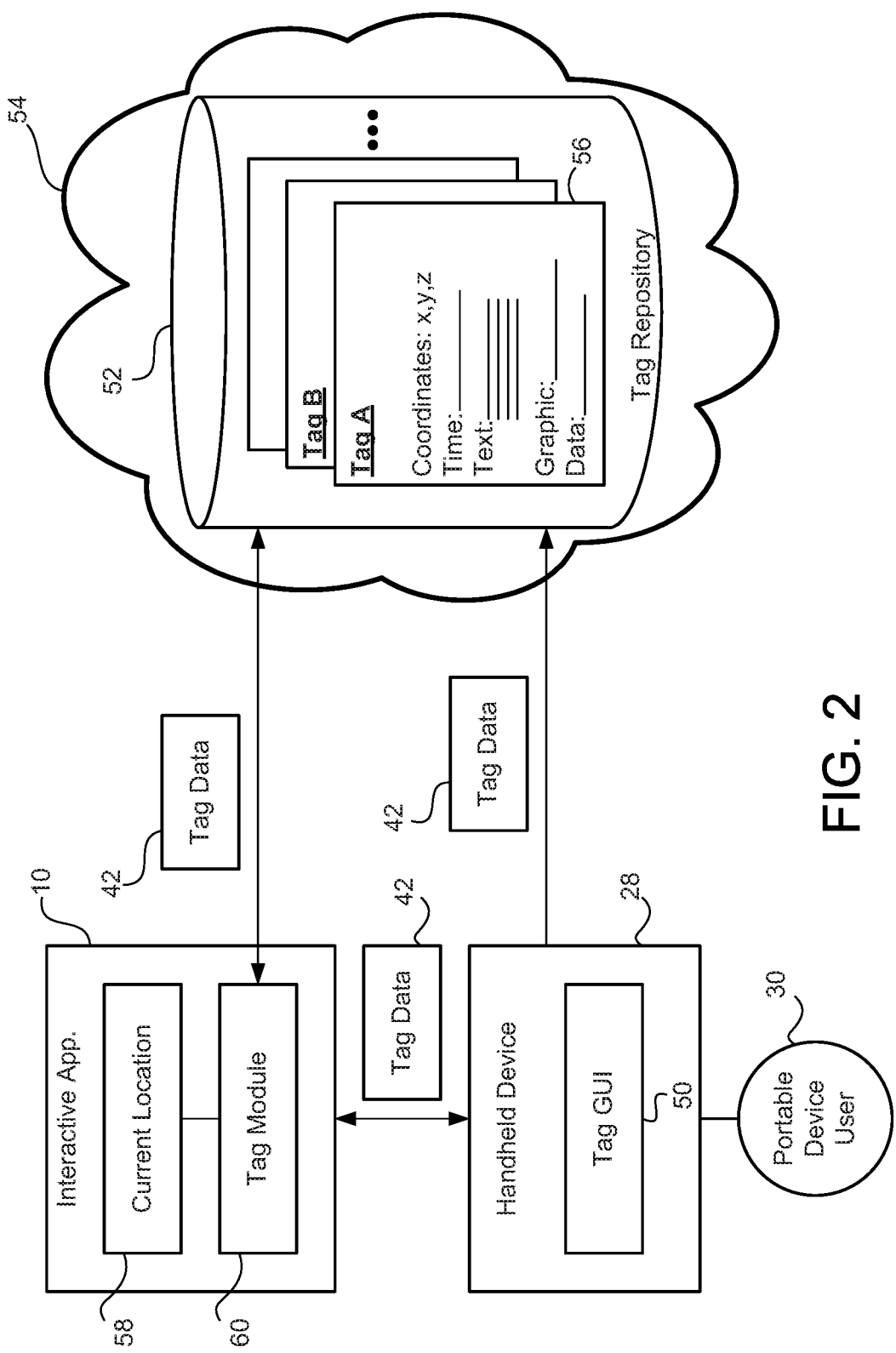
FIG. 2 illustrates a system for storing and retrieving virtual tags, in accordance with an embodiment of the invention.

With reference to FIG. 2, a system for storing and retrieving virtual tags is shown, in accordance with an embodiment of the invention. The handheld device user 30 utilizes the handheld device 28 to generate tag data 42. In one embodiment, a tag graphical user interface (GUI) module 50 is included in the handheld device for providing a GUI to the user 30 for facilitating receipt of the user's 30 provided interactive input for generation of the tag data 42. In various embodiments, the tag GUI 50 may include any of various features, including selectable menu options, tracing of touchscreen input drawn on the display, movement based on touchscreen gestures or selectable inputs, or any other type of GUI elements or features which may be useful for enabling the user 30 to provide interactive input so as to generate tag data 42.

In one embodiment, the tag data 42 is transmitted to the interactive application 10. The tag data 42 is received by a tag module 60 included in the interactive application. In some embodiments, the tag data is immediately applied by the interactive application 10 to render an event defined by the tag data. For example, the tag data might define an object that is to be rendered or affect an existing object that is already being rendered by the interactive application. The event defined by the tag data is thus applied by the interactive application, resulting in an updated state of the interactive application which includes the event. This updated state is rendered in the primary video stream 16 which is shown on the display 18, as shown in FIG. 1.

In some embodiments, the tag data 42 defines an event that is not immediately applicable, but will become applicable by the interactive application 10 when the state of the interactive application 10 reaches a certain configuration. For example, in one embodiment, the event defined by the tag data 42 may specify that an object is to be rendered at a specific location within a virtual space of the interactive application 10. Thus, when the state of the interactive application 10 reaches a configuration such that the interactive application 10 renders a region including the location defined by the tag data, then the interactive application 10 will apply the tag data so as to render the object. In another example, the tag data 42 could include a temporal stamp which specifies a time at which an event should occur within a virtual timeline of the interactive application 10. Thus, when the state of the interactive application 10 reaches the specified time, the execution of the event defined by the tag data 42 is triggered, resulting in an updated state of the interactive application 10 which includes the rendered event.

The tag module 60 may store the tag data as a tag locally. The tag module 60 may also store the tag in a tag repository 52. The tag repository 52 may be local to the interactive application 10, or may be connected to the interactive application 10 by way of a network 54, such as the Internet. The tag repository 52 stores the tags 56 for later retrieval. Each of the tags 56 may include various data defining events to be rendered by the interactive application 10. The data may include coordinate data which defines a location within a virtual space of the interactive application, time data (or a temporal stamp) which defines a time within a virtual timeline of the interactive application, text, graphical data, object or item data, character data, and other types of data which may define or affect an event or objects within the interactive application 10.

The tag repository 52 may be configured to receive tag data from multiple users, thereby aggregating tags from users who are interacting with the same interactive application. The users could interact with a same session or a same instance of the interactive application 10, or with different sessions or different instances of the same interactive application 10. In one embodiment, the tag module 60 of the interactive application 10 retrieves tag data from the tag repository 52. This may be performed based on a current location 58 of the state of the interactive application. In some embodiments, the current location 58 may be a geographical location within a virtual space of the interactive application or a temporal location within a virtual timeline of the interactive application. As the current location 58 changes based on changes in the state of the interactive application (e.g. based on input to the interactive application 10), so the tag module 60 continues to retrieve tag data from the tag repository 52 which is relevant to the current location 58. In this manner, a user of the interactive application 10 will enjoy an interactive experience with the interactive application 10 that is affected by the tag data generated from multiple other users.

In an alternative embodiment, the tag data 42 is transmitted directly from the handheld device 28 to the tag repository 52. This may occur in addition to, or in place of, transmission of the tag data 42 to the interactive application 10.

Figure 3:
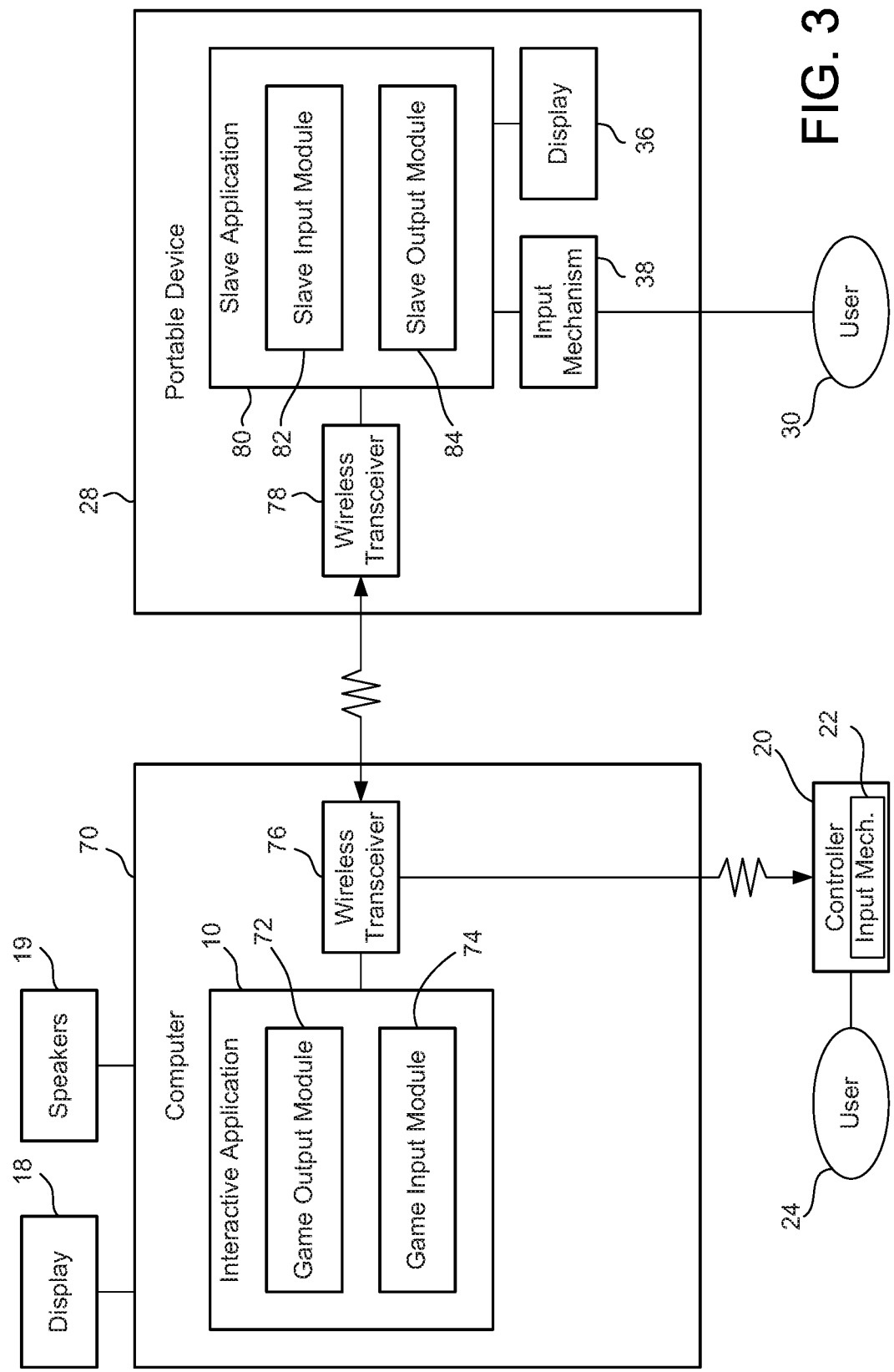
FIG. 3 illustrates a system for providing interactivity with an interactive application, in accordance with an embodiment of the invention.

With reference to FIG. 3, a system for providing interactivity with an interactive application is shown, in accordance with an embodiment of the invention. As shown, an interactive application 10 runs on a computer 70. The computer 70 may be any of various types of computing devices, such as a server, a personal computer, a gaming console system, or any other type of computing device capable of executing an interactive application. The computer 70 provides output of the interactive application 10 as a primary video stream to a display 18, so as to visually render the interactive application 10 for interactivity; and provides audio output from the interactive application 10 as a primary audio stream to speakers 19 to provide audio for interactivity.

The computer 70 further includes a wireless transceiver 76 for facilitating communication with external components. In the embodiment shown, the wireless transceiver 76 facilitates wireless communication with a controller 20 operated by a user 24, and a portable device 28 operated by a user 30. The users 24 and 30 provide input to the interactive application 10 by operating the controller 20 and portable device 28, respectively. The user 24 views primary video stream shown on the display 18, and thereby interacts with the interactive application, operating input mechanisms 22 of the controller 20 so as to provide direct input which affects the state of the interactive application 10.

Simultaneously, a data feed of the interactive application 10 is generated by a game output module 72 of the interactive application 10, and transmitted to a slave application 80 which runs on the portable device 28. More specifically, the data feed is communicated from the wireless transceiver 76 of the computer 70 to a wireless transceiver 78 of the portable device, and received by a slave input module 82 of the slave application 80. This data feed is processed by the slave application 80 so as to generate an ancillary video stream which is rendered on a display 36 of the portable device 28. The user 30 views the display 36, and thereby interacts with the ancillary video stream by operating input mechanisms 38 of the portable device 28 so as to provide input. This input is processed by the slave application 80 to generate data which communicated by a slave output module 84 of the slave application 80 to a game input module 74 of the interactive application 10 (via transceivers 78 and 76 of the portable device 28 and computer 70, respectively).

In various embodiments of the invention, the slave application 80 may be configured to provide various types of interactive interfaces for the user 30 to interact with. For example, in one embodiment, the ancillary video stream displayed on the display 36 of the portable device 28 may provide a same image as that of the primary video stream displayed on display 18. In other embodiments, the image displayed on the display 36 of the portable device 28 may be a modified version of that shown on display 18. In still other embodiments, the image displayed on the portable device 28 may be entirely different from that shown on the display 18.

Figure 4:
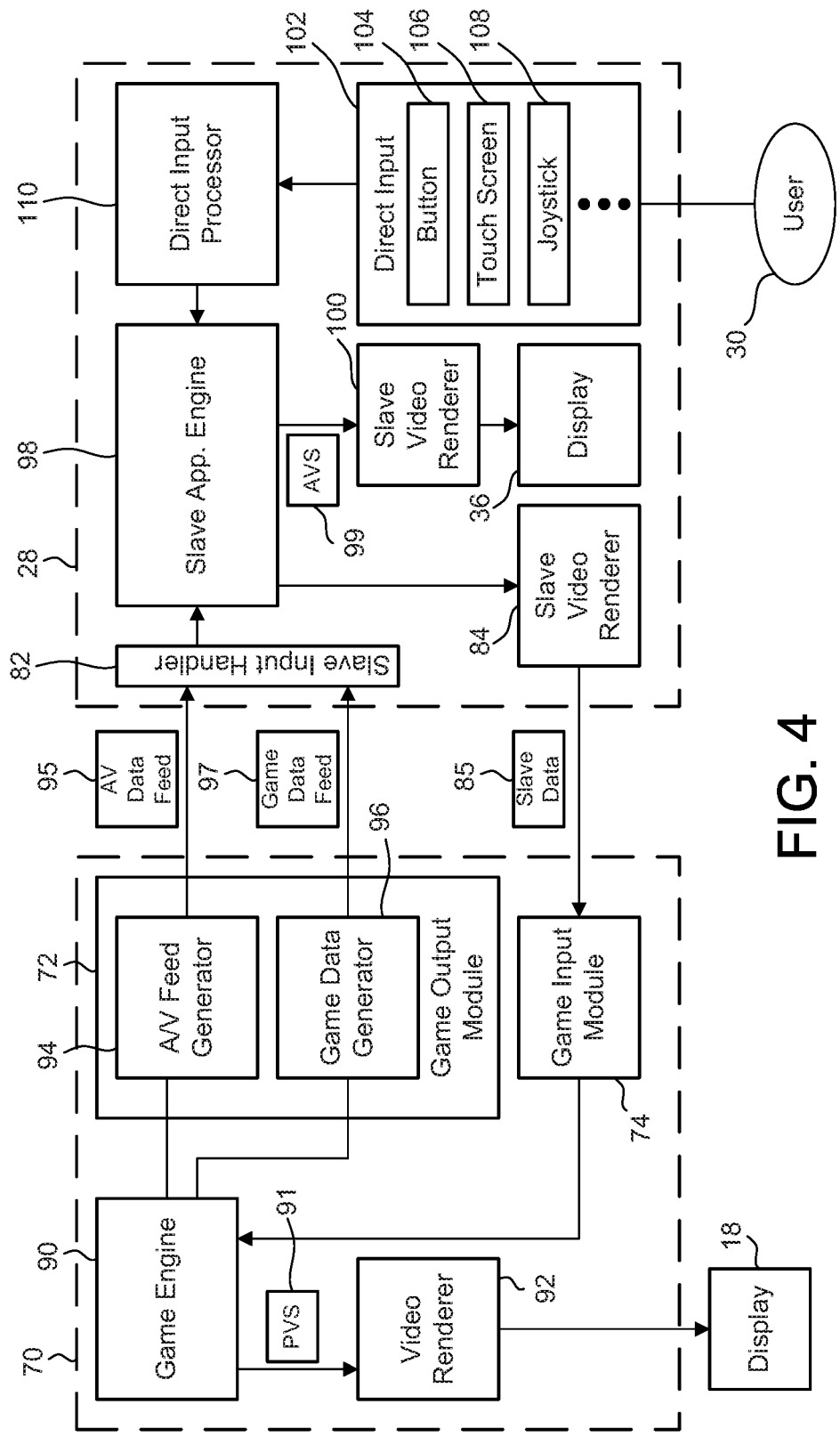
FIG. 4 illustrates a system for providing interactivity with an interactive game, in accordance with an embodiment of the invention.

With reference to FIG. 4, a system for providing interactivity with an interactive game is shown, in accordance with an embodiment of the invention. A game engine 90 continually executes to determine a current state of the interactive game. The game engine 90 provides a primary video stream 91 to a video renderer 92, which renders the primary video stream 91 on a display 18. The primary video stream 91 contains video data which represents a current state of the interactive game, and when rendered on the display 18 provides a visual representation of the interactive game for interactivity.

The game engine 90 also provides data to a game output module 72. In one embodiment, the game output module 72 includes an audio/video (AV) feed generator 94, which, based on data received from the game engine, generates an AV data feed 95 that is sent to a handheld device 28. The AV data feed 95 may include data which can be utilized by the handheld device 28 to generate an image which is the same as or substantially similar to that shown on the display 18. For example, in one embodiment, the AV data feed 95 contains a compressed, lower resolution, lower frame rate or otherwise lower bandwidth version of the primary video stream rendered on the display 18. By utilizing a lower bandwidth, the AV data feed 95 may be more easily transmitted, especially via wireless transmission technologies which typically have lower bandwidth capacities than wired transmission technologies. Additionally, the AV data feed 95 may be so configured to utilize less bandwidth, as the smaller display 36 of the handheld device typically will have a lower resolution than the display 18, and therefore does not require the full amount of data provided in the primary video stream 91.

The game output module 72 may also include a game data generator 96, which, based on data received from the game engine, generates a game data feed 97 that is sent to the handheld device 28. The game data feed 97 may include various types of data regarding the state of the interactive game. At the handheld device 28, the AV data feed 95 and the game data feed 97 are received by a slave input handler 82, which initially processes the data feeds. A slave application engine 98 executes on the handheld device 28 so as to provide an interactive interface to the user 30. The slave application engine 98 generates an ancillary video stream 99 based on the data feeds. The ancillary video stream 99 is rendered by a slave video renderer 100 on a display 36 of the handheld device 28.

The user 30 views the rendered ancillary video stream on the display 36, and interacts with the displayed image by providing direct input 102 through various input mechanisms of the handheld device 28. Examples of direct input 102 include button input 104, touchscreen input 106, and joystick input 108, though other types of input may be included in the direct input 102. The direct input 102 is processed by a direct input processor 110 for use by the slave application engine 98. Based on the processed direct input, as well as the data feeds provided from the computer 70, the slave application engine 98 updates its state of execution, which is then reflected in the ancillary video stream 99 that is rendered on the display 36. A slave output generator 84 generates slave data 85 based on the state of the slave application engine 98, and provides the slave data 85 to a game input module 74 of the interactive game. The slave data 85 may include various types of data, such as data which may be utilized by the game engine 90 to affect its state of execution, or tag data which affects the state of the game engine when the state of the game engine reaches a particular configuration.

Figure 5:
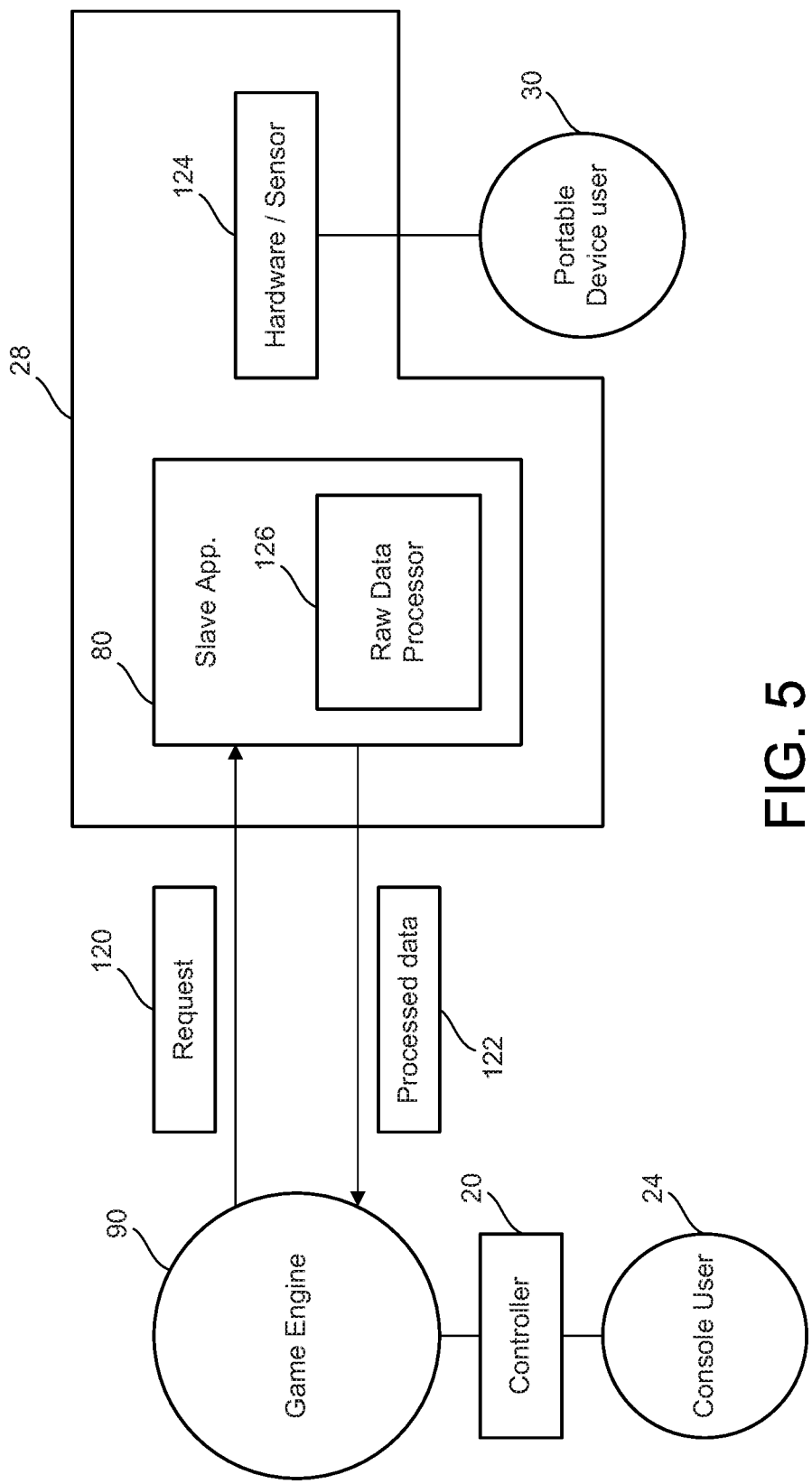
FIG. 5 illustrates a system for enabling an interactive application to utilize resources of a handheld device, in accordance with an embodiment of the invention.

With reference to FIG. 5, a system for enabling an interactive application 90 to utilize resources of a handheld device 28 is shown, in accordance with an embodiment of the invention. As shown, the interactive application or game engine 90 generates a request 120 to utilize a resource of a handheld device 28. The request 120 is sent to a slave application 80 which runs on the handheld device 28. The slave application 80 processes the request 120 to determine what resource of the handheld device 28 to utilize. A resource of the handheld device may be any device or function included in the handheld device 28. For example, resources of the handheld device 28 may include the handheld device's processing power, including its processors and memory. Resources of the handheld device 28 may also include devices, sensors or hardware such as a camera, motion sensor, microphone, bio-signal sensor, touchscreen, or other hardware included in the handheld device.

Based on the request 120, the slave application 80 initiates operation of or detection from the hardware or sensor 124. A user 30 who operates the handheld device 28 may, depending upon the nature of the hardware 124, exercise control of the hardware to various degrees. For example, in the case where the hardware 124 is a camera, then the user 30 might control the camera's direction and orientation. Whereas, in the case where the hardware is a processor or memory of the handheld device 28, the user 30 might exercise very little or no direct control over the hardware's operation. In one embodiment, the operation of hardware 124 generates raw data which is processed by a raw data processor 126 of the slave application 80. The processing of the raw data produces processed data 122 which is sent to the interactive application 90. Thus, the interactive application 90 receives the processed data 122 in response to its initial request 120.

It will be appreciated by those skilled in the art that numerous examples may be provided wherein an interactive application 90 utilizes resources of a handheld device 28, as presently described. In one embodiment, the interactive application 90 utilizes the processing resources of the handheld device, such as its processor and memory, to offload processing of one or more tasks of the interactive application 90. In another embodiment, the interactive application 90 utilizes a camera of the handheld device 28 to capture video or still images. In one embodiment, the interactive application 90 utilizes a microphone of the handheld device 28 to capture audio from an interactive environment. In another embodiment, the interactive application 90 utilizes motion sensors of the handheld device 28 to receive motion-based input from a user. In other embodiments, the interactive application 90 may utilize any other resources included in the handheld device 28.

Figure 6:
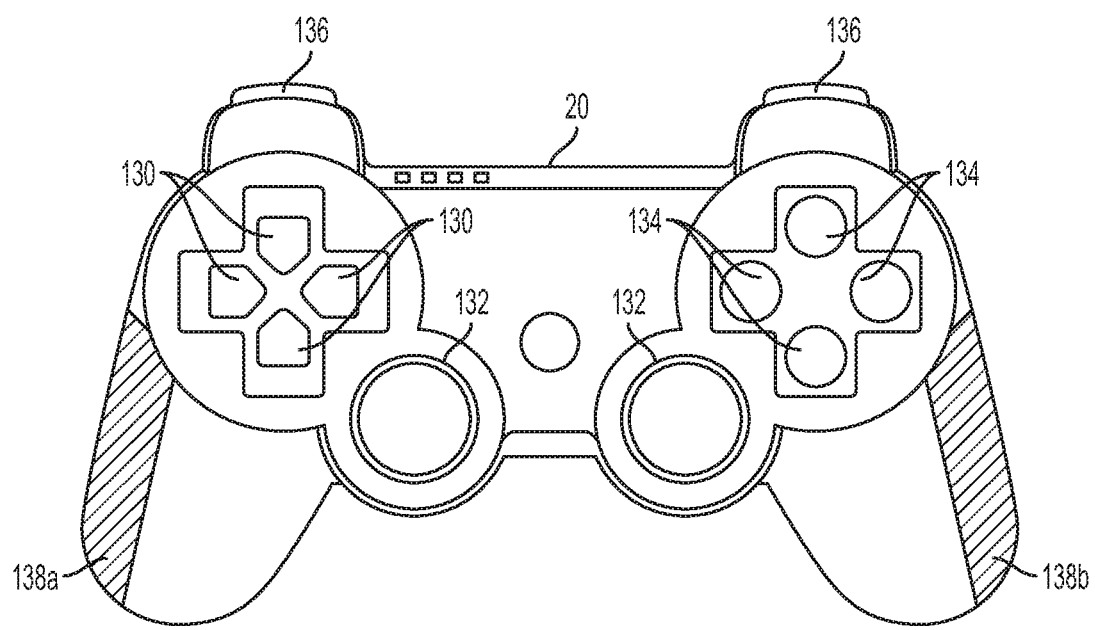
FIG. 6 illustrates a controller for interfacing with an interactive program, in accordance with an embodiment of the invention.

With reference to FIG. 6, a controller for interfacing with an interactive program is shown, in accordance with an embodiment of the invention. The controller 20 is of a type utilized to interface with a computer or primary processing interface, such as a personal computer, gaming console, or other type of computing device which executes or otherwise renders or presents an interactive application. The controller 20 may communicate with the computer via a wired or wireless connection. In other embodiments, the interactive application may be executed by a computing device which is accessible via a network, such as a LAN, WAN, the Internet, and other types of networks. In such embodiments, input detected by the controller is communicated over the network to the interactive application. The input from the controller may first be received by a local device which may process the input and transmit data containing the input or data based on the input to the networked device executing the interactive application. A user provides input to the interactive application via the controller 20, utilizing hardware of the controller 20, such as directional pad 130, joysticks 132, buttons 134, and triggers 136. The controller 20 also includes electrodes 138a and 138b for detecting bio-electric signals from the user. The bio-electric signals may be processed to determine biometric data that is used as an input for the interactive program.

Figure 7:
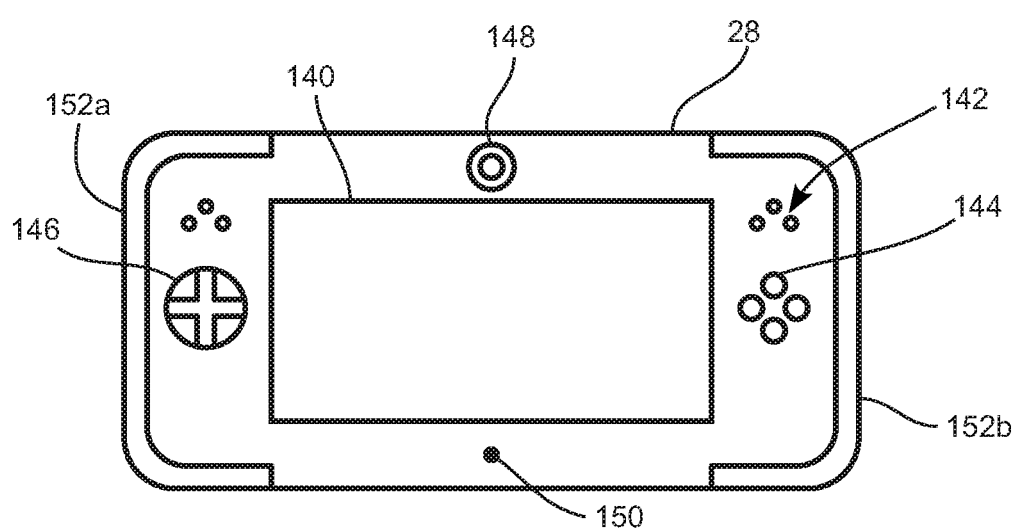
FIG. 7 illustrates a front view of an exemplary portable handheld device, in accordance with an embodiment of the invention.

With reference to FIG. 7, a front view of an exemplary portable handheld device 28 is shown, in accordance with an embodiment of the invention. The handheld device 28 includes a display 140 for displaying graphics. In embodiments of the invention, the display 140 is utilized to show interactive content in real-time. In various embodiments of the invention, the display 140 may incorporate any of various display technologies, such as touch-sensitivity. The handheld device 28 includes speakers 142 for facilitating audio output. The audio output from speakers 142 may include any sounds relating to the interactive content, such as sounds of a character, background sounds, soundtrack audio, sounds from a remote user, or any other type of sound.

The handheld device 28 includes buttons 144 and directional pad 146, which function as input mechanisms for receiving input from a user of the portable device. In embodiments of the invention, it is contemplated that any of various other types of input mechanisms may be included in the handheld device 28. Other examples of input mechanisms may include a stylus, touch-screen, keyboard, keypad, touchpad, trackball, joystick, trigger, or any other type of input mechanism which may be useful for receiving user input.

A front-facing camera 148 is provided for capturing images and video of a user of the portable handheld device 28, or of other objects or scenery which are in front of the portable device 28. Though not shown, a rear-facing camera may also be included for capturing images or video of a scene behind the handheld device 28. Additionally, a microphone 150 is included for capturing audio from the surrounding area, such as sounds or speech made by a user of the portable device 28 or other sounds in an interactive area in which the portable device 28 is being used.

A left electrode 152a and a right electrode 152b are provided for detecting bio-electric signals from the left and right hands of a user holding the handheld device. The left and right electrodes 152a and 152b contact the left and right hands, respectively, of the user when the user holds the handheld device 28. In various other embodiments of the invention, electrodes included in a handheld device for detecting biometric data from a user may have any of various other configurations.

Figure 8:
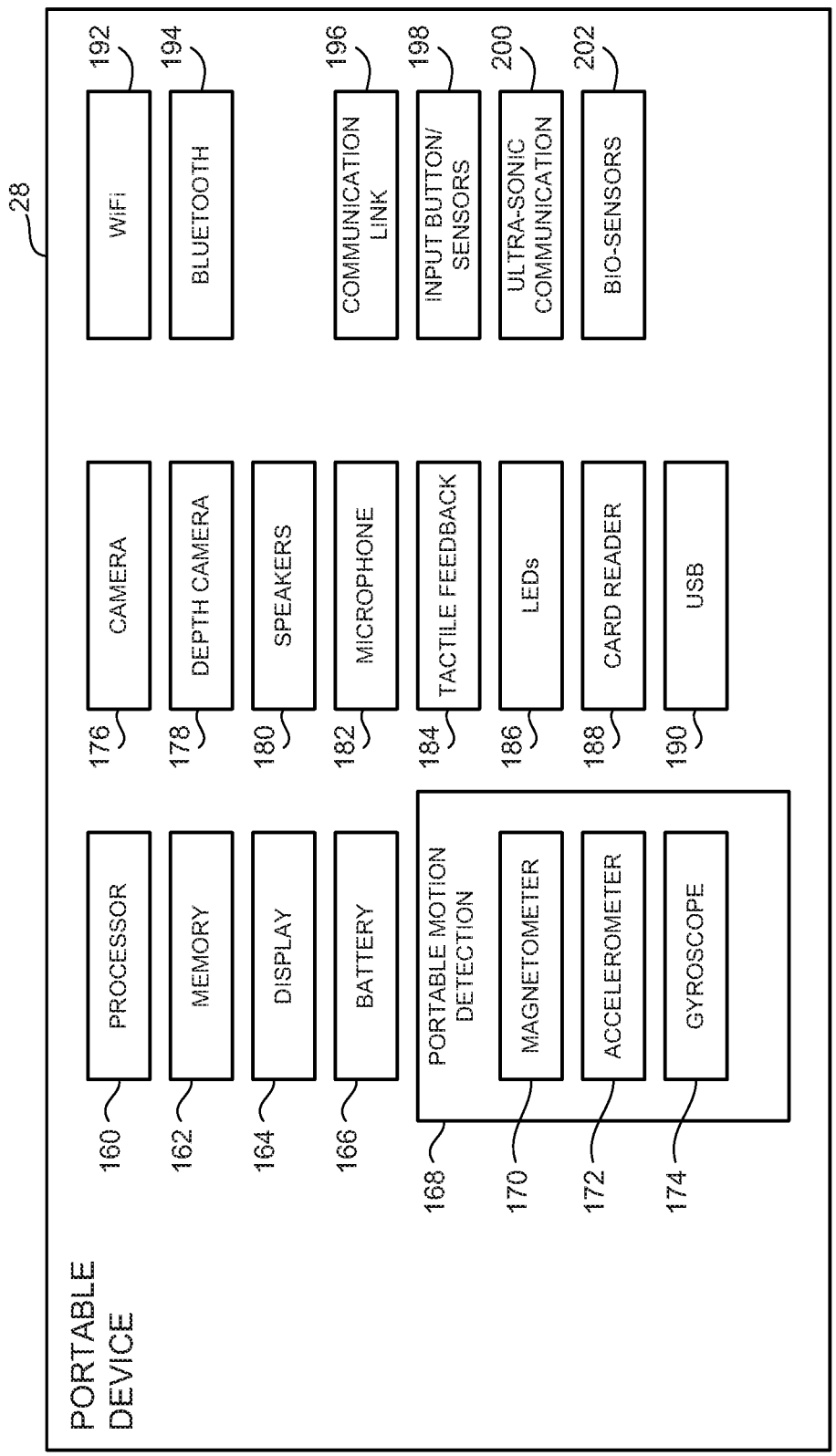
FIG. 8 illustrates a diagram showing components of a portable device, in accordance with an embodiment of the invention.

With reference to FIG. 8, a diagram illustrating components of a portable device 10 is shown, in accordance with an embodiment of the invention. The portable device 10 includes a processor 160 for executing program instructions.

A memory 162 is provided for storage purposes, and may include both volatile and non-volatile memory. A display 164 is included which provides a visual interface that a user may view. A battery 166 is provided as a power source for the portable device 10. A motion detection module 168 may include any of various kinds of motion sensitive hardware, such as a magnetometer 170, an accelerometer 172, and a gyroscope 174.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 172 are used to provide the direction of gravity, which gives an absolute reference for two angles (world-space pitch and world-space roll).

A magnetometer measures the strength and direction of the magnetic field in the vicinity of the controller. In one embodiment, three magnetometers 170 are used within the controller, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 172 is used together with magnetometer 170 to obtain the inclination and azimuth of the portable device 28.

A gyroscope is a device for measuring or maintaining orientation, based on the principles of angular momentum. In one embodiment, three gyroscopes 174 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 176 is provided for capturing images and image streams of a real environment. More than one camera may be included in the portable device 28, including a camera that is rear-facing (directed away from a user when the user is viewing the display of the portable device), and a camera that is front-facing (directed towards the user when the user is viewing the display of the portable device). Additionally, a depth camera 178 may be included in the portable device for sensing depth information of objects in a real environment.

The portable device 10 includes speakers 180 for providing audio output. Also, a microphone 182 may be included for capturing audio from the real environment, including sounds from the ambient environment, speech made by the user, etc. The portable device 28 includes tactile feedback module 184 for providing tactile feedback to the user. In one embodiment, the tactile feedback module 184 is capable of causing movement and/or vibration of the portable device 28 so as to provide tactile feedback to the user.

LEDs 186 are provided as visual indicators of statuses of the portable device 28. For example, an LED may indicate battery level, power on, etc. A card reader 188 is provided to enable the portable device 28 to read and write information to and from a memory card. A USB interface 190 is included as one example of an interface for enabling connection of peripheral devices, or connection to other devices, such as other portable devices, computers, etc. In various embodiments of the portable device 28, any of various kinds of interfaces may be included to enable greater connectivity of the portable device 28.

A WiFi module 192 is included for enabling connection to the Internet via wireless networking technologies. Also, the portable device 28 includes a Bluetooth module 194 for enabling wireless connection to other devices. A communications link 196 may also be included for connection to other devices. In one embodiment, the communications link 196 utilizes infrared transmission for wireless communication. In other embodiments, the communications link 196 may utilize any of various wireless or wired transmission protocols for communication with other devices.

Input buttons/sensors 198 are included to provide an input interface for the user. Any of various kinds of input interfaces may be included, such as buttons, touchpad, joystick, trackball, etc. An ultra-sonic communication module 200 may be included in portable device 28 for facilitating communication with other devices via ultra-sonic technologies.

Bio-sensors 202 are included to enable detection of physiological data from a user. In one embodiment, the bio-sensors 202 include one or more dry electrodes for detecting bio-electric signals of the user through the user's skin.

The foregoing components of portable device 28 have been described as merely exemplary components that may be included in portable device 28. In various embodiments of the invention, the portable device 28 may or may not include some of the various aforementioned components. Embodiments of the portable device 28 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The following exemplary embodiments are provided by way of example only, and not by way of limitation.

Figure 9:
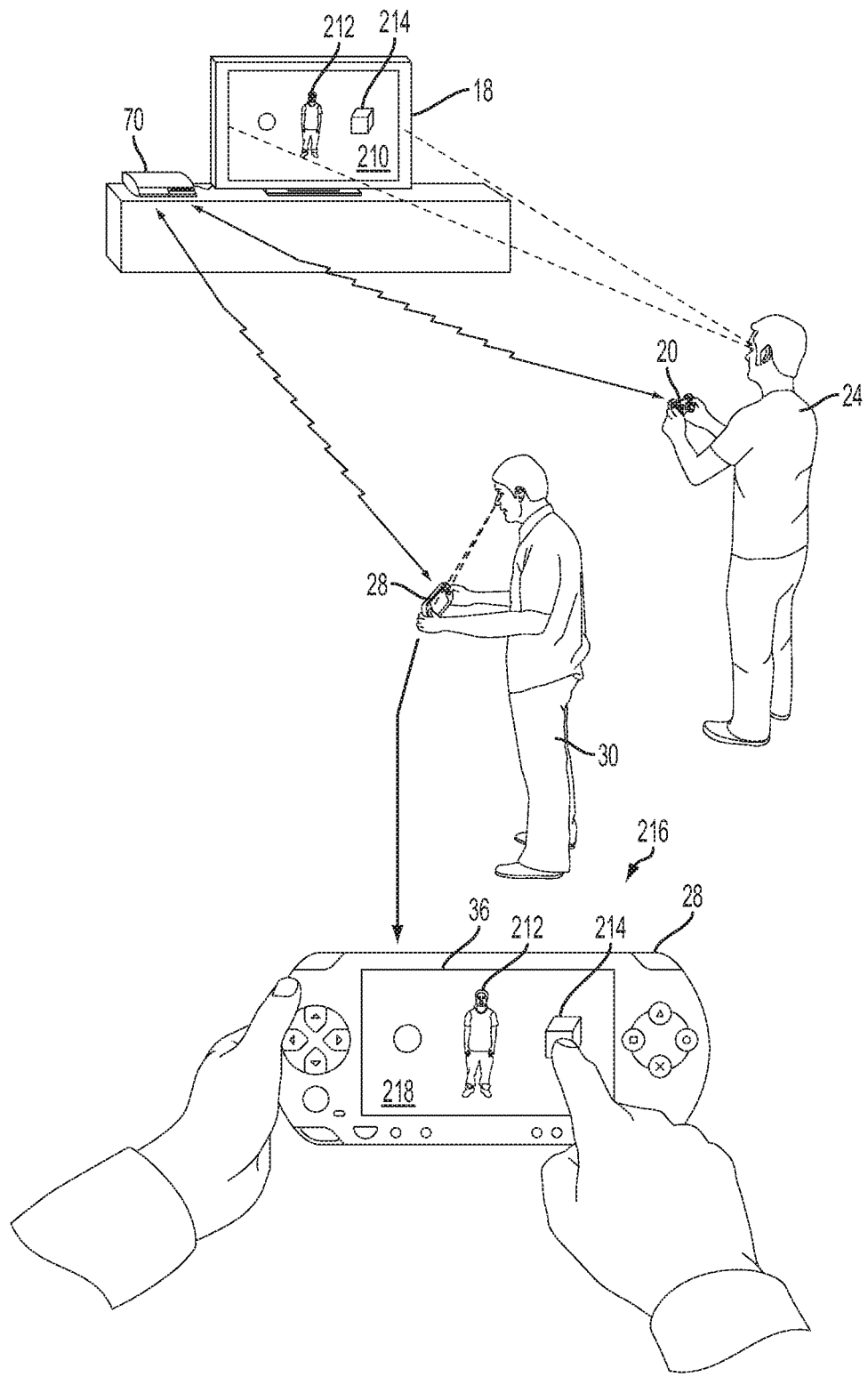
FIG. 9 illustrates an interactive environment, in accordance with an embodiment of the invention.

With reference to FIG. 9, an interactive environment is shown, in accordance with an embodiment of the invention. A console or computer 70 executes an interactive application which generates a primary video stream that is rendered on a display 18. As shown, the rendered primary video stream depicts a scene 210, which may include a character 212, an object 214, or any other item depicted by the interactive application. A user 24 views the scene 210 on the display 18, and interacts with the interactive application by operating a controller 20. The controller 20 enables the user 24 to directly affect the state of the interactive application, which is then updated and reflected in the primary video stream that is rendered on the display 18.

Simultaneously, another user 30 views and operates a handheld device 28 in the interactive environment. The handheld device 28 receives an auxiliary or ancillary video stream from the computer 70 that is then rendered on the display 36 of the handheld device 28. As shown in the presently described embodiment by the magnified view 216 of the handheld device 28, the rendered ancillary video stream depicts a scene 218 that is substantially similar to or the same as that rendered by the primary video stream on the display 18. The user 30 views this scene 218 and is able to interact with the scene 218 by various input mechanisms of the handheld device, such as providing input through a touchscreen or activating other input mechanisms such as buttons, a joystick, or motion sensors.

In various embodiments of the invention, the particular interactive functionality enabled on the handheld device 28 may vary. For example, a user may record the ancillary video stream on the handheld device 28. The recorded ancillary video stream may be uploaded to a website for sharing with others. Or in one embodiment a user can select an object, such as object 214, by tapping on the object 214 when displayed on the display 36. Selection of the object 214 may then enable the user 30 to perform some function related to the object 214, such as modifying the object, moving it, adding a tag containing descriptive or other kinds of information, etc.

In one embodiment, the scene 218 shown on the display 36 of the handheld device 28 will be the same as that of scene 210 shown on the display 18 until the user 30 provides some type of input, such as may occur by touching the touchscreen or pushing a button of the handheld device 28. At this point, then the ancillary video stream rendered on the handheld device 28 will no longer depict the same scene as the primary video stream rendered on the display 18, but instead diverges from that depicted by the primary video stream, as the user 30 provides interactive input independently of the interactivity occurring between the user 24 and the scene 210.

For example, in one embodiment, touching or tapping the display 36 of the handheld device causes the scene 218 to freeze or pause, thus enabling the user 30 to perform interactive operations with the scene 218. Meanwhile, the scene 210 shown on the display 18 continues to progress as the user 24 operates the controller 20 or otherwise interacts with the scene 210. In another embodiment, the scene 218 does not freeze, but rather the perspective or point of view represented by the scene 218 may be altered based on input provided by the user 30. In one embodiment, the input provided by the user 30 includes gesture input which is detected as the user 30 moves a finger across the display 28. In still other embodiments, the divergence of the scene 218 shown on the display 36 of the handheld device 28 from the scene 210 shown on the display 18 may include any of various other types of changes. For example, the scene 218 might be altered in appearance, color, lighting, or other visual aspects from the scene 210. In one embodiment, the appearance of scene 218 differs from that of scene 210 in such a manner as to highlight certain features within the scene. For example, in the context of an interactive game such as a first-person shooter type game, the scene 218 might portray a view based on infrared lighting, UV lighting, night-vision, or some other type of altered visual mode. In other embodiments, the scene 218 might be slowed down or speeded up relative to the scene 210. In still other embodiments, information might be visible in the scene 218 which is not visible in the scene 210. Such information may include textual information, markers or indicators, color schemes, highlighting, or other depictions which provide information to the user 30 viewing the scene 218.

Figure 10:
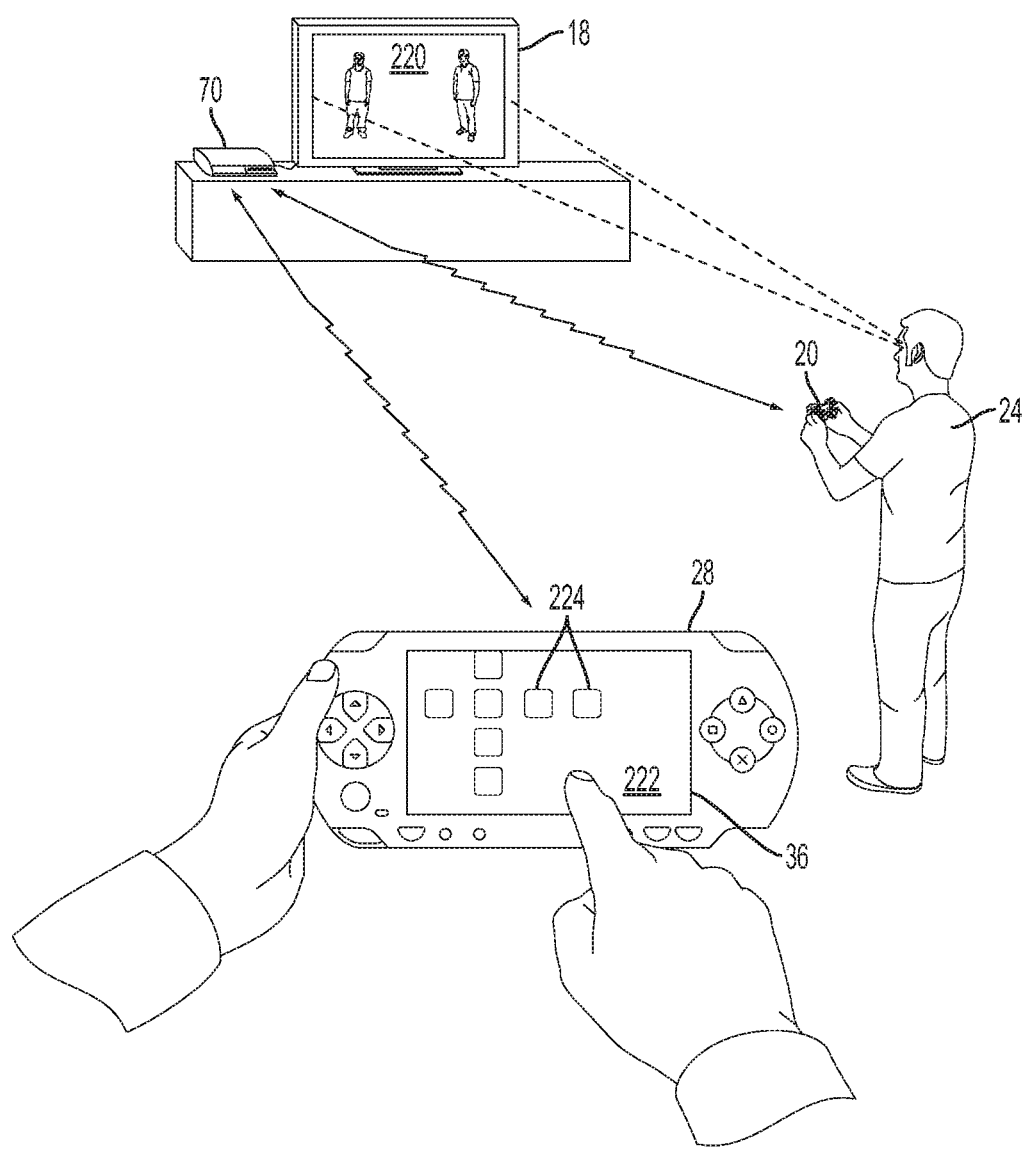
FIG. 10 illustrates an interactive environment, in accordance with an embodiment of the invention.

With reference to FIG. 10, an interactive environment is shown, in accordance with an embodiment of the invention. As shown, a computer 70 is configured to render a primary video stream of an interactive application to a display 18. The result of rendering the primary video stream is the depiction of a scene 220 on the display 18. A user 24 views the scene 220 and operates a controller 20 to provide input to the interactive application. In one embodiment, the controller communicates wirelessly with the computer 70. Simultaneously, a second user 30 views a related scene 222 on a display 36 of a handheld device 28. As shown in the illustrated embodiment, the scene 222 comprises a menu including selectable icons 224. In various embodiments of the invention, a menu as included in scene 222 may enable various functions related to the interactive application. In this manner, the user 30 is able to affect the interactive application through a menu interface, independently of the interactivity between the user 24 and the scene 220.

Figure 11:
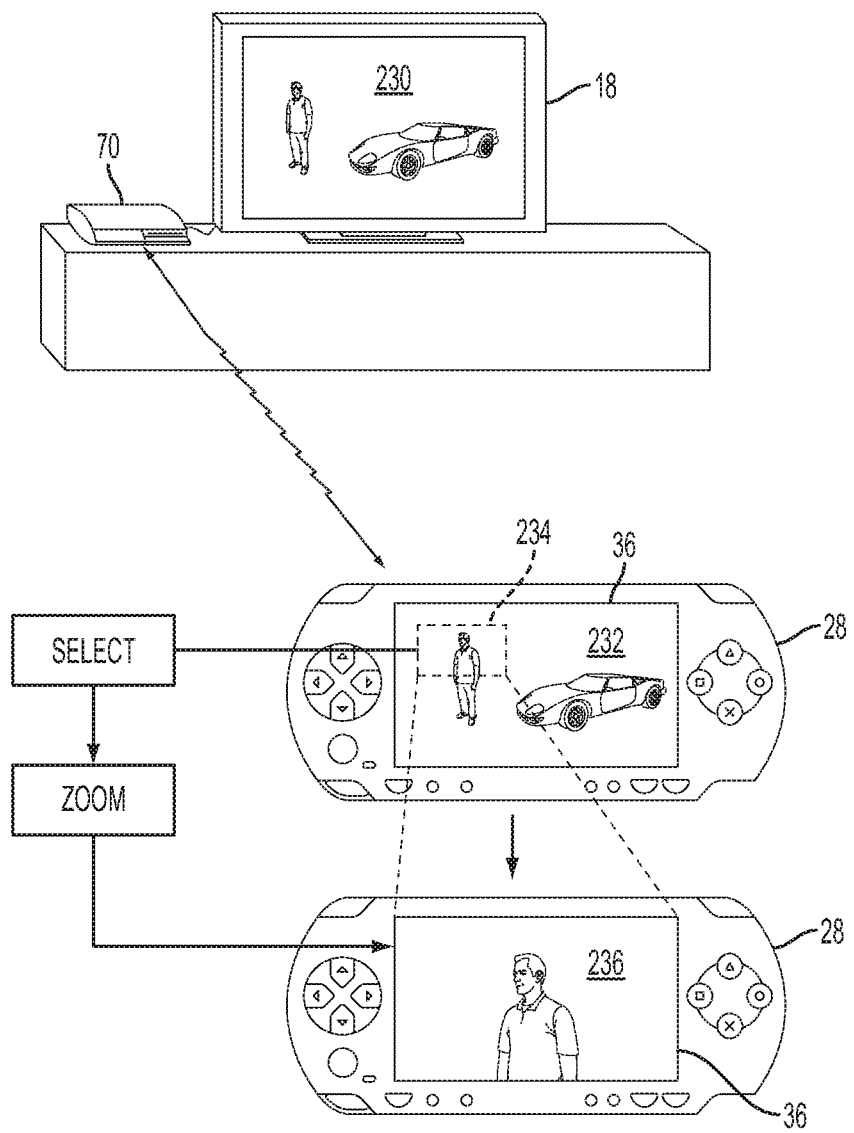
FIG. 11 illustrates an interactive environment, in accordance with an embodiment of the invention.

With reference to FIG. 11, an interactive environment is shown, in accordance with an embodiment of the invention. A computer 70 renders a primary video stream of an interactive application on a display 18, so as to depict a scene 230. Simultaneously, an ancillary video stream is rendered on a display 36 of a handheld device 28, which depicts a scene 232 that is substantially similar or the same as scene 230 shown on the display 18. A user operating the handheld device 28 is able to select an area 234 of the scene 232, and zoom in on the area 234, as shown by the updated scene 236.

Selection of the area 234 may occur by various mechanisms, such as by touch or gesture input detected on the display 36 through touchscreen technology. In one embodiment, a user can draw or otherwise designate a box to determine the area 234 that is to be magnified. In this manner, a user is able to zoom in on an area of interest within a scene 230 shown on a separate display 18. In some embodiments, operation of such a selection feature causes the scene 232 shown on the handheld device 28 to freeze or pause; whereas in other embodiments, the scene 232 does not freeze. In some embodiments, operation of such a selection feature causes both the scene 230 shown on the display 18 and the scene 232 shown on the handheld device 28 to pause; whereas in other embodiments, only the scene 232 shown on the handheld device freezes. In one embodiment, the primary and ancillary video streams are synchronized so that when a user selects or zooms in on an area in the scene 232 shown on the handheld device 28, a substantially similar or same effect occurs in the scene 230 shown on the display 18.

While the illustrated embodiment has been described with reference to zoom or magnification functionality, it will be appreciated that in other embodiments of the invention, a selection feature as presently described may enable other types of functions. For example, after selection of an area or region of a scene, it may be possible to perform various functions on the selected area, such as adjusting visual properties, setting a virtual tag, adding items, editing the selected area, etc. In other embodiments of the invention, any of various other types of functions may be performed after selection of an area of a scene.

Figure 12:
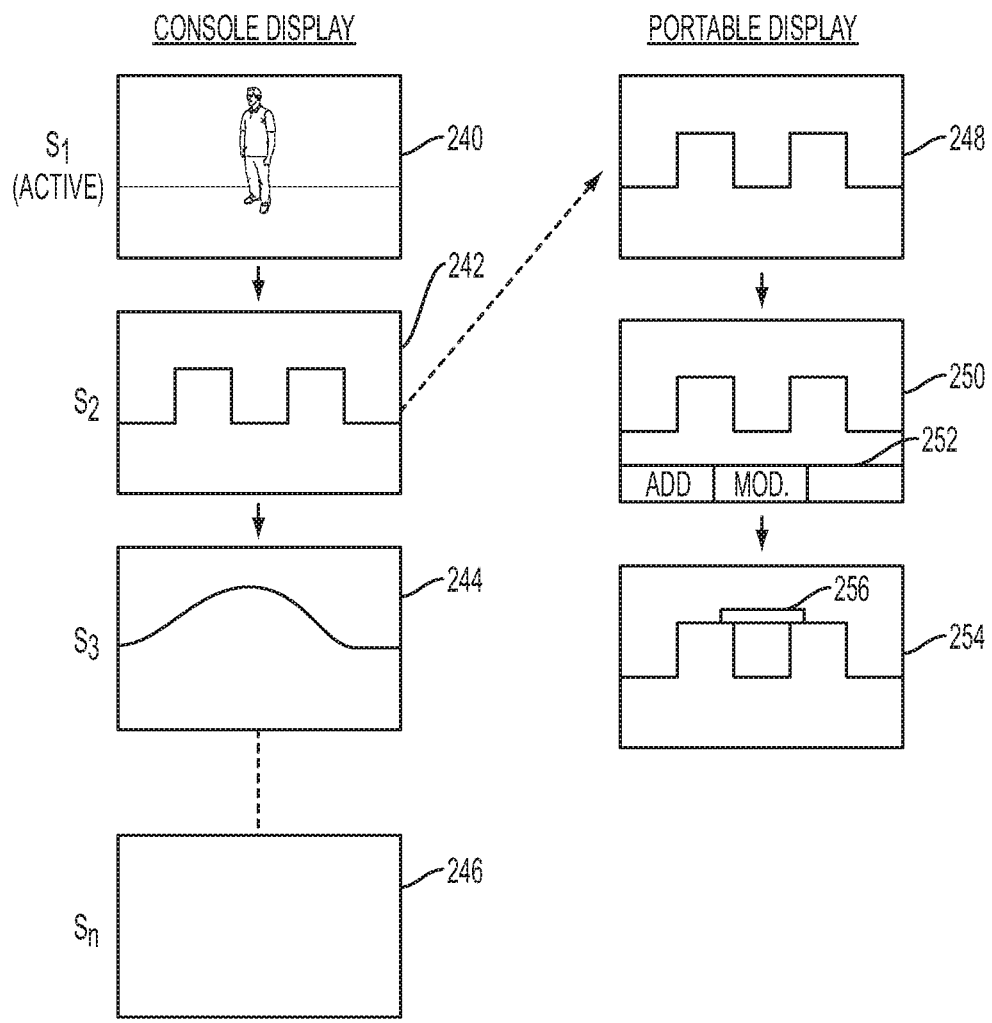
FIG. 12 illustrates a conceptual diagram illustrating scenes within an interactive game, in accordance with an embodiment of the invention.

With reference to FIG. 12, a conceptual diagram illustrating scenes within an interactive game is shown, in accordance with an embodiment of the invention. As shown, the interactive game includes a series of scenes 240, 242, and 244, through scene 246. As a player progresses through the interactive game, the player interacts with the scenes 240, 242, and 244 through scene 246 in a sequential fashion. As shown, the player first interacts with scene 240, followed by scenes 242, 244, and eventually scene 246. The player interacts with the scenes by viewing them on a display that is connected to a computer or console system, the computer being configured to render the scenes on the display. In the illustrated embodiment, the scene 240 is a currently active scene which the player is currently playing.

Simultaneously, a second player is able to select one of the scenes for display on a portable device. The scene selected by the second player may be a different scene from the active scene 240 which the first player is currently playing. As shown by way of example, the second player has selected the scene 242 for display and interaction on the portable device. The scene 248 shown on the portable device corresponds to scene 242. The second player is able to interact with the scene 248 in various ways, such as navigating temporally or spatially within the scene, or performing modifications to the scene. By way of example, in one embodiment, the second player using the portable device is able to select from options presented on a menu 252 as shown at scene 250. Options may include various choices for altering or modifying the scene, such as adding an object, moving an object, adding a virtual tag, etc. As shown at scene 254, the second player has altered the scene by adding an object 256.

Changes to a scene made by the second player can be seen by the first player, as these changes will be shown in the scene rendered on the display when the first player reaches the same spatial or temporal location in the scene. Thus in the illustrated embodiment, when the first player reaches the scene 242, the first player will see the object 256 which has been placed by the second player. According to the presently described embodiment, it is possible for a second player to look ahead within the gameplay sequence of an interactive game, so as to alter scenes which the first player will encounter when the first player reaches the same spatial or temporal location. In various embodiments, the interactive game may be designed so as to establish cooperative gameplay, wherein the second player, by looking ahead within the gameplay sequence, aids the first player in playing the game. For example, the second player may tag particular items or locations with descriptive information or hints that will be useful to the first player. Or the second player might alter a scene by adding objects, or performing other modifications to a scene that would be helpful to the first player when the first player reaches the same location in the scene. In other embodiments of the invention, the interactive game may be designed so that the first and second players compete against each other. For example, the second player might look ahead within the gameplay sequence and set obstacles for the first player to encounter when the first player reaches a certain location.

Figure 13:
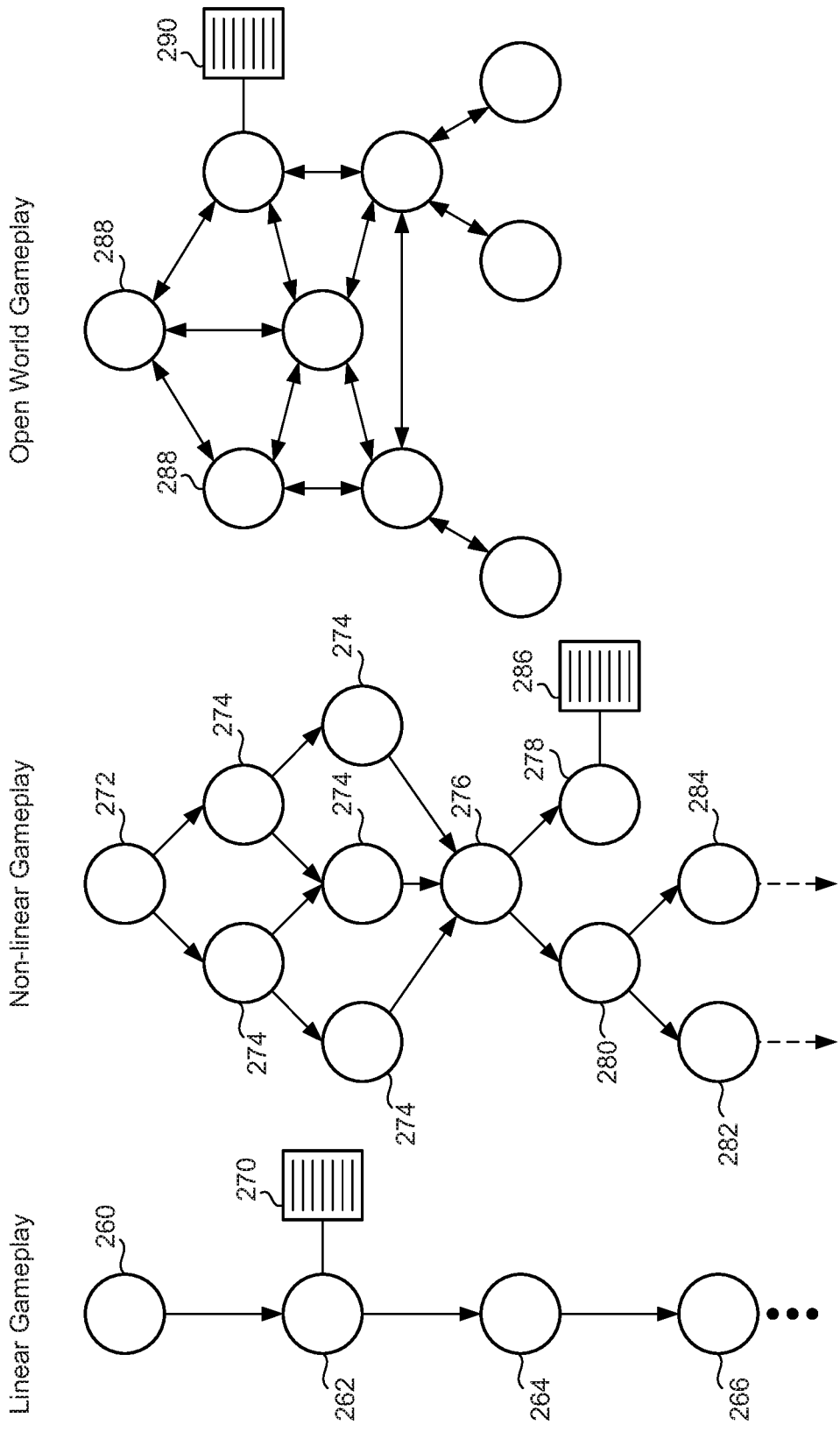
FIGS. 13A, 13B, and 13C illustrates various styles of gameplay, in accordance with embodiments of the invention.

In various embodiments, the principles of the present invention may be applied to various styles of gameplay. For example, with reference to FIGS. 13A, 13B, and 13C, various styles of gameplay are shown. FIG. 13A illustrates a linear style of gameplay, in accordance with an embodiment of the invention. As shown, the gameplay comprises a plurality of scenes or nodes 260, 262, 264 and 266. The scenes may be spatial or temporal locations of an interactive game, and are encountered in a predetermined order by the user as the user progresses through the interactive game. As shown, after completion of scene 260, the user encounters scene 262, followed by scenes 264 and 266 in order. According to principles of the invention herein described, a second user utilizing a handheld device may skip ahead to one of the scenes which the first user has yet to encounter, and perform modifications of the scene or set virtual tags associated with the scene. By way of example, in the illustrated embodiment, virtual tags 270 are associated with the scene 262.

FIG. 13B illustrates a non-linear style of gameplay, in accordance with an embodiment of the invention. Non-linear styles of gameplay may include several variations. For example, there may be branching storylines wherein based on a user's actions, the user encounters a particular scene. As shown by way of example, the scene 272 is followed by alternative scenes 274. It is possible that branching storylines may converge on a same scene. For example, the alternative scenes 274 ultimately converge on scene 276. In other embodiments, branching storylines may not converge. For example, the scenes 282 and 284 which branch from scene 280 do not converge. In other embodiments, gameplay may have different endings depending upon the user's actions. For example, gameplay may end at a scene 278 based the user's actions, whereas if the user had taken a different set of actions, then gameplay would have continued to scene 280 and beyond. According to principles of the invention herein described, a second user utilizing a handheld device may skip ahead to one of the scenes which the first user has yet to encounter, and perform modifications of the scene or set virtual tags associated with the scene. By way of example, in the illustrated embodiment, virtual tags 286 are associated with the scene 278.

FIG. 13C illustrates an open-world style of gameplay, in accordance with an embodiment of the invention. As shown, a plurality of scenes 288 are accessible to the user, and each may be visited in an order of the user's choosing. In the illustrated embodiment, the scenes are linked to one another such that not every scene is accessible from every other scene. However, in another embodiment, every scene may be accessible from every other scene. According to principles of the invention herein described, a second user utilizing a handheld device may jump to any one of the scenes, and perform modifications of the scene or set virtual tags associated with the scene. By way of example, in the illustrated embodiment, virtual tags 286 are associated with the scene 278.

The foregoing examples of various styles of gameplay have been described by way of example only, as in other embodiments there may be other styles of gameplay. The principles of the present invention may be applied to these other styles of gameplay, such that a user is able perform modifications or set virtual tags associated with a scene of an interactive game.

Figure 14:
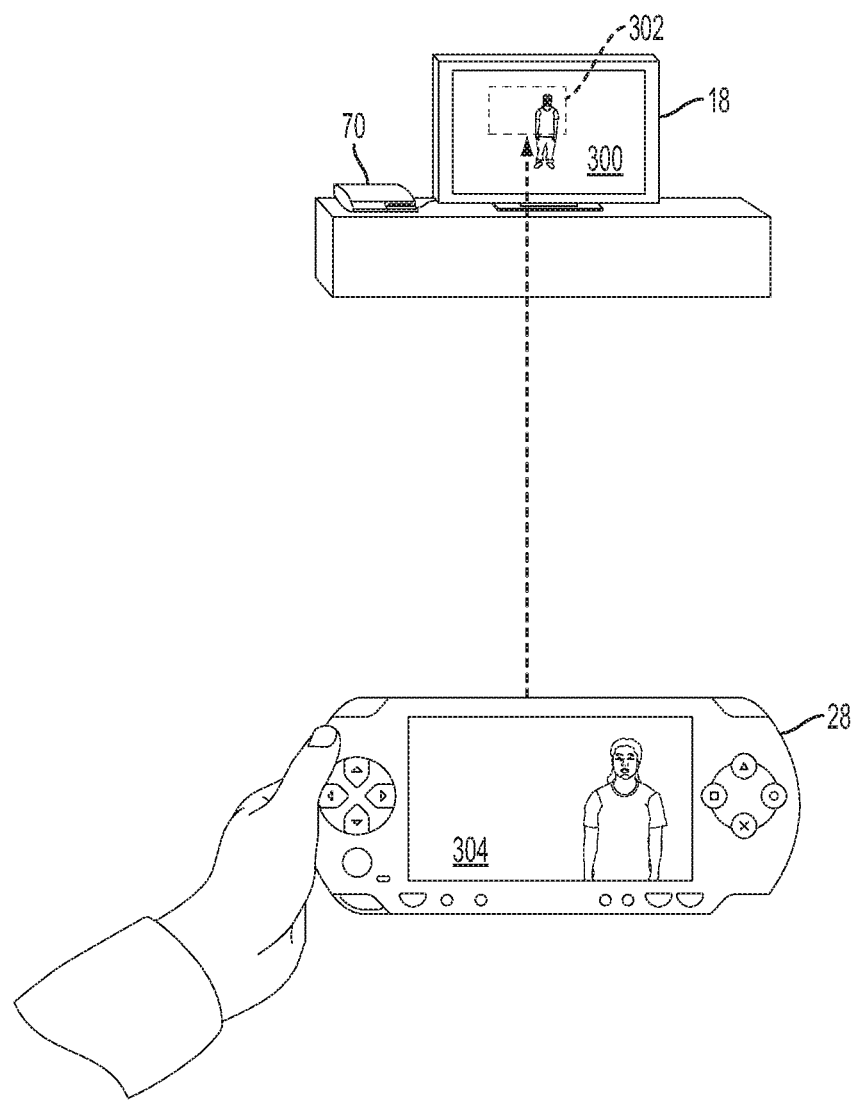
FIG. 14 illustrates an interactive environment, in accordance with an embodiment of the invention.

With reference to FIG. 14, an interactive environment is shown, in accordance with an embodiment of the invention. As shown, a computer 70 renders a primary video stream of an interactive application on a display 18. The rendered primary video stream depicts a scene 300. Simultaneously, a user holding a handheld device 28, orients the handheld device 28 towards the display 18. In one embodiment, orientation of the handheld device 28 towards the display may comprise aiming the rear-facing side of the handheld device 28 at a portion of the display 18. The orientation of the handheld device 28 in relation to the display 18 may be detected according to various technologies. For example, in one embodiment, a rearward facing camera of the handheld device (not shown) captures images of the display which are processed to determine the orientation of the handheld device 28 relative to the display 18. In other embodiments, the orientation of the handheld device 28 may be detected based on motion sensor data captured at the handheld device. In still other embodiments, any of various other technologies may be utilized to determine the orientation of the handheld device 28 relative to the display 18.

In the illustrated embodiment, the handheld device 28 acts as a magnifier, providing the user with a magnified view of an area 302 of the scene 300 towards which the handheld device is aimed. In this manner, the user is able to view the magnified area 302 as a scene 304 on the handheld device 28. This may be accomplished through generation of an ancillary video feed that is transmitted from the computer 70 to the handheld device 28, and rendered on the handheld device 28 in real-time so as to be synchronized with the primary video stream which is being rendered on the display 18. In similar embodiment, wherein the interactive application is a first-person shooter style game, the handheld device 28 could function as a sighting scope for targeting, as might occur when the user is using a sniper rifle or a long range artillery weapon. In such an embodiment, the user could view the game on the display 18, but hold up the handheld device 28 and aim it at a particular area of the display 18 so as to view a magnified view of that area for targeting purposes.

Figure 15:
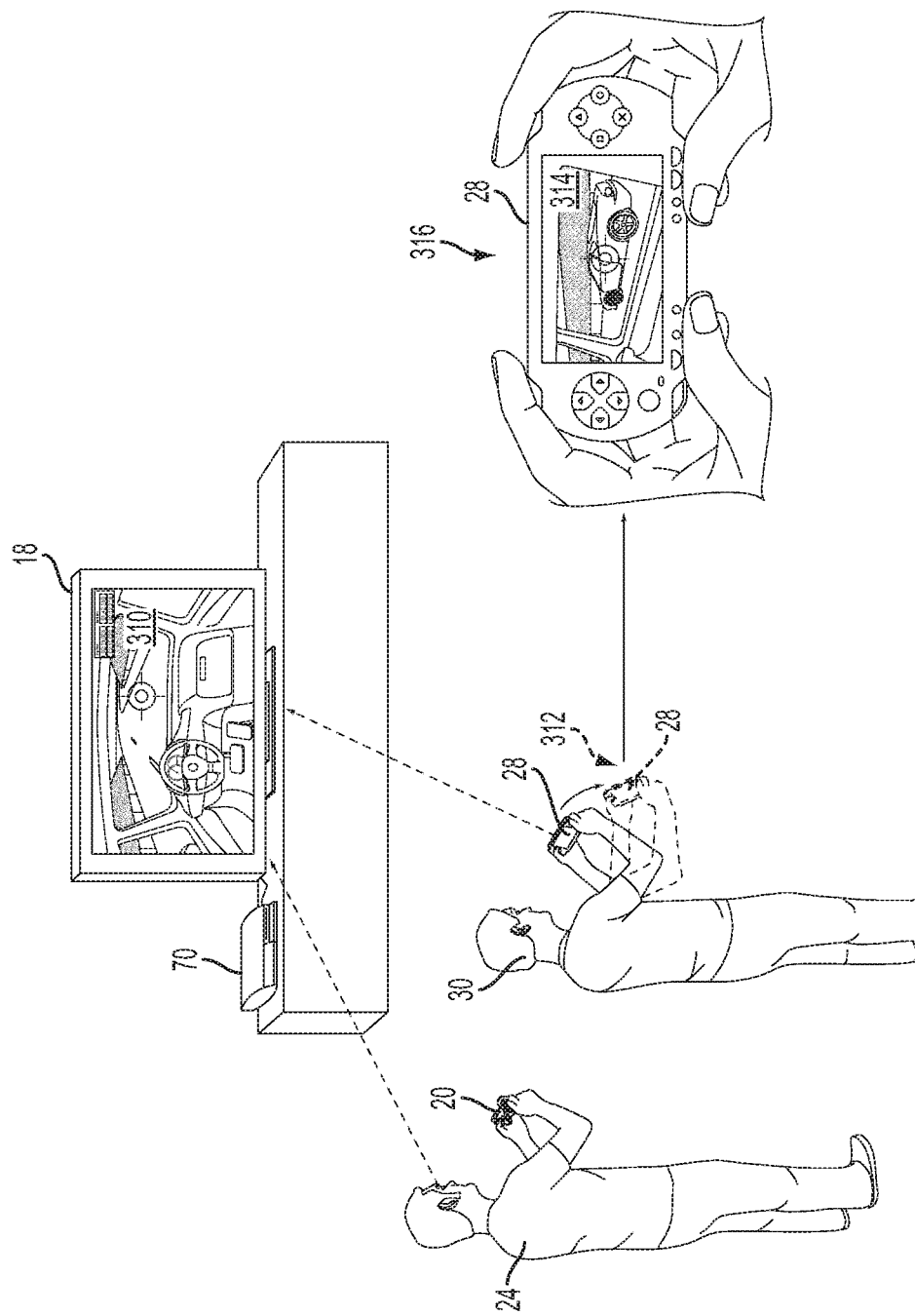
FIG. 15 illustrates an interactive environment, in accordance with an embodiment of the invention.

With reference to FIG. 15, an interactive environment is shown, in accordance with an embodiment of the invention. As shown, a computer 70 renders a primary video stream of an interactive application on a display 18. The rendered primary video stream depicts a scene 310 on the display 18. A user 24 views the scene 310 and operates a controller 20 so as to provide input to the interactive application. In the illustrated embodiment, the user 24 provides input so as to steer a vehicle, as illustrated in the left side of the scene 310. However, in other embodiments, the user 24 may provide input for any type of action related to the interactive application. Simultaneously, a user 30 operates a handheld device 28 while also viewing the scene 310. In the illustrated embodiment, the user 30 provides input so as to control the targeting and firing of a weapon, as shown on the right side of the scene 310. However, in other embodiments, the user 30 may provide input for any type of action related to the interactive application.

In one embodiment, the user 30 turns the handheld device 28 away from the display 18, to a position 312, so as to orient the rear side of the handheld device away from the display 18. This causes activation of a viewing mode wherein the handheld device acts as a viewer of a virtual environment in which the scene 310 takes place. As shown at view 316, by turning the handheld device 28 away from the display 18, the handheld device 28 now displays a scene 314 which depicts a view of the virtual environment resulting as would be seen when the weapon controlled by the user 30 is turned in the same manner as the turning of the handheld device 28. In other embodiments of the invention, activation of the viewing mode of the handheld device 28 may be selectable by the user 30, or may be configured to automatically occur based on the location and orientation of the handheld device 28.

Figure 16:
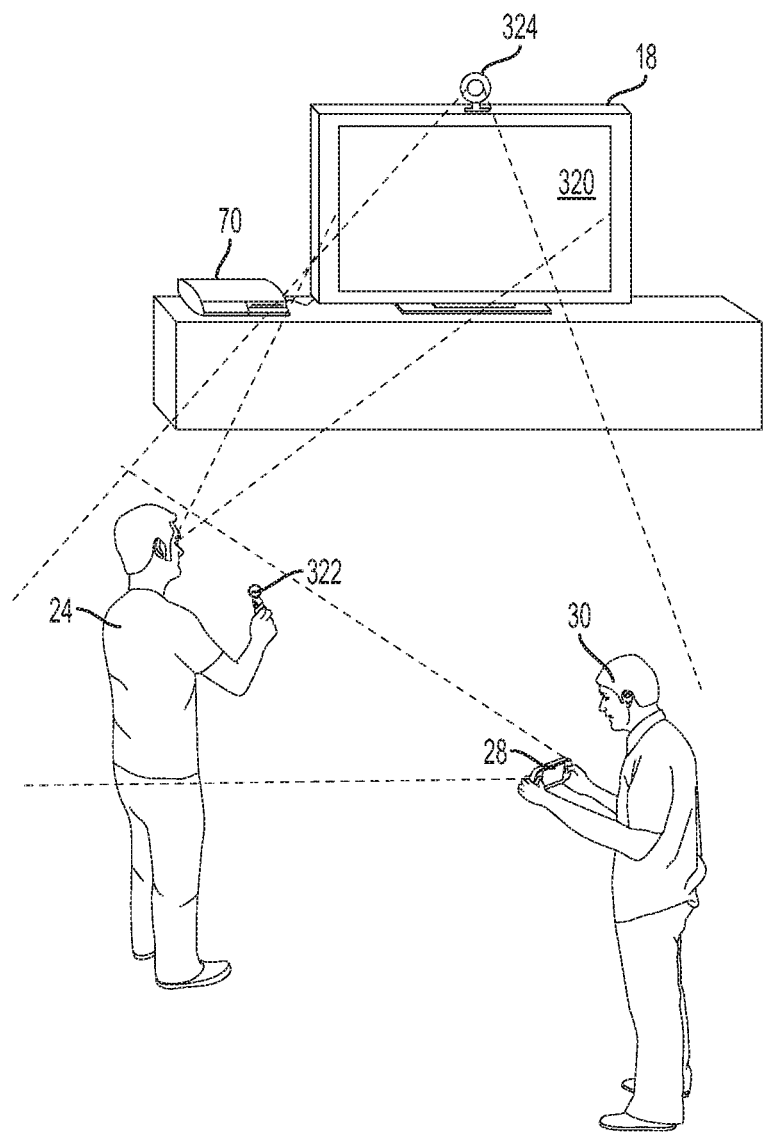
FIG. 16 illustrates an interactive environment, in accordance with an embodiment of the invention.

With reference to FIG. 16, an interactive environment is shown, in accordance with an embodiment of the invention. As shown, a computer 70 renders a primary video stream of an interactive application on a display 18. The rendered primary video stream depicts a scene 320 on the display 18. A user 24 views the scene 320 and provides interactive input by operating a motion controller 322. In one embodiment, the position of the motion controller is determined based on captured images of the motion controller 322 captured by a camera 324. In one embodiment, the camera 324 includes a depth camera that is capable of capturing depth information. As shown, a second user 30 holds a handheld device 28 oriented towards the first user 24. In one embodiment, the handheld device 28 includes a rearward-facing camera which the user 30 orients so as to enable capture of images of the first user 24 by the camera of the handheld device 28. In one embodiment, the camera of the handheld device 28 may be capable of capturing depth information. By capturing images of the user 24 and the motion controller 322 from two different viewpoints which are based on the location of the camera 324 and the location of the handheld device 28, it is possible to determine a more accurate three-dimensional representation of the first user 24 as well as the position and orientation of the motion controller 322.

In another embodiment, the user 24 does not require a motion controller, but is able to provide interactive input to the interactive application through motion which is detected by the camera 324. For example, the camera 324 may capture images and depth information of the user 24 which are processed to determine the position, orientation, and movements of the user 24. These are then utilized as input for the interactive application. Further, the handheld device 28 may be operated by the second user 30 as described above to enhance the detection of the first user 24.

Figure 17:
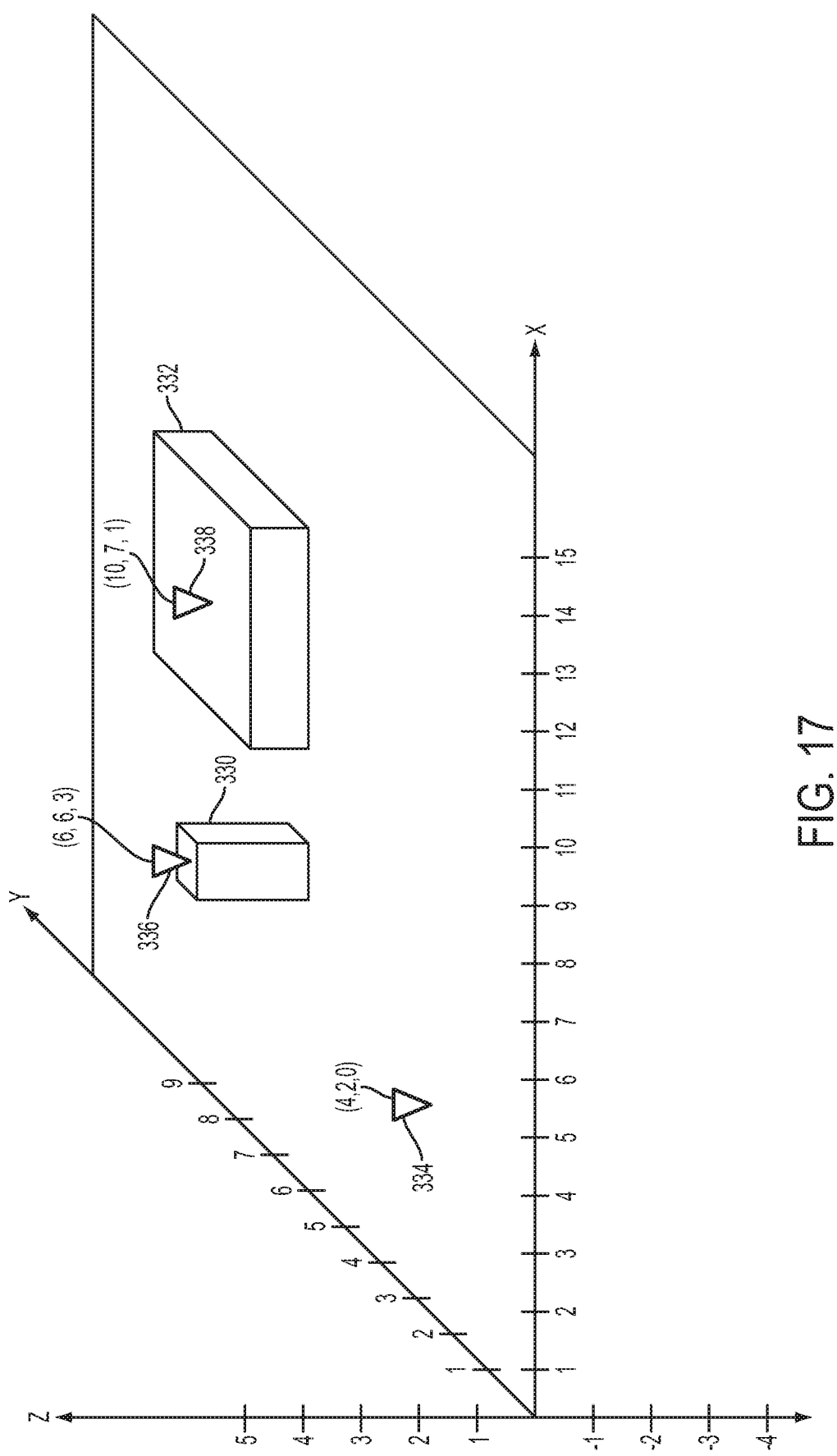
FIG. 17 illustrates a coordinate system of a virtual space, in accordance with an embodiment of the invention.

With reference to FIG. 17, a coordinate system of a virtual space is shown, in accordance with an embodiment of the invention. As shown, the virtual space includes objects 330 and 332. As previously described it is possible for a user using a handheld device to set virtual tags within a virtual space. In the illustrated embodiment, a virtual tag 334 has been set at coordinates (4, 2, 0). Whereas, a virtual tag 336 has been set on the object 330 at coordinates (6, 6, 3). Also, a virtual tag 338 has been set on the object 332 at coordinates (10, 7, 1). The virtual tags may be viewable by another user when the user navigates to a location proximate to the virtual tags. As previously described, the virtual tags may highlight a location or an object to the other user, or may contain information related to the virtual space as determined by the user, such as hints or messages, or may define modifications that are rendered or actions which are executed when the other user encounters them.

Figure 18:
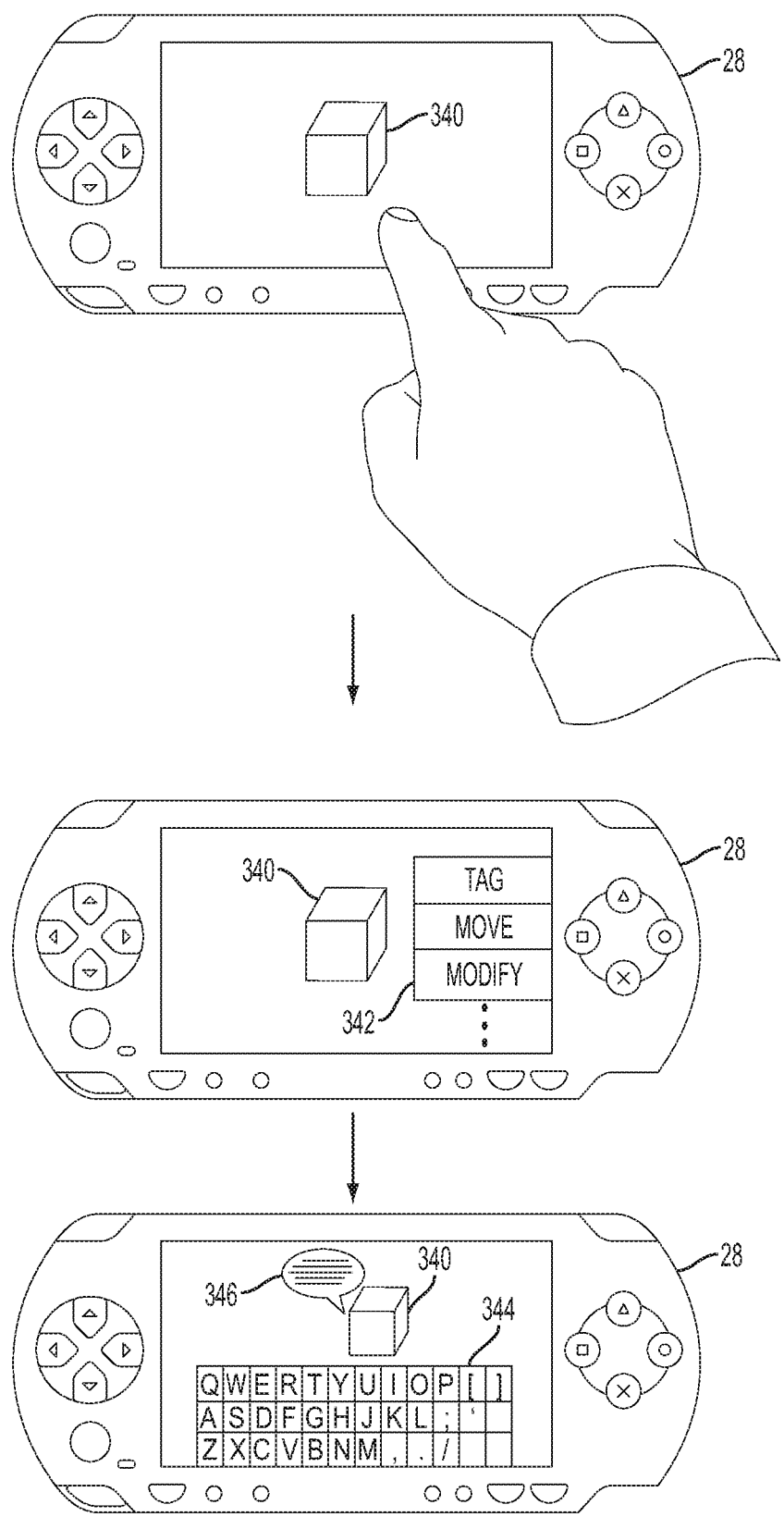
FIG. 18 illustrates a sequence of actions illustrating a user interface for setting a virtual tag, in accordance with an embodiment of the invention.

With reference to FIG. 18, a sequence of actions illustrating a user interface for setting a virtual tag is shown, in accordance with an embodiment of the invention. As shown, a user of the handheld device 28 can select an object 340 (for example, by tapping on the object), so as to bring up a menu 342, containing various options. An option for setting a tag may be selected from the menu 342, this bringing up a keyboard interface 344 to enable entry of text information. The entered text information is shown in the virtual tag 346. The virtual tag 346 may be rendered to other users when they navigate to a position proximate to the location of the virtual tag 346.

Figure 19:
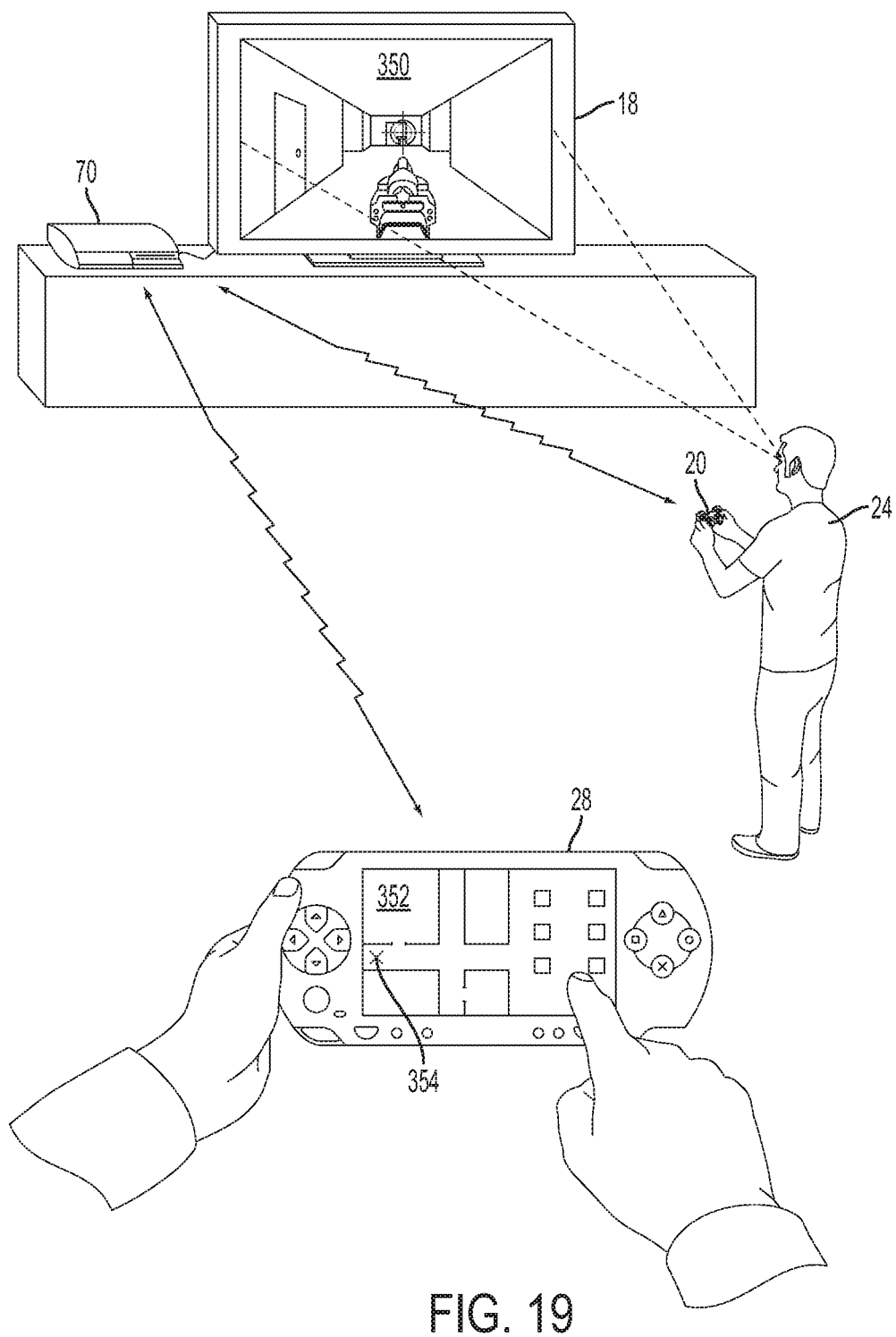
FIG. 19 illustrates an interactive environment, in accordance with an embodiment of the invention.

With reference to FIG. 19, an interactive environment is shown, in accordance with an embodiment of the invention. As shown, a computer 70 renders a primary video stream of an interactive application on a display 18. The rendered primary video stream depicts a scene 350 on the display 18. A user 24 views the scene 350 and operates a controller 20 to provide input to the interactive application. In the illustrated embodiment, the user 24 controls a character in a first-person shooter type game. Simultaneously, a second user operates a handheld device 28, which displays a map 352 of the virtual environment in which the first user's character is located. The location of the first user's character is shown by the marker 354. In one embodiment, the second user is able to navigate the map 352 so as to view regions which the user 24 is unable to view while engaged in controlling the character in the scene 350. As such, in one embodiment, the second user is able to cooperatively aid the user 24 by viewing the map 352 and providing information to the user 24, such as locations of interest, objects, enemies, or any other information which may be displayed on the map 352.

Figure 20:
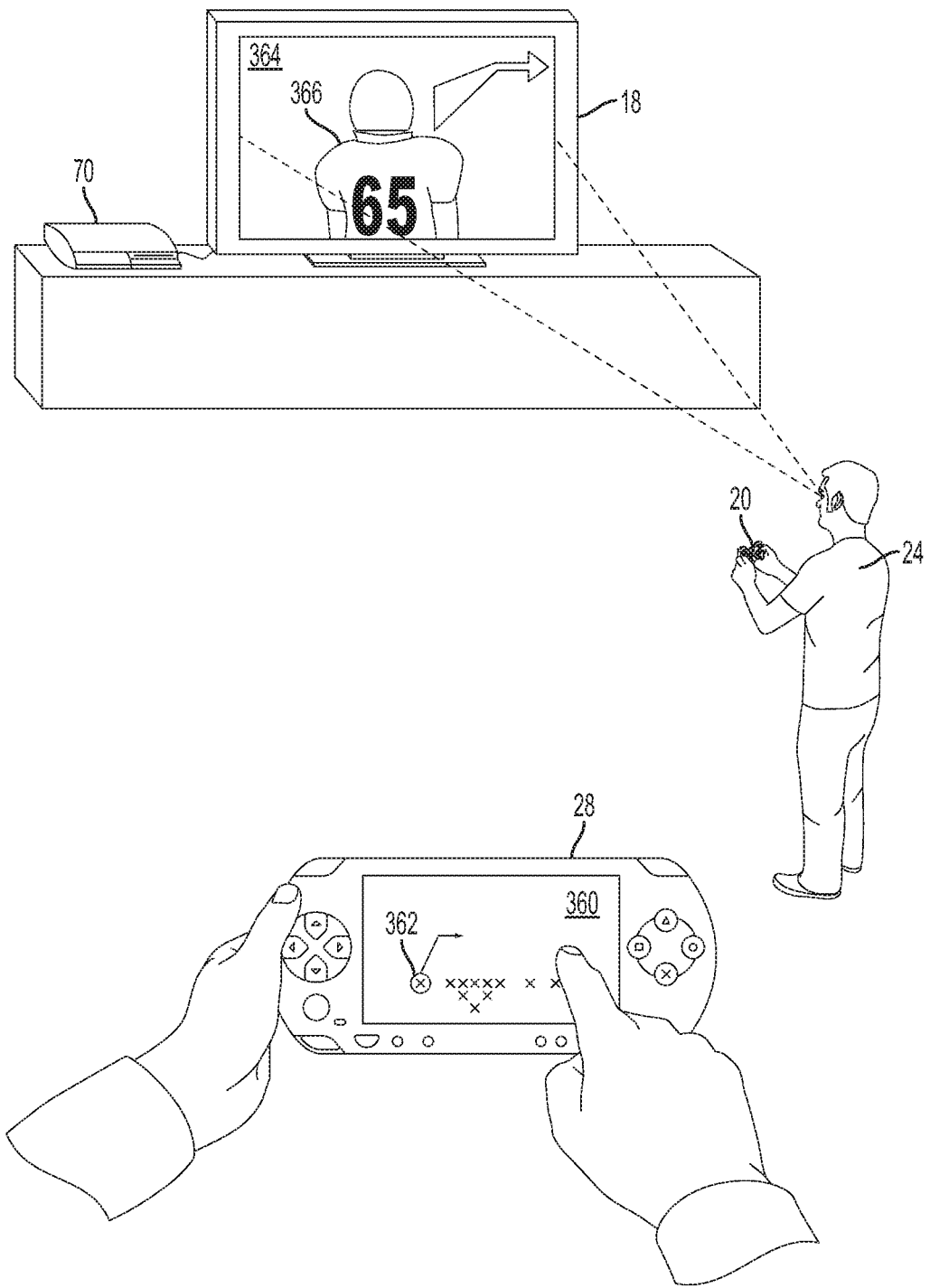
FIG. 20 illustrates an interactive environment, in accordance with an embodiment of the invention.

With reference to FIG. 20, an interactive environment is shown, in accordance with an embodiment of the invention. In the illustrated embodiment, a user 24 operating a controller 20 and second user (not shown, except for the second user's hands) operating a handheld device 28 are playing a football video game. The second user views a scene 360 in which the second user is able to diagram plays by, for example, drawing them on a touchcreen of the handheld device 28. As shown, the second user has drawn a specified route for a player indicated by marker 362. The user 24 controls a player 366 that corresponds to the marker 362, shown in a scene 364 that is displayed on the display 18. The user 24 is able to view the route which the second user has diagrammed, and operates the controller 20 to control the movement of the player 366 so as to run the route.

Figure 21:
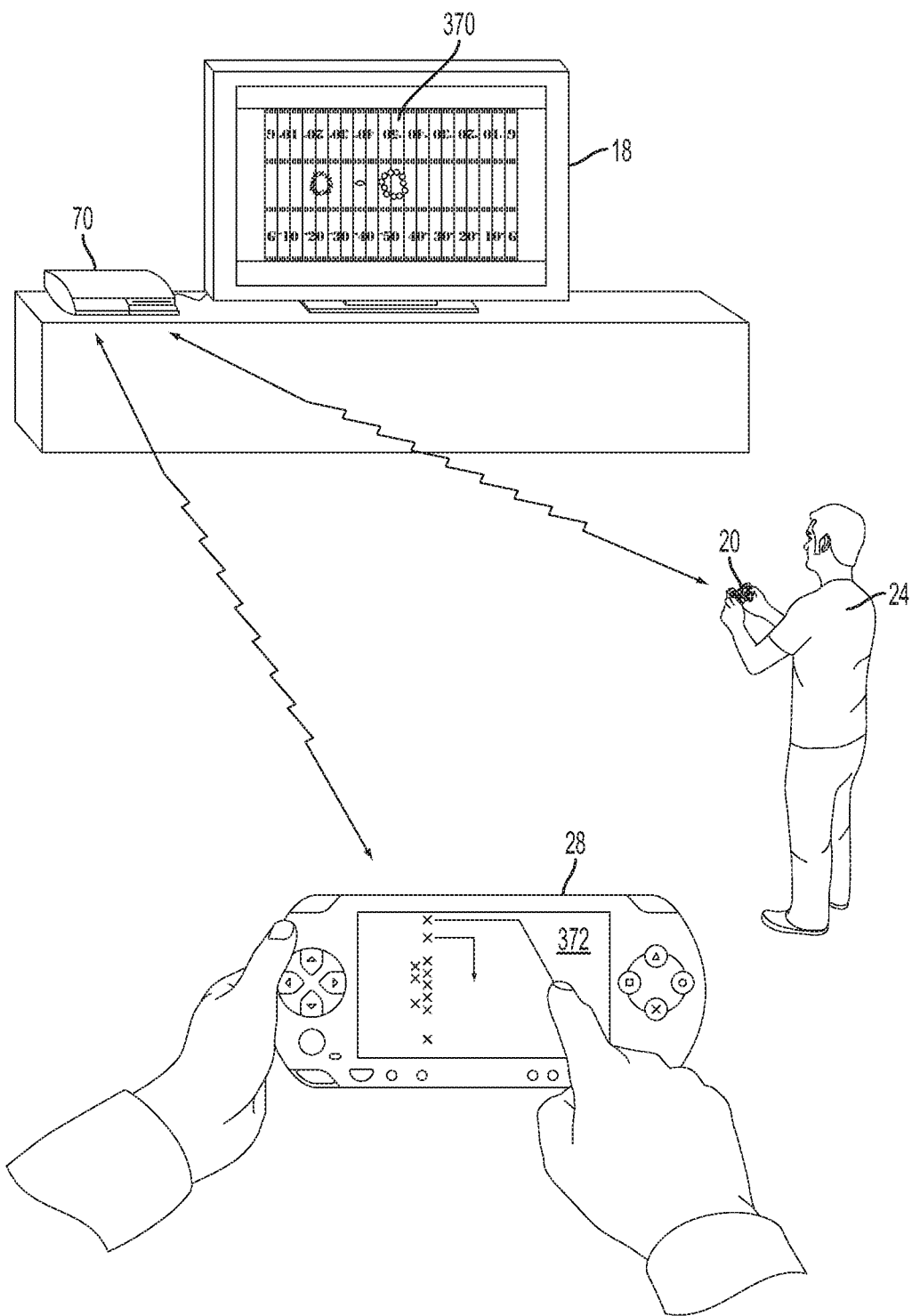
FIG. 21 illustrates an interactive environment, in accordance with an embodiment of the invention.

In a related embodiment, shown at FIG. 21, the second user operates the handheld device 28 so as to diagram a play, such as by drawing the play on a touchscreen on the handheld device 28. Meanwhile, on the display 18, the teams are shown huddled in between plays. The diagrammed play will be utilized to determine the movements of the players on one of the teams in the game. In this manner, the second user is able to directly control the movements of players in an intuitive manner.

The aforementioned concept of utilizing the handheld device to diagram the movements of characters may be extended to other scenarios. For example, in a battlefield scenario, it may be possible to utilize the handheld device to diagram where certain characters will move, and what actions they will take, such as moving towards an enemy and attacking the enemy. In other embodiments, the handheld device may be utilized to diagram the movements or activities of characters or objects in a virtual environment.

In still other embodiments of the invention, the utilization of a portable handheld device for interfacing with an application displayed on a main display may be extended to various other interface concepts, as well as other types of programs and applications. For example, in some embodiments, the touchscreen of a handheld device could be utilized as a control or input surface to provide input to an application. In one embodiment, a user provides input by drawing on the touchscreen of the handheld device. In one embodiment, the touchscreen surface may function as a cursor control surface, wherein movements of a cursor on a main display are controlled according to movements of a user's finger on the touchscreen of the handheld device. The movement of the cursor on the main display may track the detected movement of the user's finger on the touchscreen. In another embodiment, a virtual keyboard is displayed on the touchscreen of the handheld device, and the user can enter text input by touching the displayed keys of the virtual keyboard on the touchscreen of the handheld device. These types of input mechanisms which are facilitated by leveraging the functionality of the handheld device may be applied to various kinds of applications, such as a web browser, word processor, spreadsheet application, presentation software, video game, etc.

In other embodiments, the handheld device may be utilized to provide input for visual editing applications, such as photo or video editing applications. For example, a user could edit a photo by drawing on the touchscreen of the handheld device. In this manner, input for editing a photo or video can be provided in an intuitive manner In one embodiment, the photo to be edited, or a portion of the photo, is shown on the touchscreen of the handheld device, so as to facilitate accurate input for editing of the photo by drawing on the touchscreen.

In other embodiments of the invention, the various resources of the handheld device may be utilized to support the functionality of programs and applications. For example, in one embodiment, wherein the application is a video game, the handheld device may be utilized to save game data related to the video game, such as a particular user's profile or progress data. Game data is typically stored on a console gaming system, and is therefore tied to that particular console system. However, by storing game data on a handheld device, a user can easily transfer their game data, and so utilize a different console system to play the same game without foregoing any of their saved game data.

For ease of description, some of the aforementioned embodiments of the invention have been generally described with reference to one player operating a controller (or providing input through a motion detection system) and/or one user operating a handheld device. It will be understood by those skilled in the art that in other embodiments of the invention, there may be multiple users operating controllers (or providing input through motion detection) and/or multiple users operating handheld devices.

Figure 22:
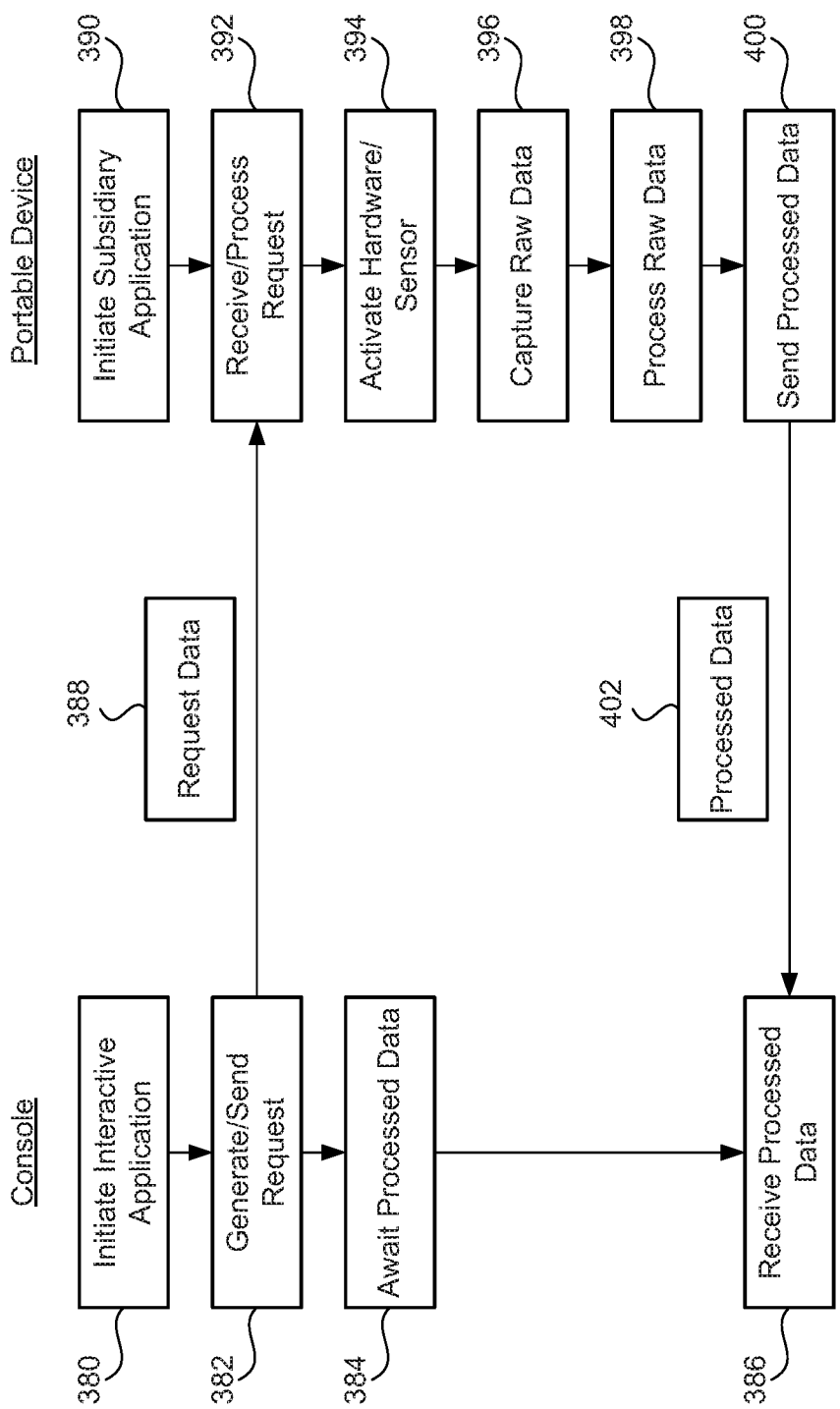
FIG. 22 illustrates hardware and user interfaces that may be used to execute and render an interactive application, in accordance with one embodiment of the present invention.

With reference to FIG. 22, a method for utilizing a portable device to provide interactivity with an interactive application is shown, in accordance with an embodiment of the invention. At method operation 380, an interactive application is initiated on a console device or computer. At method operation 390, a subsidiary application is initiated on a portable device. At method operation 382 a request is generated by the interactive application and request data 388 is sent from the interactive application to the subsidiary application running on the portable device. At method operation 392, the request data 388 is received and processed by the subsidiary application on the portable device. At method operation 384, the computer awaits processed data after sending the request. At method operation 394, a hardware component or sensor of the portable device is activated. At method operation 396, raw data from the activated hardware is captured. At method operation 398, the captured raw data is processed. And at method operation 400, the processed raw data is send as processed data 402 to the interactive application. At method operation 386, the processed data 402 is received by the interactive application.

Embodiments of the disclosure describe methods and apparatus for a system that enables an interactive application to utilize the resources of a handheld device. In one embodiment of the invention, a primary processing interface is provided for rendering a primary video stream of the interactive application to a display. A first user views the rendered primary video stream on the display and interacts by operating a controller device which communicates with the primary processing interface. Simultaneously, a second user operates a handheld device in the same interactive environment. The handheld device renders an ancillary video stream of the interactive application on a display of the handheld device, separate from the display showing the primary video stream. Accordingly, methods and apparatus in accordance with embodiments of the invention will now be described.

Figure 23:
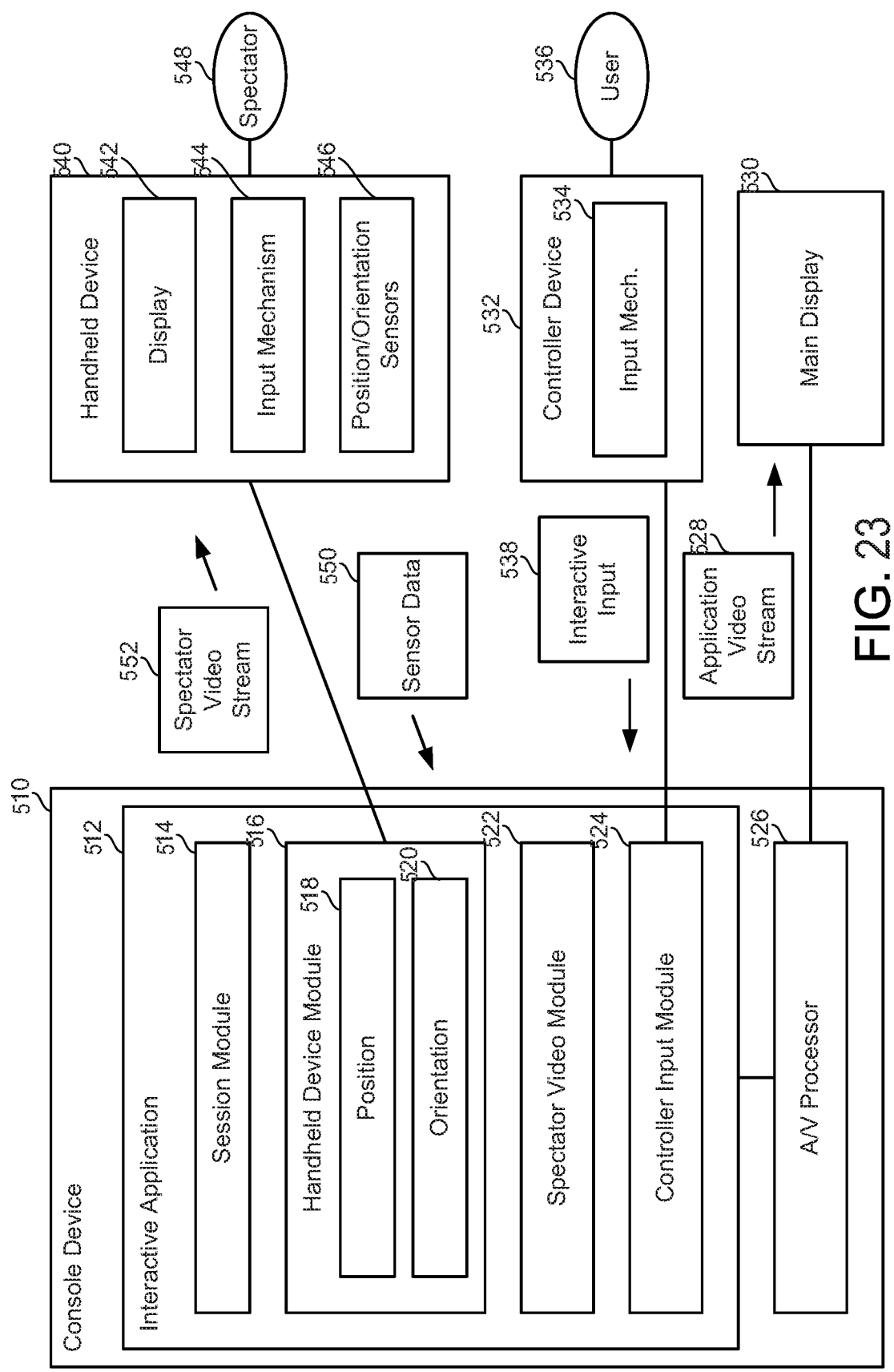
FIG. 23 illustrates a system for enabling a handheld device to capture video of an interactive session of an interactive application, in accordance with an embodiment of the invention

With reference to FIG. 23, a system for enabling a handheld device to capture video of an interactive session of an interactive application is shown, in accordance with an embodiment of the invention. The system exists in an interactive environment in which a user interacts with the interactive application. The system includes a console device 510, which executes an interactive application 512. The console device 510 may be a computer, console gaming system, set-top box, media player, or any other type of computing device that is capable of executing an interactive application. Examples of console gaming systems include the Sony Playstation 3® and the like. The interactive application 512 may be any of various kinds of applications which facilitate interactivity between one of more users' and the application itself. Examples of interactive applications include video games, simulators, virtual reality programs, utilities, or any other type of program or application which facilitates interactivity between a user and the application.

The interactive application 512 produces video data based on its current state. This video data is processed by an audio/video processor 526 to generate an application video stream 528. The application video stream 528 is communicated to a main display 530 and rendered on the main display 530. The term "video," as used herein, shall generally refer to a combination of image data and audio data which are synchronized, though in various embodiments of the invention, the term "video" may refer to image data alone. Thus, by way of example, the application video stream 528 may include both image data and audio data, or just image data alone. The main display may be a television, monitor, lcd display, projector, or any other kind of display device capable of visually rendering a video data stream.

The interactive application 512 also includes a controller input module 524 for communicating with a controller device 532. The controller device 532 may be any of various controllers which may be operated by a user to provide interactive input to an interactive application. Examples of controller devices include the Sony Dualshock 3® wireless controller. The controller device 532 may communicate with the console device 510 via a wireless or wired connection. The controller device 532 includes at least one input mechanism 534 for receiving interactive input from a user 536. Examples of input mechanisms may include a button, joystick, touchpad, touchscreen, directional pad, stylus input, or any other types of input mechanisms which may be included in a controller device for receiving interactive input from a user. As the user 536 operates the input mechanism 534, the controller device 532 generates interactive input data 538 which is communicated to the controller input module 524 of the interactive application 512.

The interactive application 512 includes a session module 514, which initiates a session of the interactive application, the session defining interactivity between the user 536 and the interactive application 512. For example, the initiated session of the interactive application may be a new session or a continuation of a previously saved session of the interactive application 512. As the interactive application 512 is executed and rendered on the main display 530 via the application video stream 528, the user 536 views the rendered application videos stream on the main display 530 and provides interactive input data 538 to the interactive application by operating the controller device 532. The interactive input data 538 is processed by the interactive application 512 to affect the state of the interactive application 512. The state of the interactive application 512 is updated, and this updated state is reflected in the application video stream 528 rendered to the main display 530. Thus, the current state of the interactive application 512 determined based on the interactivity between the user 36 and the interactive application 512 in the interactive environment.

The interactive application 512 also includes a handheld device module 516 for communicating with a handheld device 540. The handheld device 540 may be any of various handheld devices, such as a cellular phone, personal digital assistant (PDA), tablet computer, electronic reader, pocket computer, portable gaming device or any other type of handheld device capable of displaying video. One example of a handheld device is the Sony Playstation Portable®. The handheld device 540 is operated by a spectator 548, and includes a display 542 for rendering a spectator video stream 552. An input mechanism 544 is provided for enabling the user 548 to provide interactive input to the interactive application 512. Also, the handheld device 540 includes position and orientation sensors 546. The sensors 546 detect data which may be utilized to determine the position and orientation of the handheld device 540 within the interactive environment. Examples of position and orientation sensors include an accelerometer, magnetometer, gyroscope, camera, optical sensor, or any other type of sensor or device which may be included in a handheld device to generate data that may be utilized to determine the position or orientation of the handheld device. As the spectator 548 operates the handheld device 540, the position and orientation sensors 546 generate sensor data 550 which is transmitted to the handheld device module 516. The handheld device module 516 includes position module 518 for determining the position of the handheld device 540 within the interactive environment, and orientation module 520 for determining the orientation of the handheld device 540 within the interactive environment. The position and orientation of the handheld device 540 are tracked during the interactive session of the interactive application 512.

It will be understood by those skilled in the art that any of various technologies for determining the position and orientation of the handheld device 540 may be applied without departing from the scope of the present invention. For example, in one embodiment, the handheld device includes an image capture device for capturing an image stream of the interactive environment. The position and orientation of the handheld device 540 is tracked based on analyzing the captured image stream. For example, one or more tags may be placed in the interactive environment, and utilized as fiduciary markers for determining the position and orientation of the handheld device based on their perspective distortion when captured by the image capture device of the handheld device 540. The tags may be objects or figures, or part of the image displayed on the main display, that are recognized when present in the captured image stream of the interactive environment. The tags serve as fiduciary markers which enable determination of a location within the interactive environment. Additionally, the perspective distortion of the tag in the captured image stream indicates the position and orientation of the handheld device.

In other embodiments, any of various methods may be applied for purposes of tracking the location and orientation of the handheld device 540. For example, natural feature tracking methods or simultaneous location and mapping (SLAM) methods may be applied to determine position and orientation of the handheld device 40. Natural feature tracking methods generally entail the detection and tracking of "natural" features within a real environment (as opposed to artificially introduced fiducials) such as textures, edges, corners, etc. In other embodiments of the invention, any one or more image analysis methods may be applied in order to track the handheld device 540. For example, a combination of tags and natural feature tracking or SLAM methods might be employed in order to track the position and orientation of the handheld device 540.

Additionally, the movement of the handheld device 540 may be tracked based on information from motion sensitive hardware within the handheld device 540, such as an accelerometer, magnetometer, or gyroscope. In one embodiment, an initial position of the handheld device 540 is determined, and movements of the handheld device 540 in relation to the initial position are determined based on information from an accelerometer, magnetometer, or gyroscope. In other embodiments, information from motion sensitive hardware of the handheld device 540, such as an accelerometer, magnetometer, or gyroscope, may be used in combination with the aforementioned technologies, such as tags, or natural feature tracking technologies, so as to ascertain the position, orientation and movement of the handheld device 540.

The interactive application includes a spectator video module 522, which generates the spectator video stream 552 based on the current state of the interactive application 512 and the tracked position and orientation of the handheld device 540 in the interactive environment. The spectator video stream 552 is transmitted to the handheld device 540 and rendered on the display 542 of the handheld device 540.

In various embodiments of the invention, the foregoing system may be applied to enable the spectator 548 to capture video of an interactive session of the interactive application 512. For example, in one embodiment, the interactive application 512 may define a virtual space in which activity of the interactive session takes place. Accordingly, the tracked position and orientation of the handheld device 540 may be utilized to define a position and orientation of a virtual viewpoint within the virtual space that is defined by the interactive application. The spectator video stream 552 will thus include images of the virtual space captured from the perspective of the virtual viewpoint. As the spectator 548 maneuvers the handheld device 540 to different positions and orientations in the interactive environment, so the position and orientation of the virtual viewpoint will change, thereby changing the perspective in the virtual space from which the images of the spectator video stream 552 are captured, and ultimately displayed on the display 542 of the handheld device. In this manner, the spectator 548 can function as the operator of a virtual camera in the virtual space in an intuitive fashion—maneuvering the handheld device 540 so as to maneuver the virtual camera in the virtual space in a similar manner.

In an alternative embodiment, the spectator video stream is generated at the handheld device 540, rather than at the console device 510. In such an embodiment, application state data is first determined based on the current state of the interactive application 512. This application state data is transmitted to the handheld device 540. The handheld device 540 processes the application state data and generates the spectator video stream based on the application state data and the tracked position and orientation of the handheld device.

In another embodiment, an environmental video stream of the interactive environment is captured, and the spectator video stream 552 is generated based on the environmental video stream. The environmental video stream may be captured at a camera included in the handheld device 540. In one embodiment, the spectator video stream 552 is generated by augmenting the environmental video stream with a virtual element. In such an embodiment, wherein the environmental video stream is captured at the handheld device 540, then the spectator 548 is able to view an augmented reality scene on the display 542 of the handheld device 540 that is based on the current state of the interactive application 512 as it is affected by the interactivity between the user 536 and the interactive application 512. For example, in one embodiment, the image of the user 536 may be detected within the environmental video stream. And a portion of or the entirety of the user's image in the environmental video stream may then be replaced with a virtual element. In one embodiment, the detected user's image in the environmental video stream could be replaced with a character of the interactive application 512 controlled by the user 536. In this manner, when the spectator 548 aims the camera of the handheld device 540 at the user 536, the spectator 548 sees the character of the interactive application 512 which the user 536 is controlling instead of the user 536 on the display 542.

In another embodiment, the position and orientation of the controller 532 as it is operated by the user 536 may also be determined and tracked. The position and orientation of the controller 532, as well as the position and orientation of the handheld device 540 relative to the location of the controller 532, may be utilized to determine the spectator video stream. Thus, the location of the controller may be utilized as a reference point according to which the spectator video stream is determined based on the relative position and orientation of the handheld device 540 to the location of the controller 532. For example, the location of the controller 532 may correspond to an arbitrary location in a virtual space of the interactive application 512, such as the present location of a character controlled by the user 536 in the virtual space. Thus, as the spectator maneuvers the handheld device 540 in the interactive environment, its position and orientation relative to the location of the controller 532 determine the position and orientation of a virtual viewpoint in the virtual space relative to the location of the character. Images of the virtual space from the perspective of the virtual viewpoint may be utilized to form the spectator video stream. In one embodiment, the correspondence between the relative location of the handheld device 40 to the controller 532 and the relative location of the virtual viewpoint to the character is such that changes in the position or orientation of the handheld device 540 relative to the location of the controller 532 cause similar changes in the position or orientation of the virtual viewpoint relative to the location of the character. As such, the spectator 548 is able to intuitively maneuver the handheld device about the controller 536 to view and capture a video stream of the virtual space from various perspectives that are linked to the location of the character controlled by the user 536.

The foregoing embodiment has been described with reference to a character controlled by the user 536 in the virtual space of the interactive application 512. However, in other embodiments, the location of the controller 532 may correspond to any location, stationary or mobile, within the virtual space of the interactive application. For example, in some embodiments, the location of the controller may correspond to a character, a vehicle, a weapon, an object or some other thing which is controlled by the user 536. Or in some embodiments, the location of the controller may correspond to moving characters or objects which are not controlled by the user 532, such as an artificial intelligence character or a character being controlled by a remote user of the interactive application during the interactive session. Or in still other embodiments, the location of the controller 532 may correspond to a specific geographic location, the location of an object, or some other stationary article within the virtual space of the interactive application 512.

In another embodiment, an initial position of the user 36 is determined, and the position of the user 536 is tracked during the interactive session. The spectator video stream is then generated based on the position and orientation of the handheld device 540 relative to the position of the user 536. In various embodiments, the position of the user 536 may be determined based on various technologies. For example, an image capture device may be included in the interactive system for capturing images of the interactive environment including the user 536. These images may be analyzed to determine the location and pose of the user 536 in the interactive environment. In one embodiment, a depth camera capable of detecting depth data of the interactive environment is included in the interactive system. The depth data may be analyzed to detect the location and pose of the user 536 in the interactive environment. By determining the position and/or pose of the user in the interactive environment, various features in accordance with embodiments of the invention are enabled.

For example, in one embodiment an object within a virtual environment of the interactive application 512 is mapped to the position of the user 536. The position and orientation of the handheld device 540 relative to the position of the user 536 is utilized to define a position and orientation of a virtual viewpoint within the virtual space defined by the interactive application 512. The spectator video stream 552 thus includes images of the virtual space captured from the perspective of the virtual viewpoint, the object being included in the images of the spectator video stream when the handheld device 540 is oriented towards the position of the user 536. In one embodiment, the object is controlled by the user. Examples of such objects include a character, vehicle, weapon, or other type of article of the interactive application 512 which the user 536 may control. In one embodiment, the position of the user 536 is determined based on the position of the controller device 532 operated by the user.

In one embodiment, the spectator video stream 552 is stored in a memory. The memory may be included in the handheld device 540, the console device 510, or located remotely. After storing the spectator video stream 552, the spectator 548 will be able to perform operations such as editing the stored spectator video or uploading the stored spectator video to an Internet website for sharing the video.

Figure 24:
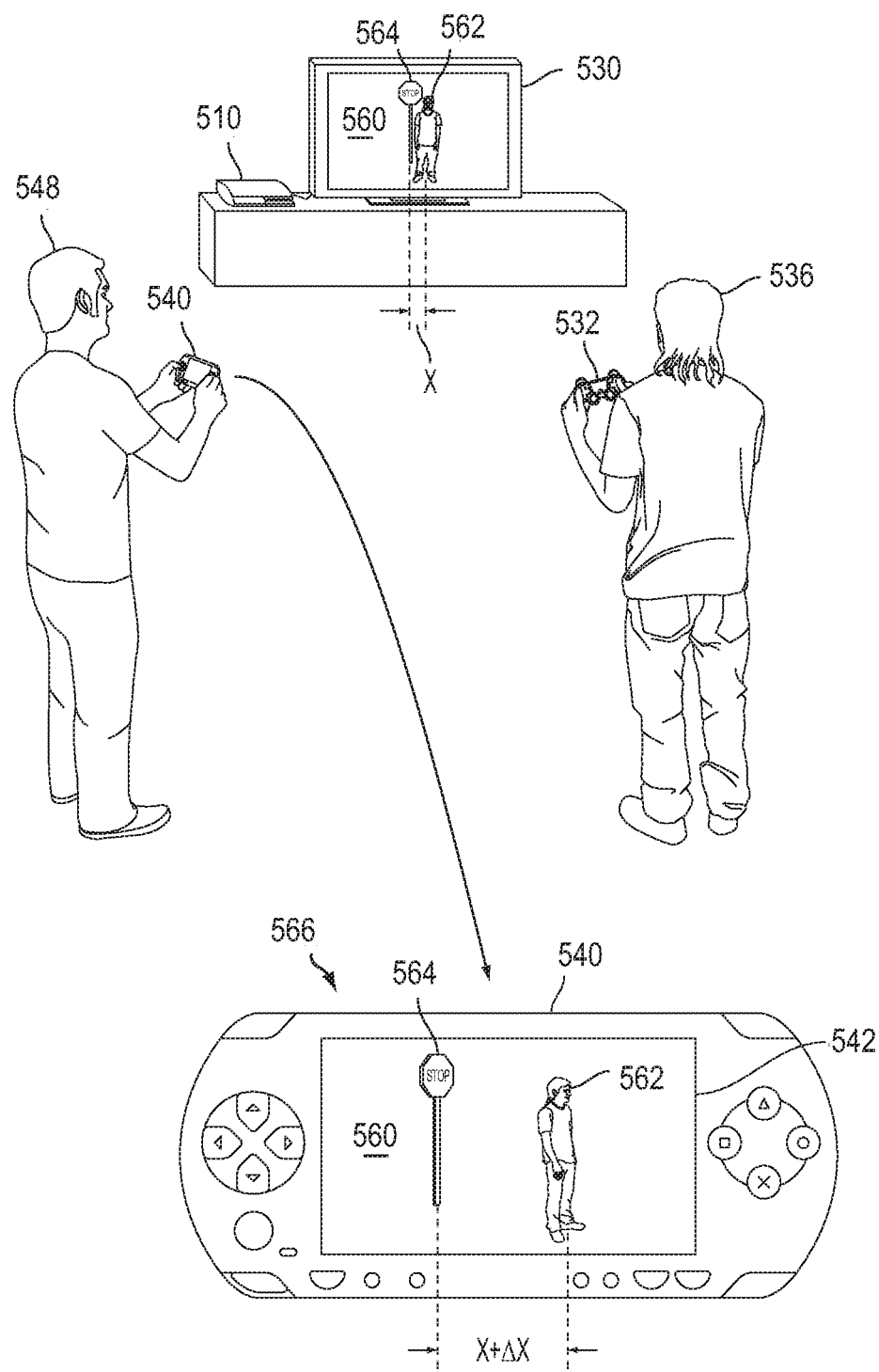
FIG. 24 illustrates an interactive environment including a user and a spectator interacting with an interactive application, in accordance with an embodiment of the invention.

With reference to FIG. 24, an interactive environment including a user and a spectator interacting with an interactive application is shown, in accordance with an embodiment of the invention. The interactive environment includes a console device 510 which executes an interactive application. As the interactive application executes, it generates an application video stream that is rendered on a main display 530. As shown by way of example only, the rendered application video stream depicts a scene 560 including a character 562 and a stop sign 564. A user 536 views the scene 560 and interacts with the interactive application by operating controller 532. Simultaneously, a spectator 48 views a display 542 of a handheld device 540. The application video stream rendered on the main display 530 depicts a view of a virtual space of the interactive application from the perspective of a primary virtual viewpoint defined with reference to the location of the user 536. The primary virtual viewpoint may be static, presuming the user 536 to be in an approximate location in front of the main display 530, or dynamic, changing based on changes in the position of the user 536. Simultaneously, the position and orientation of the handheld device 540 are determined and tracked, and utilized to define a secondary virtual viewpoint within the virtual space of the interactive application. This secondary virtual viewpoint is dynamically updated based on changes in the position and orientation of the handheld device 540 as it is operated by the spectator 548. A spectator video stream is rendered on the handheld device 540, depicting the virtual space from the perspective of the secondary virtual viewpoint.

In the embodiment shown, the virtual space includes the character 562 and the stop sign 564. The spectator 548 and handheld device 540 are situated to the left of the user 536, the spectator 548 orienting the handheld device 540 towards the apparent position of the scene 560. The position and orientation of the secondary virtual viewpoint based on the position and orientation of the handheld device 540 is thus similarly situated relative to the primary virtual viewpoint in the virtual space. As such, the spectator 540 views the scene 560 from a different perspective that is based on the position and orientation of the handheld device 540. As shown, the depiction of the scene 560 from the primary virtual viewpoint shows the character 562 having a horizontal separation from the stop sign of x. Whereas in the magnified view 566 of the handheld device 540, the scene 560 is shown depicted from the perspective of the secondary virtual viewpoint, such that the horizontal separation between the character 562 and the stop sign 564 is x+Δx. As can be seen, the horizontal separation of the character 562 and the stop sign 564 is increased in the spectator video stream rendered on the handheld device 540 because of the different location and orientation of the secondary virtual viewpoint relative to the primary virtual viewpoint. In this manner, the spectator 548 views the same scene as the user 536, but shown from a different virtual perspective in an intuitive manner as one would expect based on the relative positioning of the spectator 548 and the user 536.

Figure 25:
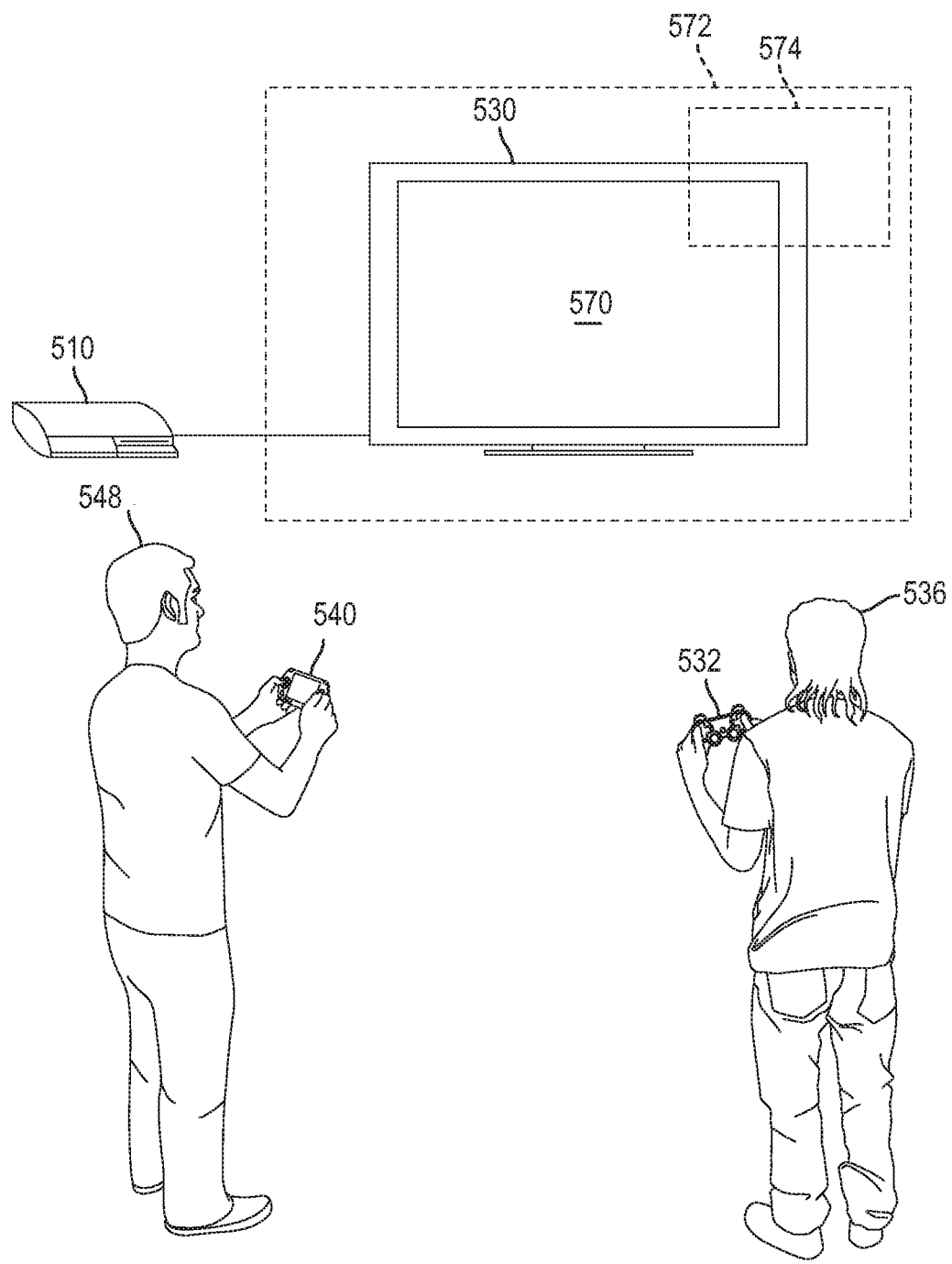
FIG. 25 illustrates an interactive environment including a user and a spectator interacting with an interactive application, in accordance with an embodiment of the invention.

With reference to FIG. 25, an interactive environment including a user 536 and a spectator 548 interacting with an interactive application is shown, in accordance with an embodiment of the invention. The user 536 operates a controller 532 to provide input to the interactive application. As shown, the interactive application generates an application video stream that is rendered on the display 530, based on the current state of the interactive application. As shown, the rendered application video stream depicts a scene 570. The scene 570 may be a view of a virtual space of the interactive application. In one embodiment, the spectator 548 is able to view an expanded area 572 of the scene 570 by utilizing the handheld device 540. For example, in one embodiment, the spectator may maneuver the handheld device so as to be directed towards a region 574 within the expanded area 572. The position and orientation of the handheld device are tracked so as to enable determination of the direction towards which the handheld device 540 is oriented. The region 574 is shown on the handheld device 540 for the spectator to view. In this way, the spectator 574 is able to view other portions of the scene 570 which the user 536 is not able to view because of the limited view which is shown on the display 530.

In another embodiment, the handheld device 540 initially renders a same image as that shown on the display 530. Then, the spectator 548 may view other regions of the expanded area 572, such as region 574, by providing input to the handheld device 540, such as by moving a joystick or touching and dragging a finger across a touchscreen of the handheld device 540 so as to move the view that is shown on the handheld device 540 to a different region. In a cooperative-style game, such a feature could be utilized to enable a spectator 548 to view regions of a virtual space which the user 36 is not presently viewing. The spectator 548 could communicate information based on what was viewed to the user 536 to aid the user 536 in the gameplay.

Figure 26A:
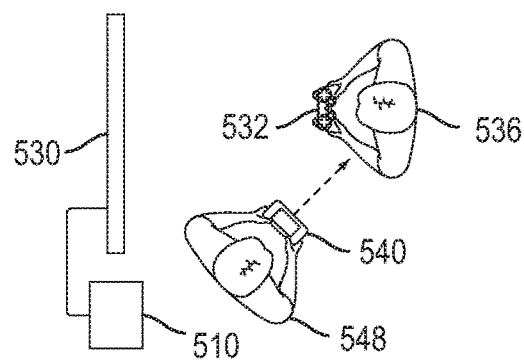
FIG. 26A illustrates a top view of an interactive environment including a user and a spectator interacting with an interactive application, in accordance with an embodiment of the invention.
Figure 26B:
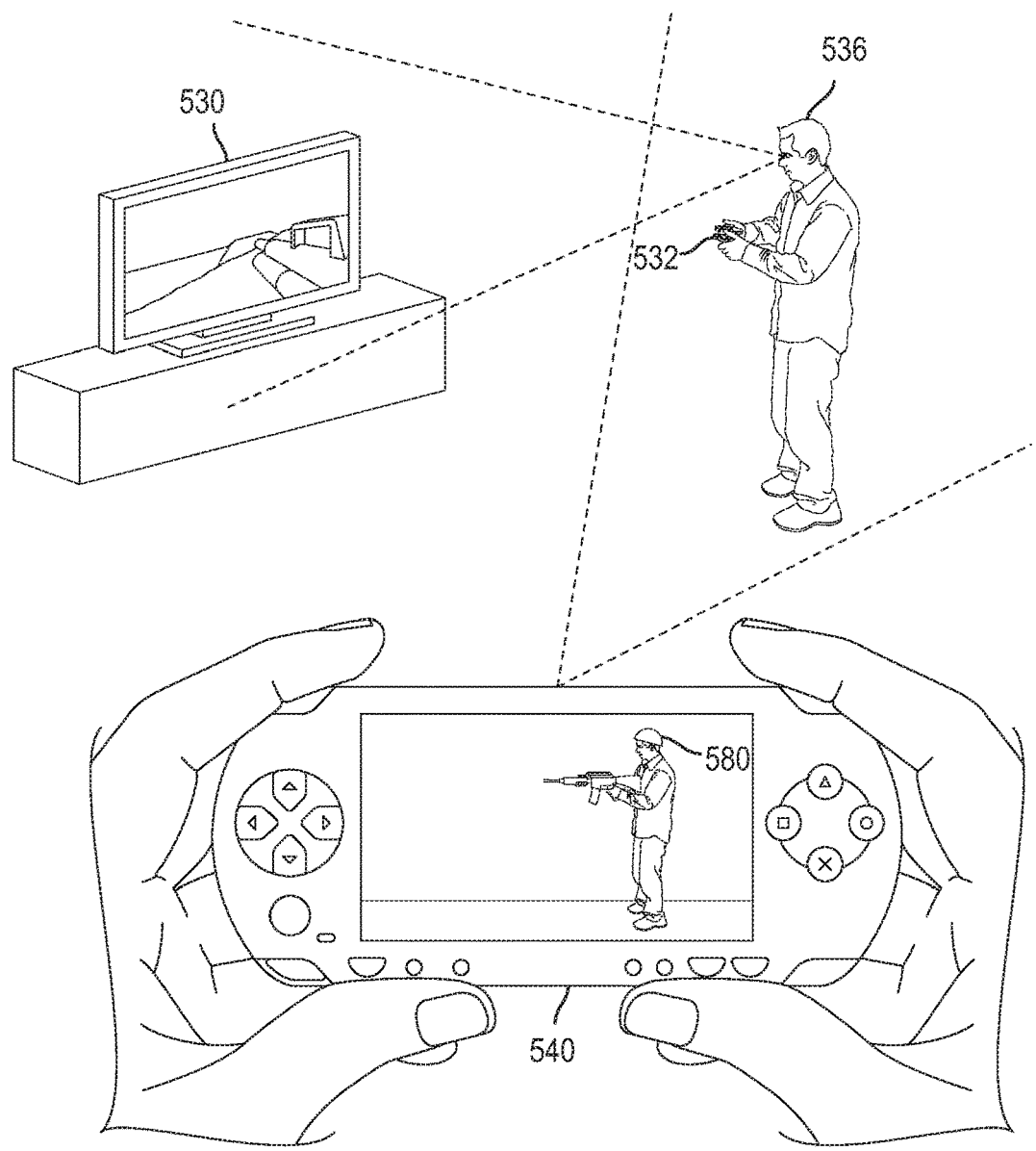
FIG. 26B illustrates the interactive environment of FIG. 26A from the perspective of the spectator, in accordance with an embodiment of the invention.

With reference to FIG. 26A, a top view of an interactive environment including a user 536 and a spectator 548 interacting with an interactive application is shown, in accordance with an embodiment of the invention. The user 536 operates a controller 532 to provide input to the interactive application. As shown, the spectator 548 operates a handheld device 540, and orients it towards the user 536. The position and orientation of the handheld device 540 are tracked so as to enable determination of the direction towards which the handheld device 540 is directed. Additionally, the position of the user 536 may be identified by tracking the position of the controller 532. FIG. 4B illustrates the interactive environment of FIG. 4A from the perspective of the spectator 548. As shown, as the spectator 548 orients the handheld device 540 towards the user 536 (typically, directing a backside of the handheld device 540 so that it faces the user 536), the spectator views a character 580 of the interactive application in place of the user 536. The character may be set in a virtual space of the interactive application.

In one embodiment, the location of the user 536 is determined relative to the handheld device 540 by capturing an image stream from a rear-facing camera of the handheld device 540. The captured image stream is analyzed to determine the presence of the user 536, and the user 536 is replaced with a character of the interactive application. In one embodiment, selected portions of the user 536 may be augmented with virtual features, so as to form an augmented reality image stream which is displayed on the handheld device. For example, the user 536 could be shown holding a weapon, wearing different clothes, or being outfitted with various other items. In one embodiment, the user 536 might be shown set in a virtual space of the interactive application. In this manner, the spectator 548 is able to view the user 536 as if he or she is directly in the virtual space of the interactive application.

Figure 27:
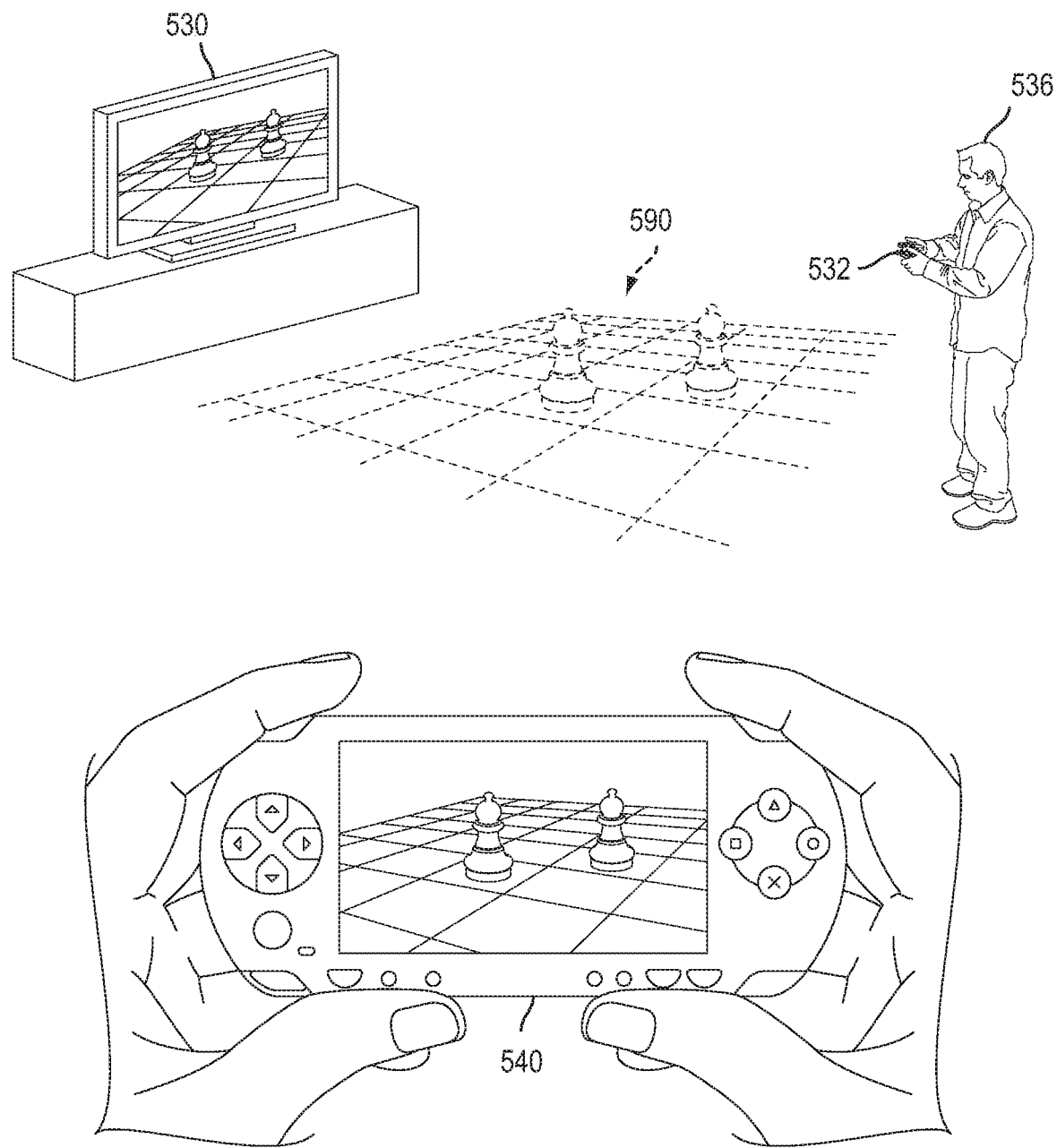
FIG. 27 illustrates an interactive environment including a user interacting with an interactive application, shown from the perspective of a spectator operating a handheld device, in accordance with an embodiment of the invention.

With reference to FIG. 27, an interactive environment including a user 536 interacting with an interactive application is shown from the perspective of a spectator operating a handheld device 540, in accordance with an embodiment of the invention. The user 536 operates a controller 532 to provide input to the interactive application. As shown, the user 536 is playing a chess game, which the user 536 views on the display 530. Simultaneously, the spectator is able to view a virtual space 90 in which the chess game takes place. As the spectator maneuvers the handheld device 540 within the interactive environment, the virtual space 90 is shown from different perspectives on the handheld device 540 based on the location and orientation of the handheld device 540. In this manner, the spectator is able to view the virtual space 90 from different vantage points as if it existed in the interactive environment. The handheld device 540 thus functions as a viewer or virtual window enabling the spectator to view the virtual space of the interactive application.

With reference to FIG. 28, an interactive environment is shown from the perspective of a spectator, in accordance with an embodiment of the invention. As shown, a user 536 operates motion controllers 600a and 600b while viewing an interactive application rendered on a display 530. In the present embodiment, the interactive application is a boxing game, wherein the movements of the motion controllers 100a and 100b as they are maneuvered by the user 536 are detected and processed to enable the interactive application to render similar movements of fists shown on the display 530. In this manner, the user 536 is provided with an experience of fighting in a boxing match, wherein as the user 536 throws punches, the fists shown on the display move in a similar fashion. Thus, the user 536 controls the fists and their movements by moving the motion controllers 100a and 100b. In one embodiment, the interactive system includes an image capture device 106, which captures images of the motion controllers 600a and 600b. These images are analyzed to determine the motion of the controllers 600a and 600b. Furthermore, the captured images may be analyzed to determine the position and orientation of the handheld device 540. In one embodiment, the image capture device 106 includes a depth camera for capturing depth information of the interactive environment. The captured depth information can be processed to aid in determining the location and movements of the user 536 as well as the spectator and the handheld device 540. Examples of motion controllers include the Playstation Move® controller which is manufactured by Sony Computer Entertainment Inc.

In one embodiment, the user 536 fights against a virtual opponent 102. The spectator operating a handheld device 540 directs the handheld device 540 towards the user 536 (typically, so that the back side of the handheld device 540 faces the user 536). The handheld device 540 displays video of the user 536 fighting with the virtual opponent 102 in real-time. In one embodiment, as the spectator directs the handheld device 540 towards the user 536, a camera included in the handheld device 540 captures video including the user 536 and the motion controllers 600a and 600b. The captured video may be analyzed to determine the location of the user as well as the movements of the motion controllers 600a and 600b. The handheld device 540 may also receive information about the location of the user and movements of the motion controllers 600a and 600b from the interactive application. In one embodiment, the user 536 is shown in the video displayed on the handheld device 540 but with boxing gloves on the user's 536 hands in place of the motion controllers 600a and 600b. In another embodiment, instead of displaying the user 536, a character of the boxing game that is being controlled by the user 536 is displayed on the handheld device 540.

Additionally, as the spectator maneuvers the handheld device 540 to different positions and orientations relative to the user 536, the video shown on the handheld device 540 will reflect these changes. Thus, if the spectator moves to a location approximately behind the user 536 and directs the handheld device 540 towards the user 536, then the spectator will be able to view on the handheld device 540 the back side of the user 536 or a character controlled by the user 536, and may see the front side of the virtual opponent 102 if not occluded by the user 536 or some other object. Similarly, if the spectator moves to a location approximately in front of the user 536 and directs the handheld device towards the user 536, then the spectator will be able to view the front side of the user 536 if not occluded by, e.g. the virtual opponent 102 (the back side of which may be visible in the view). The spectator may maneuver the handheld device 540 to be closer to the user 536 and so zoom in on the user 536, or maneuver the handheld device 540 to be further away, and so be able to enjoy a more expansive view of the boxing match between the user 536 and the virtual opponent 102. As the spectator moves the handheld device 540 to different positions and orientations, the handheld device 540 displays video from a virtual viewpoint within a virtual space of the interactive application whose position and orientation is determined based on the position and orientation of the handheld device 540. Thus, as the user 536 interacts with the boxing game, the spectator is able to interact as a virtual cameraman, controlling the viewpoint from which video of the interactive game is displayed on the handheld device 540 by maneuvering the handheld device 540.

In another embodiment, the camera 106 may be a depth camera capable of capturing depth information of objects in the interactive environment. In one embodiment, the user 536 does not require motion controllers, but is able to provide interactive input to the interactive application through movements which are detected by the camera 106. The camera 106 may be configured to capture both images of the interactive environment as well as depth information, which are processed to determine the position, orientation, and movements of the user 536. These are then utilized by the interactive application as input.

Figure 29:
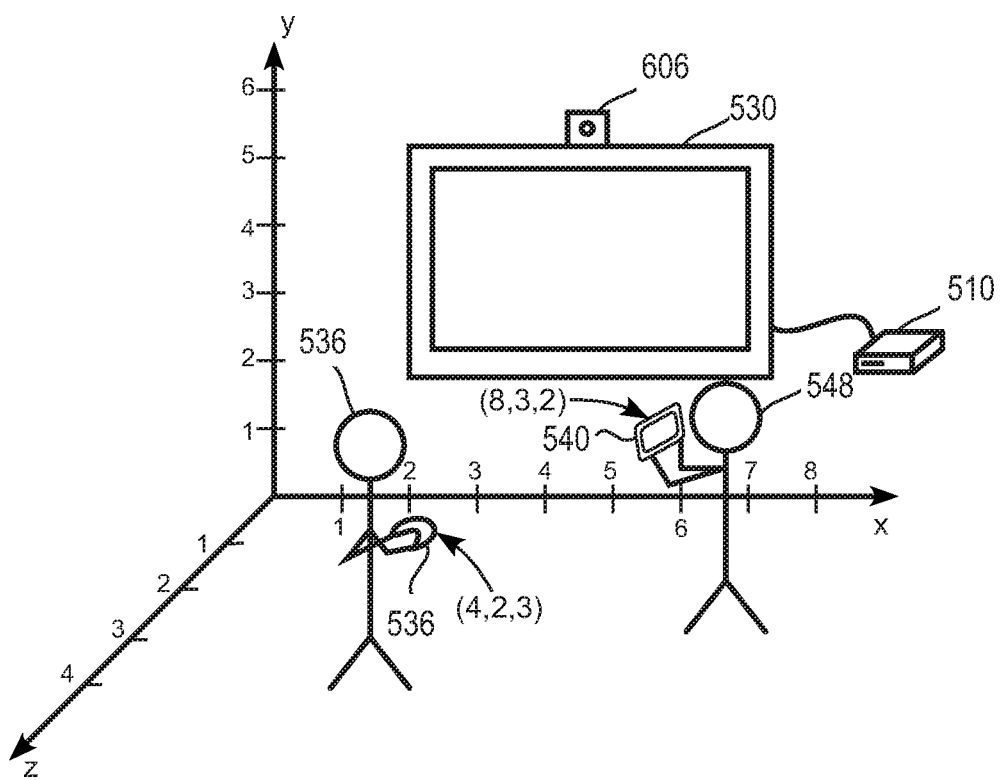
FIG. 29 illustrates an interactive environment, including a console device which executes an interactive application that is rendered on a main display, in accordance with an embodiment of the invention.

With reference to FIG. 29, an interactive environment is shown, including a console device 510 which executes an interactive application that is rendered on a main display 530. A user 536 operates a controller 532 so as to provide interactive input to the interactive application. An image capture device 106 captures images of the interactive environment. Simultaneously, a spectator 548 operates and views a handheld device 540, the handheld device 540 rendering an ancillary video stream which is related to that being rendered on the main display 530. As shown, the position, orientation, and movements of the controller 532 and the handheld device 540 may be tracked in a three-dimensional (x, y, z) coordinate space. In the illustrated embodiment, the controller 532 has coordinates (4, 2, 3) whereas the handheld device has coordinates (8, 3, 2). By tracking the positions and movements of the controller 532 and the handheld device 540, it is possible to determine the relative positioning of the controller 532 and the handheld device 540. This information may be utilized to affect the ancillary video stream rendered on the handheld device 540, for example, determining the location of a virtual viewpoint within a virtual space of the interactive application based on the relative positions of the controller 532 and handheld device 540 in the real-world interactive environment.

In one embodiment, the interactive application may define a correlation between the virtual space and the aforementioned three-dimensional coordinate space in the real-world interactive environment, such that the coordinate system of the real-world interactive environment is mapped to a coordinate system of the virtual space. In various embodiments, the nature of this mapping may vary. For example, in one embodiment, the mapping may be scaled one-to-one, such that distances in the real-world correspond to equivalent distances in the virtual world. In other embodiments, the mapping may be scaled by a certain factor, such that distances in the virtual-world are greater than or less than corresponding distances in the real-world.

Figures 30A, 30B:
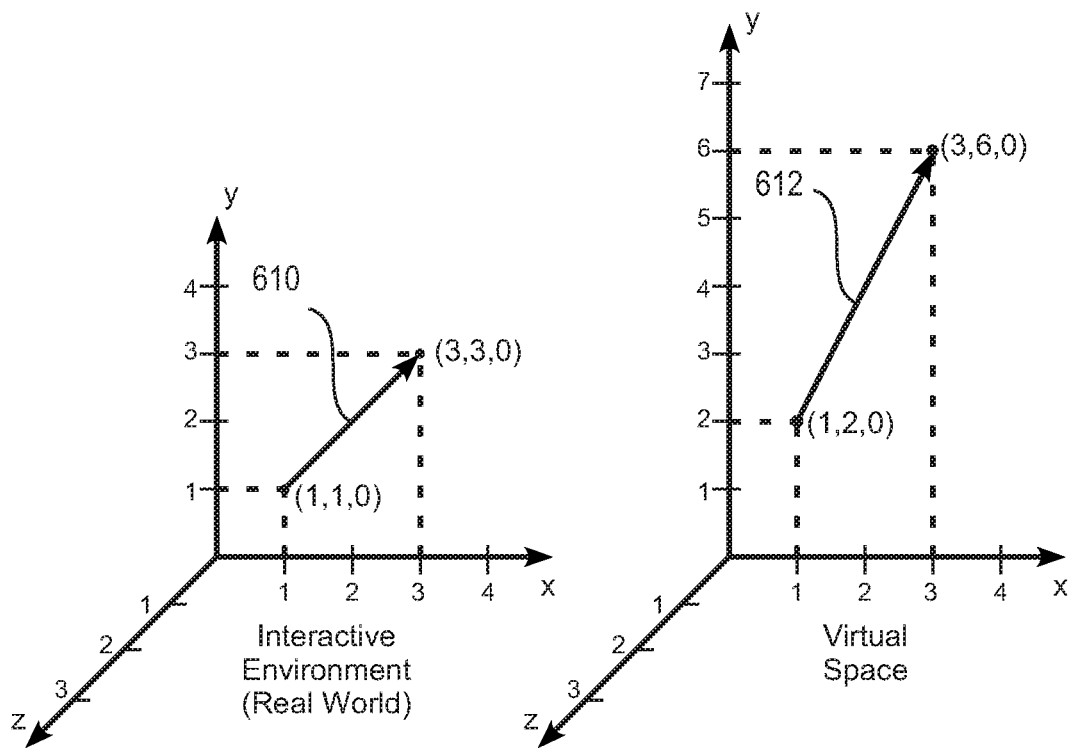
FIG. 30A illustrates a coordinate space of a real-world interactive environment, in accordance with an embodiment of the invention.
FIG. 30B illustrates a coordinate space of a virtual space corresponding to the coordinate space of the real-world interactive environment of FIG. 30A.

Additionally, the scale of the mapping for each of the corresponding axes of the virtual and real-world coordinate systems may vary. For example, in one embodiment, the y-axis in the real-world may be mapped so as to have an increased scale in the virtual world (e.g. multiplied by a factor greater than one). Whereas, the x-axis and z-axis in the real-world may be mapped to the corresponding axes in the virtual space in an exact correspondence. One example of such a configured is illustrated with reference to FIGS. 30A and 30B. FIG. 30A illustrates a coordinate space of a real-world interactive environment. A vector movement 610 is shown from coordinates (1, 1, 0) to (3, 3, 0). FIG. 30B illustrates a corresponding coordinate space of a virtual space. The vector 1512 from coordinates (1, 2, 0) to (3, 6, 0) corresponds to the vector movement 610. As can be seen, the vector movement 610 is amplified in the vertical y-axis only, whereas it is not amplified in the x and z-axes. Thus, by selectively amplifying y-axis movements, when the spectator 548 moves the handheld device 540 vertically, the movement of the virtual viewpoint in the virtual space is magnified, which may enable the spectator 548 to more easily view and capture video from high and low positions, whereas movement of the handheld device along horizontal directions (x-axis and z-axis) is not magnified. It will be appreciated by those skilled in the art that in other embodiments of the invention, the scale of the mapping for any given direction or axis may vary from other directions or axes.

And furthermore, the scale of the mapping may vary along any given axis or direction, or with reference to a particular location, such as the location of the user. For example, in one embodiment, the mapping near the user is scaled in a more exact correspondence, whereas mapping further away from the user is scaled so that movements of the handheld device away from the user are magnified in the virtual space. Thus, when the spectator operates the handheld device near the user, movements in the interactive environment correspond to similar movements in the virtual space. Whereas, as the spectator moves the handheld device away from the user, the corresponding movement in the virtual space (e.g. movement away from a character controlled by the user) may be come progressively magnified. This enables the spectator to control the location of the virtual viewpoint in a natural manner when close the user, yet also have the ability to move the virtual viewpoint further away in the virtual space than would be possible if the mapping maintained the same scale of correspondence throughout.

Figures 31A, 31B:
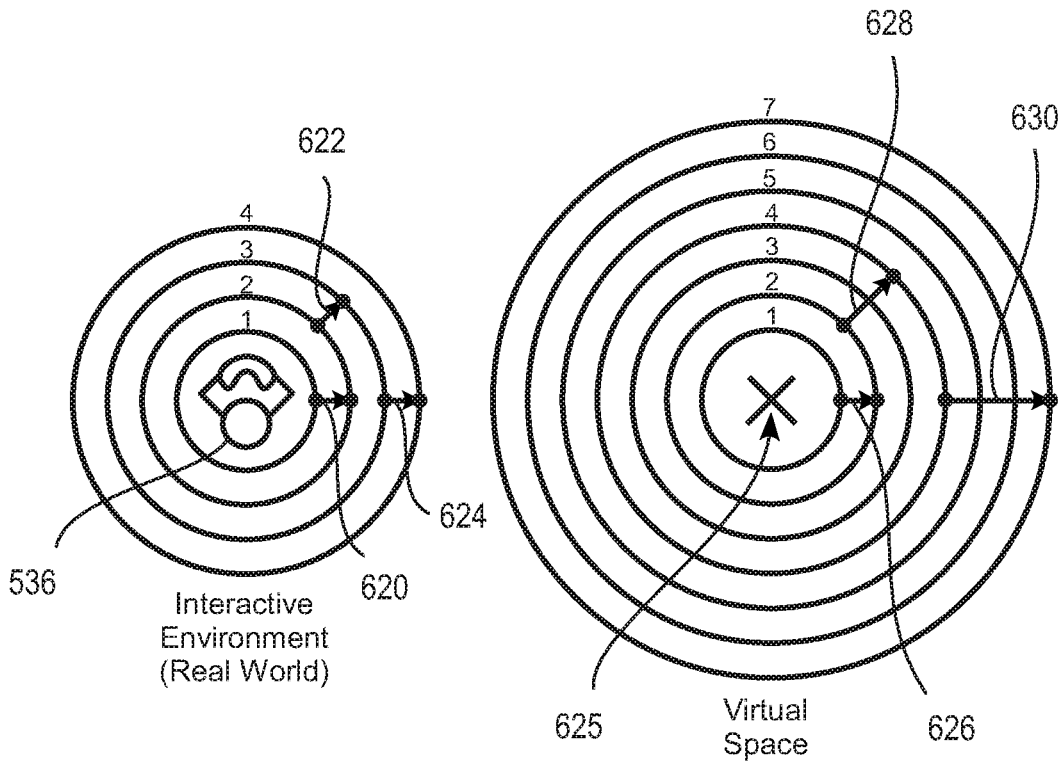
FIG. 31A illustrates a user whose location in an interactive environment defines the origin of a spherical or cylindrical coordinate system, in accordance with an embodiment of the invention.
FIG. 31B illustrates a virtual space to which the interactive environment of FIG. 31A has been mapped.

One example of such an embodiment is illustrated with reference to FIGS. 31A and 31B. FIG. 31A illustrates a user 536 whose location in an interactive environment defines the origin of a spherical or cylindrical coordinate system. A vector 5120 is shown indicating a movement from a distance of 1 to 2 away from the user 536. Similarly, a vector 622 indicates a movement from a distance of 2 to 3; and a vector 4 indicates a movement from 3 to 4. FIG. 31B illustrates a virtual space to which the interactive environment has been mapped. The location 625 in the virtual space corresponds to the location of the user 536 in the interactive environment. For example, in some embodiments, the location 625 may represent the location of a character, vehicle or some other object controlled by the user 536. The vector 626 corresponds to the real-world vector 120. As shown, vector 626 has an exact correspondence to vector 120, indicating a change in distance from 1 to 2. The vector 628 corresponds to the vector 622. However, as shown, the mapping of the coordinate space of the interactive environment to that of the virtual space is such that the vector 622 is magnified in scale by a factor of two. Hence the vector 622 indicating a change in distance from 2 to 3 in the real-world interactive environment is mapped to the vector 628 indicating a change in distance from 2 to 4 in the virtual space. The vector 630 corresponds to the vector 624. As shown, while the vector 624 indicates a change in distance from 3 to 4 in the interactive environment, the corresponding vector 630 indicates a change in distance from 4 to 7, thereby tripling the change in distance in the virtual space.

The foregoing illustrated example represents merely one embodiment wherein mapping from the interactive environment to the virtual space is configured to have increasing amplification with increased distance from a reference location in the interactive environment. In other embodiments, the changes in amplification with increasing distance may vary according to any schema, such as linearly, logarithmically, or according to preset zones which may be constant within each zone or vary as well.

In some embodiments, the nature of the mapping may change in accordance with changes in the state of the interactive application. By varying the mapping and correspondence of the real-world to the virtual world, it is possible to tailor the use of information regarding real-world movements of the handheld device 540 and controller 532, so as to enable improved interactive functionality with respect to the interactive application.

With reference to FIG. 32A, an overhead view of an interactive environment is shown, in accordance with an embodiment of the invention. A user 536 operates a controller 532 to interact with an interactive application which is rendered on a display 530. Simultaneously, a spectator 548 operates a handheld device 540 in the interactive environment, the handheld device 540 displaying video of a virtual space of the interactive application from a virtual viewpoint in the virtual space which is based on the location of the handheld device 540 relative to the location of the user 536. In an interactive sequence, the spectator 548 moves from a position 640 next to the user 536, to a position 642 further to the side of the user 536, to a position 644 in front of the user 536. With reference to FIG. 32B, scenes 146, 148, and 150 illustrate video which is displayed on the handheld device 540 when the spectator is located at positions 640, 642, and 644 respectively.

In the illustrated embodiment, the user 536 is playing an interactive game in which the user 536 drives a vehicle in the virtual space. The position of the user 536 is mapped to the position of a virtual driver (controlled by the user 536) of the vehicle in the virtual space. Thus, when the spectator 548 is located at position 640 adjacent to the user 536, the virtual viewpoint in the virtual space is located adjacent to the driver of the vehicle. As shown by the scene 146, the video shown on the handheld device 540 illustrates the interior of the vehicle from the perspective of a viewpoint adjacent to the virtual driver of the vehicle. When the spectator 548 moves to the position 642 further to the side of the user 536, the virtual viewpoint is moved in a corresponding fashion in the virtual space. As shown by the corresponding scene 648, the virtual viewpoint has moved to a location outside of the vehicle, as the scene 648 illustrates the side of the vehicle. Similarly, when the spectator 548 moves to the position 644 in front of the user 536, the virtual viewpoint is moved in a corresponding manner within the virtual space, to a position in front of the vehicle. As shown by the scene 650, when located at position 644, the user 548 views the front of the vehicle on the handheld device 540.

For ease of description, some of the aforementioned embodiments of the invention have been generally described with reference to one player operating a controller (or providing input through a motion detection system) and/or one user operating a handheld device. It will be understood by those skilled in the art that in other embodiments of the invention, there may be multiple users operating controllers (or providing input through motion detection) and/or multiple users operating handheld devices.

Figure 33:
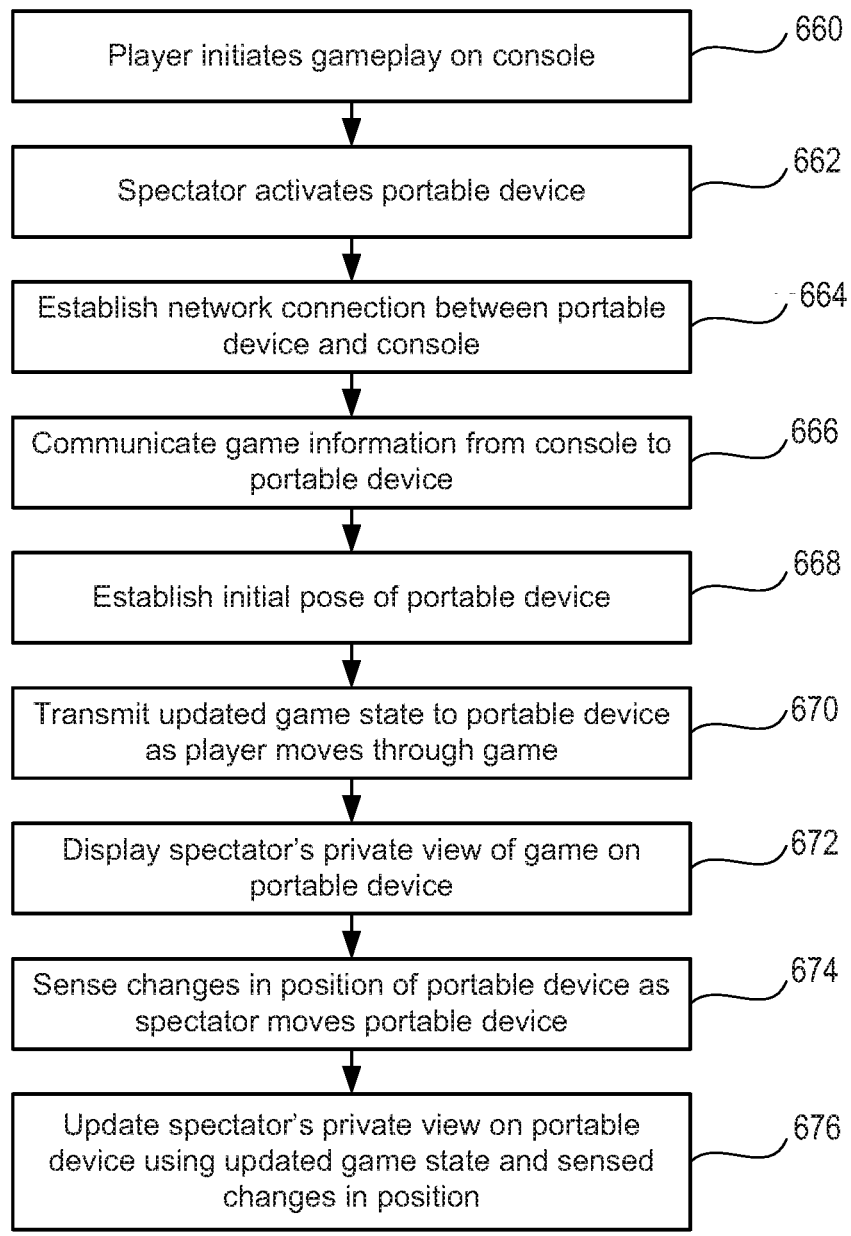
FIG. 33 illustrates a method for enabling a portable device operated by a spectator to display video of an interactive game, in accordance with an embodiment of the invention.

With reference to FIG. 33, a method for enabling a portable device operated by a spectator to display video of an interactive game is shown, in accordance with an embodiment of the invention. At method operation 660, a player initiates gameplay on a console device. At method operation 662, a spectator activates a portable device. At method operation 664, a network connection between the portable device and the console is established. At method operation 666, information about the game is communicated from the console to the portable device. At method operation 668, an initial pose of the portable device is established. In various embodiments, the initial pose may be determined through various mechanisms, such as defining a current state of internal position tracking sensors as the initial pose, or by searching for a marker on the TV screen and defining the relationship to the TV as the initial pose. At method operation 670, an updated game state is transmitted to the portable device as the player moves through the game. At method operation 672, the portable device displays the spectator's private view of the game. At method operation 674, as the spectator moves the portable device, the device senses changes in position relative to the initial pose. In various embodiments, this may be accomplished by, for example, using internal motion sensors, a directional pad, or by tracking the marker on the TV screen and determining position based on its new orientation. At method operation 676, the portable device uses this new information to update the spectator's private view of the display.

In various embodiments of the invention, various other method operations may be included in the method. For example, in one embodiment, the spectator may press a record button on the portable device to initiate recording of the spectator's private view of the game on the portable device. In another embodiment, the portable device is configured to allow the spectator to pan, zoom, or crop the live video or the prerecorded video. In another embodiment, the portable device provides the spectator with other video editing tools to manipulate the live or prerecorded video, such as chroma keying, color change tools, cut and paste, etc. In yet another embodiment, the spectator can upload the recorded video or images to an Internet site to share with others.

In various embodiments of the invention, different configurations may be utilized to enable the portable device to display video of the game. For example, in one embodiment, the console renders all images from the portable device's perspective and streams these rendered images to the portable device. In this case, the portable device communicates its pose to the console, but is not required to execute or maintain any software or information specifically related to the actual execution of the game itself other than that needed to render the images which it receives from the console. However, in another embodiment, the portable device contains some or all of the levels and models of the game being played. In this embodiment, the console only needs to send the coordinates of the dynamic objects to the portable device so that the portable device can update its scene graph and render the appropriate images on its display. In yet another embodiment, the portable device could run a scaled down version of the interactive application, with the stored levels and models having reduced complexity.

Furthermore, in various embodiments of the invention, the interactive functionality of the portable device thus described may be designed with or without allowing the spectator to affect the outcome of the game. For example, in one embodiment, the spectator's personal view would be limited to a reasonably small deviation from the player's game view. This allows the spectator some level of control without revealing much additional information that the spectator could share with the player. Conversely, in another embodiment, the spectator might be allowed full degrees of motion with the portable device. In this case, the spectator may actually impact the outcome of the game because the spectator can watch action that is occurring outside the view of the player and communicate this to the player (e.g. calling out a warning if an enemy approaches from behind that the player is not aware of).

Figure 34:
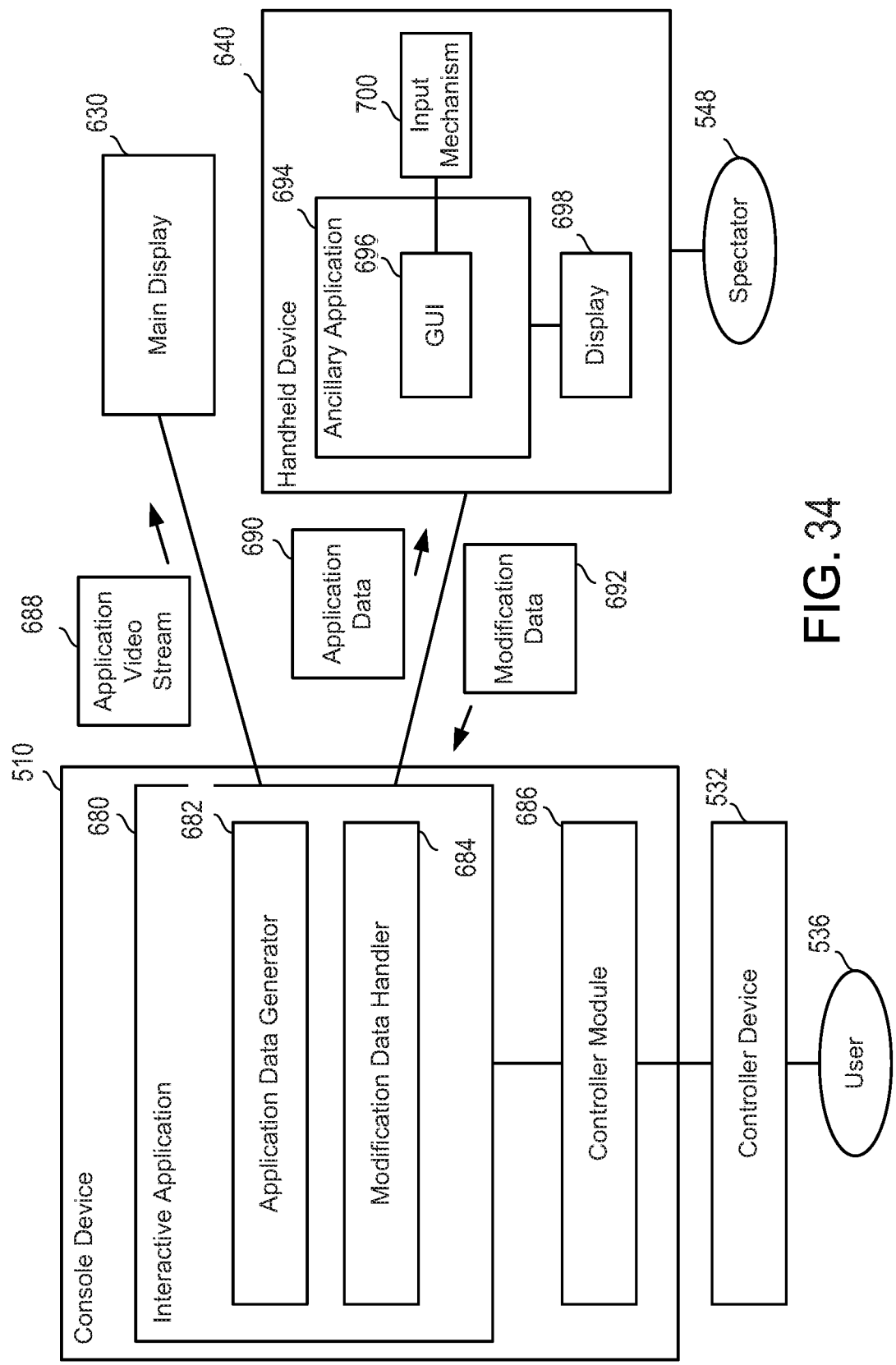
FIG. 34 illustrates a system for enabling a spectator to utilize a handheld device to affect the state of an interactive application, in accordance with an embodiment of the invention.

With reference to FIG. 34, a system for enabling a spectator to utilize a handheld device to affect the state of an interactive application is shown, in accordance with an embodiment of the invention. A console device 510 executes an interactive application 680. An application video stream 688 is generated based on the state of the interactive application 180 and sent to a main display 530 for rendering. A user 536 operates a controller device 532 to provide input to the interactive application 680 via a controller module 686 which handles the raw input from the controller device 532. An application data generator 682 generates application data 690, which is sent to an ancillary application 694 executing on the handheld device 540. The handheld device 540 includes an input mechanism 700 for receiving input from the spectator 548 and a display 698. The ancillary application 694 includes a graphical user interface (GUI) 696 which is displayed on the display 698. The GUI may provide a series of menus and prompts which allow the spectator to affect the state of the interactive application, such as aural and visual aspects of the interactive application. The spectator 548 provides input utilizing the input mechanism 800. Based on the spectator's input, the ancillary application generates modification data 692 which is sent to a modification data handler 684 of the interactive application 680 on the console device 510. Based on the modification data 692, the state of the interactive application 680 is altered, which affects the application video stream 688 which is generated.

Figure 35:
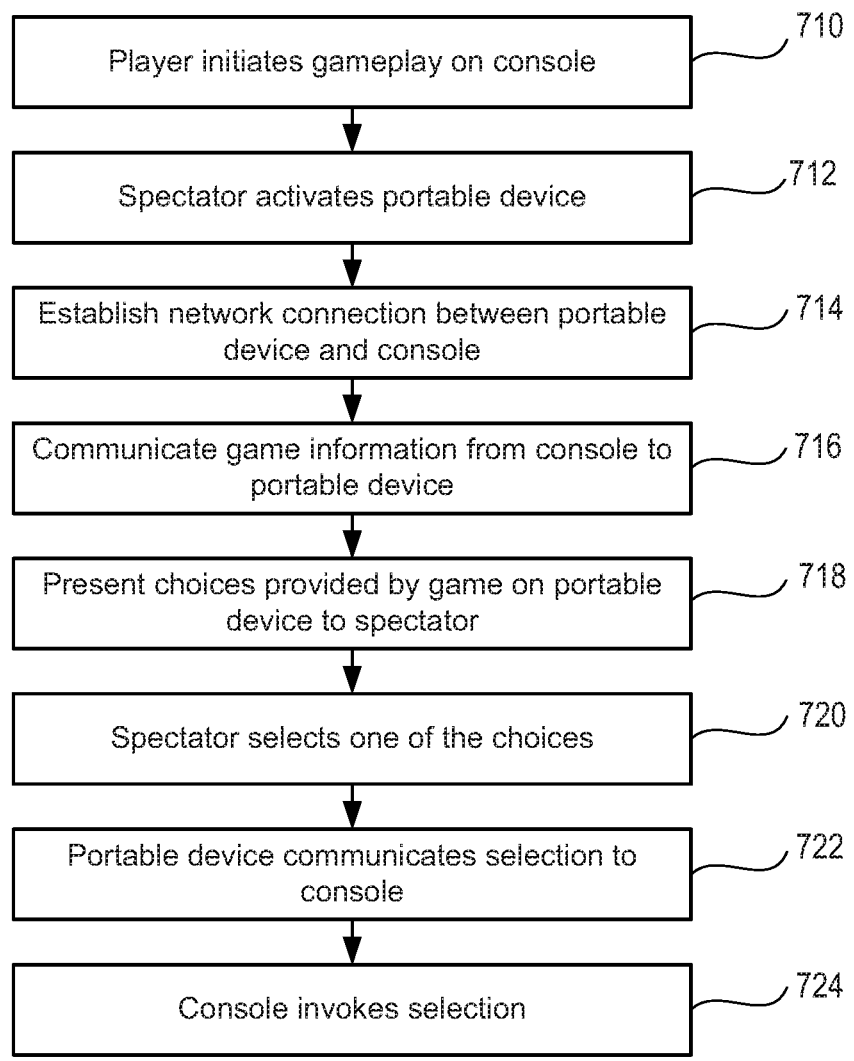
FIG. 35 illustrates a method for enabling a spectator to affect a game utilizing a portable device, in accordance with an embodiment of the invention.

With reference to FIG. 35, a method for enabling a spectator to affect a game utilizing a portable device is shown, in accordance with an embodiment of the invention. At method operation 810, a player initiates gameplay on a console device. At method operation 812, a spectator activates a portable device. At method operation 814, the portable device establishes a network connection with the console device. At method operation 816, information about the game is communicated from the console device to the portable device. In various embodiments, the information may include, by way of example only, characters in play, available costumes for a character, a list of songs available to play as a sound track, or other parameters of the game which the spectator may be able to adjust. At method operation 818, the portable device presents the choices provided by the game to the spectator. At method operation 820, the spectator selects one of the choices. For example, the spectator might pick a song to be played or select a costume to be worn by a character. At method operation 822, the portable device communicates the selection to the console via the network connection. At method operation 824, the console invokes the selection. For example, the console may play the selected song or change the costume of a character to the selected costume.

In various embodiments, the parameters which the spectator is allowed to adjust may or may not affect the outcome of the game to varying degrees. For example, in one embodiment, the spectator is able to modify the costumes or sound effects of the game, such that the outcome of the game is unlikely to be affected. In another embodiment, the spectator might control more intrusive elements of the game, such as the flow of time (e.g. speeding it up or slowing it down), or changing the world's gravity to match that of a larger or smaller planet, or perhaps set no gravity at all. Such changes would likely have a significant impact on the outcome of the game.

Figure 36:
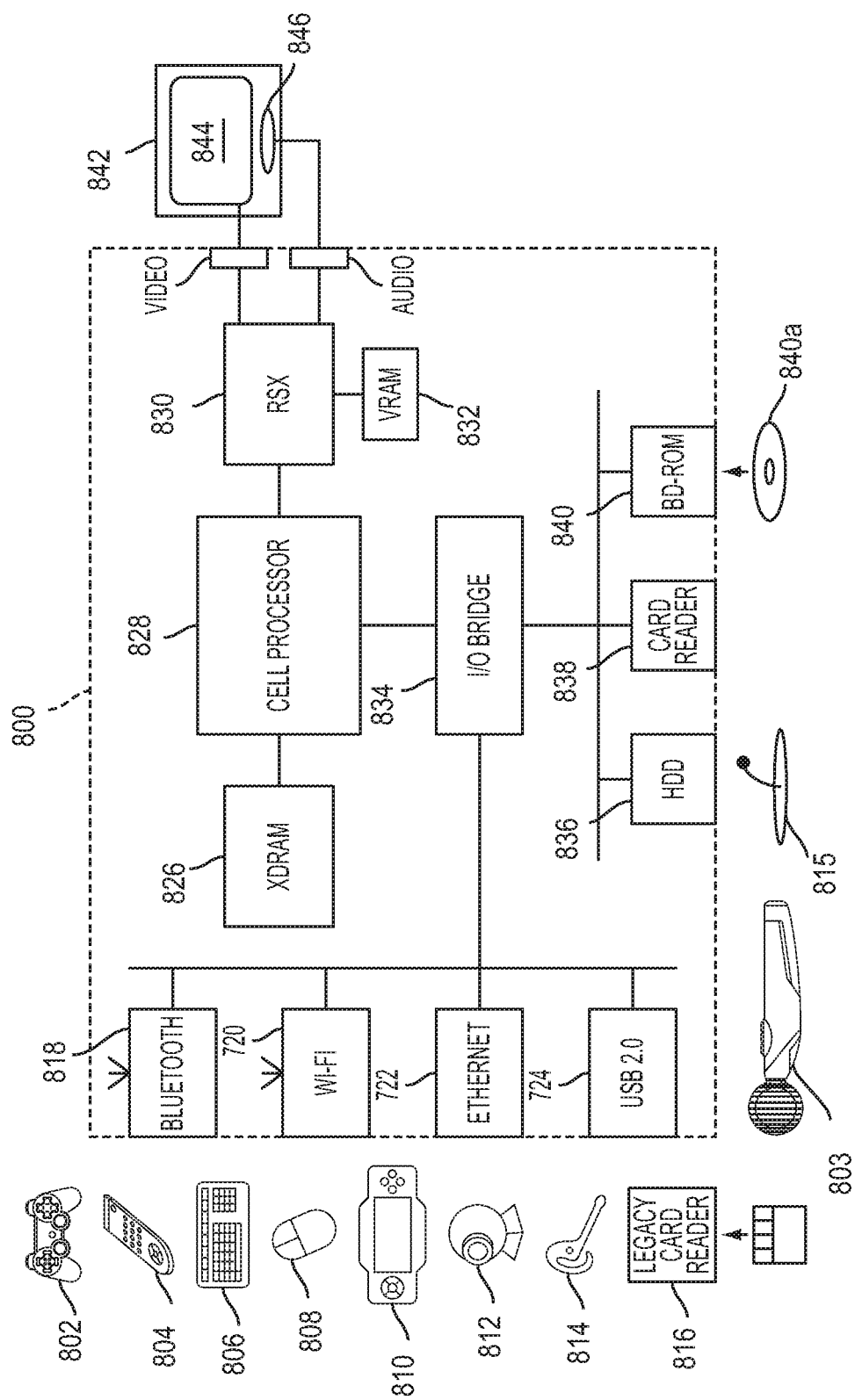
FIG. 36 schematically illustrates the overall system architecture of the Sony® Playstation 3® entertainment device, a console that may be compatible for interfacing a control device and a handheld device with a computer program executing at a base computing device in accordance with embodiments of the present invention.

FIG. 36 illustrates hardware and user interfaces that may be used to execute and render an interactive application, in accordance with one embodiment of the present invention. FIG. 36 schematically illustrates the overall system architecture of the Sony® Playstation 3® entertainment device, a console that may be compatible for interfacing a control device and a handheld device with a computer program executing at a base computing device in accordance with embodiments of the present invention. A system unit 800 is provided, with various peripheral devices connectable to the system unit 800. The system unit 800 comprises: a Cell processor 828; a Rambus® dynamic random access memory (XDRAM) unit 826; a Reality Synthesizer graphics unit 830 with a dedicated video random access memory (VRAM) unit 832; and an I/O bridge 834. The system unit 800 also comprises a Blu Ray® Disk BD-ROM® optical disk reader 840 for reading from a disk 840a and a removable slot-in hard disk drive (HDD) 836, accessible through the I/O bridge 834. Optionally the system unit 800 also comprises a memory card reader 838 for reading compact flash memory cards, Memory Stick® memory cards and the like, which is similarly accessible through the I/O bridge 834.

The I/O bridge 834 also connects to six Universal Serial Bus (USB) 2.0 ports 834; a gigabit Ethernet port 822; an IEEE 802.11b/g wireless network (Wi-Fi) port 720; and a Bluetooth® wireless link port 718 capable of supporting up to seven Bluetooth connections.

In operation, the I/O bridge 834 handles all wireless, USB and Ethernet data, including data from one or more game controllers 802-803. For example when a user is playing a game, the I/O bridge 834 receives data from the game controller 802-803 via a Bluetooth link and directs it to the Cell processor 728, which updates the current state of the game accordingly.

The wireless, USB and Ethernet ports also provide connectivity for other peripheral devices in addition to game controllers 802-803, such as: a remote control 804; a keyboard 806; a mouse 808; a portable entertainment device 710 such as a Sony Playstation Portable® entertainment device; a video camera such as an EyeToy® video camera 812; a microphone headset 814; and a microphone 815. Such peripheral devices may therefore in principle be connected to the system unit 800 wirelessly; for example the portable entertainment device 810 may communicate via a Wi-Fi ad-hoc connection, whilst the microphone headset 814 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 834, enabling the reading of memory cards 748 of the kind used by the Playstation® or Playstation 2® devices.

The game controllers 802-803 are operable to communicate wirelessly with the system unit 800 via the Bluetooth link, or to be connected to a USB port, thereby also providing power by which to charge the battery of the game controllers 802-803. Game controllers 802-803 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 802 is a controller designed to be used with two hands, and game controller 803 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 804 is also operable to communicate wirelessly with the system unit 800 via a Bluetooth link. The remote control 804 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 800 is operable to supply audio and video, either generated or decoded by the Playstation 3 device via the Reality Synthesizer graphics unit 830, through audio and video connectors to a display and sound output device 842 such as a monitor or television set having a display 844 and one or more loudspeakers 846. The audio connectors 850 may include conventional analogue and digital outputs whilst the video connectors 852 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 828. The Playstation 3 device's operating system supports Dolby® 5.1 surround sound, Dolby® Theatre Surround (DTS), and the decoding of 7.1 surround sound from Blu-Ray® disks.

In the present embodiment, the video camera 812 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 800. The camera LED indicator is arranged to illuminate in response to appropriate control data from the system unit 800, for example to signify adverse lighting conditions. Embodiments of the video camera 812 may variously connect to the system unit 800 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 800, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A portable device, comprising:
    a sensor configured to generate sensor data for determining and tracking a position and orientation of the portable device during an interactive session of a virtual reality program that is executed by a computing device and presented on a main display, the interactive session being defined for interactivity between a user and the virtual reality program;
    a communications module configured to send the sensor data to the computing device, the communications module being further configured to receive from the computing device an ancillary video stream of the interactive session that is generated based on a state of the virtual reality program and the tracked position and orientation of the portable device, the state of the virtual reality program being determined based on the interactivity between the user and the virtual reality program;
    a display configured to render the ancillary video stream;
    wherein a virtual viewpoint into a virtual space is presented on the main display by the virtual reality program, the main display provides a direct view from a first perspective into the virtual space, and the virtual viewpoint is changed when viewed via the portable device based on a location of the portable device, the change in the virtual viewpoint provides a side view from a second perspective into the virtual space that exposes a separation between objects in a foreground and objects in a background of the direct view, the second perspective being different from the first perspective; and
    wherein the ancillary video stream includes images of the virtual space captured from the second perspective of the virtual viewpoint so as to provide the side view;
    wherein the ancillary video stream is generated based on the position and orientation of the portable device relative to a tracked position of the user during the interactive session;
    wherein the position and orientation of the portable device relative to the position of the user define the change in the position and orientation of the virtual viewpoint within the virtual space defined by the virtual reality program.

2. The portable device of claim 1, wherein the state of the virtual reality program is determined from interactive input, the interactive input being received from a controller device during the interactive session.

3. The portable device of claim 1,
    wherein the interactive session defines interactivity between the user and a primary video stream rendered on the main display, the primary video stream being generated based on the state of the virtual reality program.

4. The portable device of claim 3,
    wherein the interactive session further defines interactivity between a second user and the ancillary video stream rendered on the display, the state of the virtual reality program being determined, at least in part, by the interactivity between the second user and the ancillary video stream.

5. The portable device of claim 1,
wherein the sensor is defined by one or more of an accelerometer, a magnetometer, and/or a gyroscope; and
wherein the sensor data includes inertial data generated by the sensor.

6. The portable device of claim 1,
wherein the sensor is defined by an image capture device; and
wherein the sensor data includes captured image data of an interactive environment in which the interactivity occurs.

7. The portable device of claim 6, wherein determining and tracking the position and orientation of the portable device is based on identification of one or more markers in the interactive environment.

8. The portable device of claim 1,
wherein an object within a virtual environment of the virtual reality program is mapped to the position of the user, the object being included in the images of the ancillary video stream when the portable device is oriented towards the position of the user.

9. The portable device of claim 1, wherein the communications module is configured to send the sensor data wirelessly to the computing device, and wherein the computing device is separate from the portable device.

10. The portable device of claim 1, wherein the direct view and the side view define views of the virtual space from different virtual perspectives in accordance with a relative positioning of the user and a spectator that operates the portable device.

11. A method, comprising:
executing, by a computing device, an interactive session of a virtual reality program presented on a main display, the interactive session being defined for interactivity between a user and the virtual reality program;
processing, by the computing device, sensor data received from a portable device to determine and track a position and orientation of the portable device;
generating, by the computing device, an ancillary video stream of the interactive session based on a state of the virtual reality program and the tracked position and orientation of the portable device, the state of the virtual reality program being determined based on the interactivity between the user and the virtual reality program;
sending the ancillary video stream from the computing device to the portable device for rendering on a display of the portable device;
wherein a first virtual viewpoint into a virtual space is presented on the main display by the virtual reality program, the main display provides a direct view into the virtual space depicted from a perspective of the first virtual viewpoint, wherein a second virtual viewpoint is viewed via the portable device based on a location of the portable device, the portable device provides a side view into the virtual space depicted from a perspective of the second virtual viewpoint that exposes a separation between objects in a foreground and objects in a background of the direct view, the perspective of the second virtual viewpoint providing a different vantage point of the virtual space than the perspective of the first virtual viewpoint; and
wherein the ancillary video stream includes images of the virtual space captured from the perspective of the second virtual viewpoint;
wherein the ancillary video stream is generated based on the position and orientation of the portable device relative to a tracked position of the user during the interactive session;
wherein the position and orientation of the portable device relative to the position of the user define the position and orientation of the second virtual viewpoint within the virtual space defined by the virtual reality program.

12. The method of claim 11, wherein the state of the virtual reality program is determined from interactive input, the interactive input being received from a controller device during the interactive session.

13. The method of claim 11,
wherein the interactive session defines interactivity between the user and a primary video stream rendered on the main display, the primary video stream being generated based on the state of the virtual reality program.

14. The method of claim 13,
wherein the interactive session further defines interactivity between a second user and the ancillary video stream rendered on the display, the state of the virtual reality program being determined, at least in part, by the interactivity between the second user and the ancillary video stream.

15. The method of claim 11,
wherein the sensor data includes inertial data generated from one or more of an accelerometer, a magnetometer, and/or a gyroscope.

16. The method of claim 11,
wherein the sensor data includes captured image data of an interactive environment in which the interactivity occurs.

17. The method of claim 16, wherein determining and tracking the position and orientation of the portable device is based on identification of one or more markers in the interactive environment.

18. The method of claim 11, wherein the sensor data is wirelessly received from the portable device; and wherein the computing device is separate from the portable device.

19. The method of claim 11, wherein the direct view and the side view define views of the virtual space from different virtual perspectives in accordance with a relative positioning of the user and a spectator that operates the portable device.

20. A system, comprising: a computing device, the computing device configured to execute an interactive session of a video game, to generate a primary video stream presented on a main display, a state of the interactive session being determined based on interactivity with a first user that views the main display; a portable device, including, a sensor configured to generate sensor data, a communications module configured to send the sensor data to the computing device, and a display; wherein the computing device is configured to process the sensor data to determine and track a position and orientation of the portable device; wherein the computing device is configured to generate an ancillary video stream of the interactive session based on the state of the interactive session and the tracked position and orientation of the portable device, the ancillary video stream being presented on the portable device for viewing by a second user; wherein the primary video stream presented on the main display provides a direct view into the virtual space depicted from a perspective of a first virtual viewpoint; wherein the ancillary video stream presented on the portable device provides a side view into the virtual space depicted from a perspective of a second virtual viewpoint that exposes a separation between objects in a foreground and objects in a background of the direct view; wherein the perspective of the second virtual viewpoint being different than the perspective of the first virtual viewpoint, so that the primary video stream and the ancillary video stream provide viewing of the virtual space from different vantage points, wherein the ancillary video stream is generated based on the position and orientation of the portable device relative to a tracked position of the first user during the interactive session; wherein the position and orientation of the portable device relative to the position of the first user define the position and orientation of the second virtual viewpoint within the virtual space defined by the virtual reality program.

21. The system of claim 20, wherein the direct view and the side view define views of the virtual space from different virtual perspectives in accordance with a relative positioning of the first user and the second user.

* * * * *